(12) United States Patent
Yano et al.

(10) Patent No.: US 11,262,643 B2
(45) Date of Patent: Mar. 1, 2022

(54) ADAPTER APPARATUS AND IMAGE PICKUP APPARATUS

(71) Applicant: CANON KABUSHIKI KAISHA, Tokyo (JP)

(72) Inventors: Hiroshi Yano, Kawasaki (JP); Takahiko Kano, Tokyo (JP); Futoshi Iinuma, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/853,893

(22) Filed: Apr. 21, 2020

(65) Prior Publication Data

US 2020/0249550 A1     Aug. 6, 2020

Related U.S. Application Data

(63) Continuation of application No. PCT/JP2018/038906, filed on Oct. 12, 2018.

(30) Foreign Application Priority Data

Oct. 25, 2017    (JP) .............................. JP2017-206350

(51) Int. Cl.
    *G03B 17/56*        (2021.01)
    *G03B 17/14*        (2021.01)
    *H04N 5/225*      (2006.01)

(52) U.S. Cl.
    CPC ........... *G03B 17/566* (2013.01); *G03B 17/14* (2013.01); *H04N 5/225* (2013.01)

(58) Field of Classification Search
    CPC ............................. G03B 17/14; G03B 17/565
    See application file for complete search history.

(56) References Cited

U.S. PATENT DOCUMENTS 8,830,607 B2 *   9/2014   Iinuma .................. G03B 17/48
                                                  359/828
9,261,756 B2 *   2/2016   Kuroiwa ................. G02B 7/14
(Continued)

FOREIGN PATENT DOCUMENTS

JP        S58178126 U     11/1983
JP        H07181582 A      7/1995
(Continued)

OTHER PUBLICATIONS

International Search Report issued in Intl. Appln. No. PCT/JP2018/038906 dated Jan. 15, 2019. English translation provided.

(Continued)

*Primary Examiner* — Clayton E. LaBalle
*Assistant Examiner* — Leon W Rhodes, Jr.
(74) *Attorney, Agent, or Firm* — Rossi, Kimms & McDowell LLP

(57) ABSTRACT

A mount adapter couples a camera body and an interchangeable lens without rattling. The mount adapter includes a fixed cylinder and a movable cylinder that engages with the fixed cylinder and is movable in an optical axis direction with respect to the fixed cylinder. The fixed cylinder has a first mount surface that comes into contact with the camera body and a second mount surface that comes into contact with the interchangeable lens. The movable cylinder has first mount claw portions that engage with mount claw portions of the camera body and second mount claw portions that engage with mount claw portions of the interchangeable lens.

22 Claims, 45 Drawing Sheets

(56) References Cited

U.S. PATENT DOCUMENTS 10,437,028 B2 * 10/2019 Ueki .................. G02B 7/02
2019/0265578 A1 * 8/2019 Miyao ................ G03B 17/14

FOREIGN PATENT DOCUMENTS

| JP | 08194249 A | * | 7/1996 |
| JP | 2013218149 A | | 10/2013 |
| JP | 2016191836 A | | 11/2016 |

OTHER PUBLICATIONS

Written Opinion issued in Intl. Appln. No. PCT/JP2018/038906 dated Jan. 15, 2019.

* cited by examiner

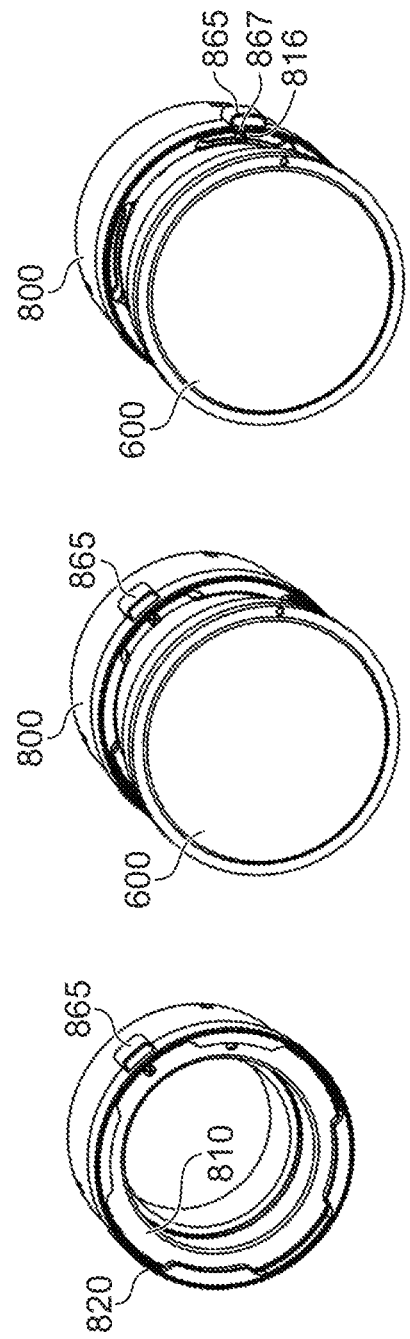

ADAPTER APPARATUS AND IMAGE PICKUP APPARATUS

CROSS-REFERENCE TO RELATED APPLICATIONS

This application is a Continuation of International Patent Application No. PCT/JP2018/038906, filed Oct. 12, 2018, which claims the benefit of Japanese Patent Application No. 2017-206350, filed Oct. 25, 2017, both of which are hereby incorporated by reference herein in their entirety.

BACKGROUND OF THE INVENTION

Field of the Invention

The present invention relates to an adapter apparatus coupled to an image pickup apparatus or an accessory for the image pickup apparatus, and the image pickup apparatus.

Background Art

There is known a so-called interchangeable lens type image pickup apparatus in which a camera accessory such as an interchangeable lens can be attached to and detached from an image pickup apparatus body (hereinafter, referred to as a "camera body") such as a digital camera. In the interchangeable lens type image pickup apparatus, a so-called bayonet coupling method in which both the camera body and the camera accessory include a bayonet coupling type mount is generally adopted. Normally, in the bayonet coupling method, a mount part of the camera accessory and a mount part of the camera body are relatively rotatable, and the rotation causes a claw portion of the camera accessory side and a claw portion of the camera body side to engage with each other in an optical axis direction. Then, in a state where the claw portions engage with each other, the claw portion of the camera accessory side is drawn into the camera body side in a direction substantially parallel to the optical axis direction by a force of a spring provided in the camera body. In this way, the camera body and the camera accessory are coupled to each other.

By adopting the bayonet coupling method, the camera accessory can be easily attached to and detached from the camera body. However, if a force stronger than the drawing force of the spring acts on the camera accessory, rattling may occur between the camera body and the camera accessory. Therefore, PTL 1 proposes a structure in which the bayonet coupling type mount provided in the camera body is divided into a fixed mount part and a movable mount part, and the camera accessory is drawn into the camera body by rotating the movable mount part with respect to the camera accessory. By adopting the above technology, it is possible to reduce the rattling occurring between the camera body and the camera accessory.

CITATION LIST

Patent Literature

PTL 1 Japanese Laid-Open Patent Publication (Kokai) No. 2013-218149

Regarding the interchangeable lens type image pickup apparatus, an adapter apparatus, which is disposed between the camera body and the camera accessory and couples the camera body and the camera accessory in order to enable use of the camera accessory that does not correspond to direct coupling to the camera body, is known. By using such adapter apparatus, for example, it is possible to mount an interchangeable lens corresponding to a camera body having a certain flange back to a camera body having another flange back. Further, as the adapter apparatus, an adapter apparatus that is disposed between the camera body and the camera accessory which can be directly coupled and that extends a function is known.

However, when the adapter apparatus is interposed between the camera body and the camera accessory adopting the bayonet coupling method, there are the following problems. For example, bayonet coupling is required at a total of two places including a coupling part of the camera body and one side of the adapter apparatus and a coupling part of the camera accessory and the other side of the adapter apparatus. Therefore, when the camera body and the camera accessory are coupled via the adapter apparatus, rattling of the camera accessory with respect to the camera body increases as compared with when the camera body and the camera accessory are directly coupled.

For the above problems, PTL 1 does not mention a configuration in which the adapter apparatus can be attached to or detached from the image pickup apparatus body. Therefore, in the technology described in PTL 1, when the camera body and the camera accessory are coupled using the adapter apparatus, it is considered that at least the rattling occurring between the adapter apparatus and the camera accessory cannot be effectively reduced.

SUMMARY OF THE INVENTION

The present invention provides an adapter apparatus which is capable of coupling a camera body and a camera accessory without rattling.

An adapter apparatus according to the present invention is an adapter apparatus, to and from which a first device and a second device are capable of being attached and detached, comprising a first cylinder, and a second cylinder engaging with the first cylinder and movable in an axial direction of the first cylinder with respect to the first cylinder, wherein the first cylinder includes a first surface that comes into contact with the first device and a second surface that comes into contact with the second device, and the second cylinder includes a first claw portion that engages with a claw portion provided in the first device and a second claw portion that engages with a claw portion provided in the second device.

Further features of the present invention will become apparent from the following description of exemplary embodiments with reference to the attached drawings.

BRIEF DESCRIPTION OF THE DRAWINGS

FIG. 16A is a perspective view showing a process of coupling the interchangeable lens to the mount adapter.

FIG. 16B is a perspective view showing the process of coupling the interchangeable lens to the mount adapter.

FIG. 16C is a perspective view showing the process of coupling the interchangeable lens to the mount adapter.

DESCRIPTION OF THE EMBODIMENTS

Hereinafter, embodiments of the present invention will be described in detail with reference to the accompanying drawings. In the following embodiments, an apparatus provided with at least a "camera body (image pickup apparatus body)" and an "interchangeable lens (lens barrel)" will be referred to as an "image pickup apparatus".

First Embodiment

Figure 1A:
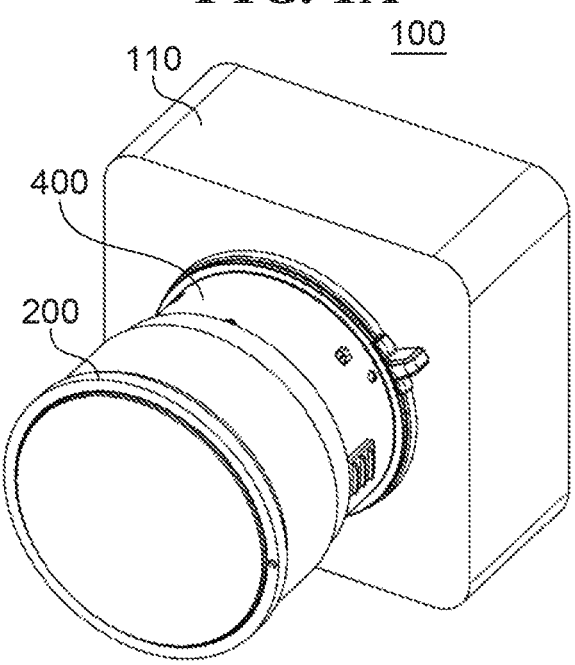
FIG. 1A is an external perspective view of an image pickup apparatus according to a first embodiment of the present invention.
Figure 1B:
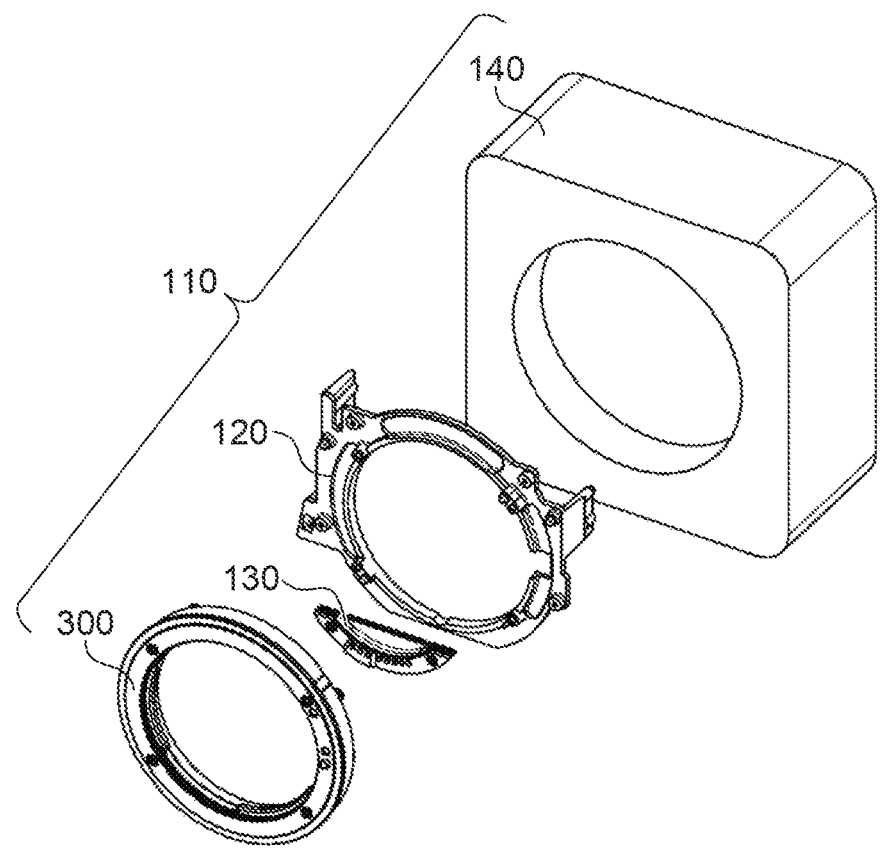
FIG. 1B is an exploded perspective view of the image pickup apparatus according to the first embodiment of the present invention.

FIG. 1A is an external perspective view of an image pickup apparatus 100 according to a first embodiment of the present invention. FIG. 1B is an exploded perspective view showing a schematic configuration of a camera body 110 as an image pickup apparatus body configuring the image pickup apparatus 100. The image pickup apparatus 100 includes the camera body 110, a mount adapter 400, and an interchangeable lens 200. The camera body 110 as a first device and the interchangeable lens 200 as a second device can be coupled via the mount adapter 400 as an adapter apparatus.

The camera body 110, which is the image pickup apparatus body, includes a casing 140, a fixing member 120, an electric contact member 130, and a lens mount 300. An image pickup device (not shown) such as a CMOS sensor is provided in the casing 140, which is an exterior part of the camera body 110. The fixing member 120 is fixed to the casing 140, and the electric contact member 130 and the lens mount 300 are fixed to the fixing member 120.

Figure 2:
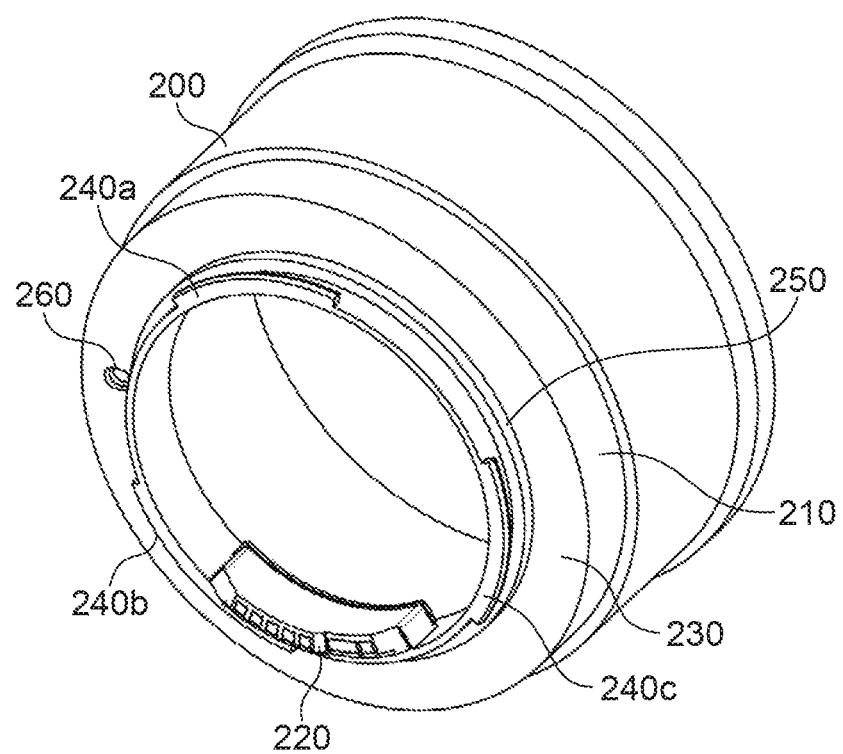
FIG. 2 is a perspective view of an interchangeable lens when viewed from a rear side.

FIG. 2 is a perspective view of the interchangeable lens 200 when viewed from a rear side. The interchangeable lens 200, which is an example of a camera accessory, includes a mount part 210 and an electric contact 220. The mount part 210 includes a mount surface 230 (lens-side mount surface), mount claw portion 240a to 240c (lens-side mount claw portions), a cylindrical shaft part 250, and a rotation stopping concave part 260.

Figure 3A:
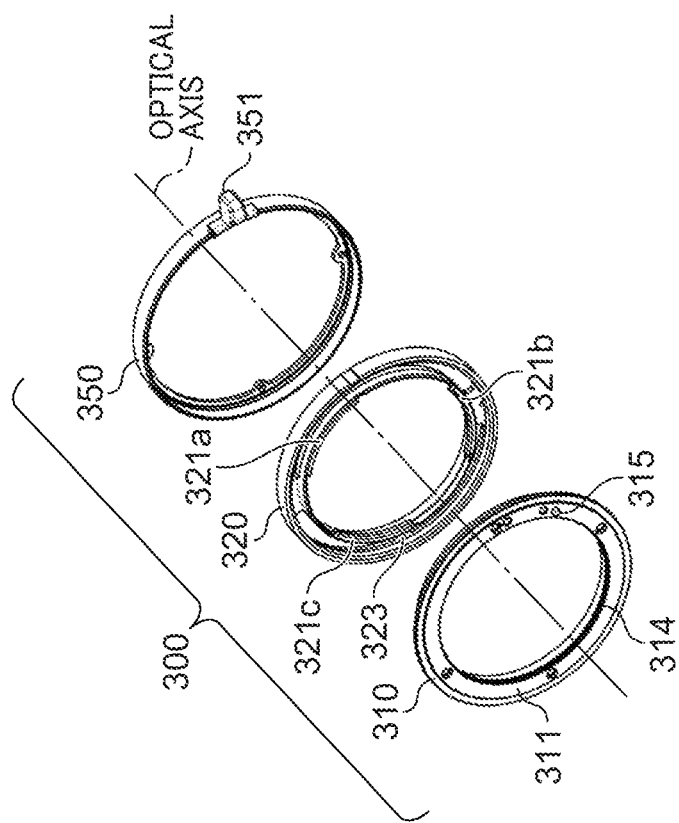
FIG. 3A is an exploded perspective view of a lens mount.
Figure 3B:
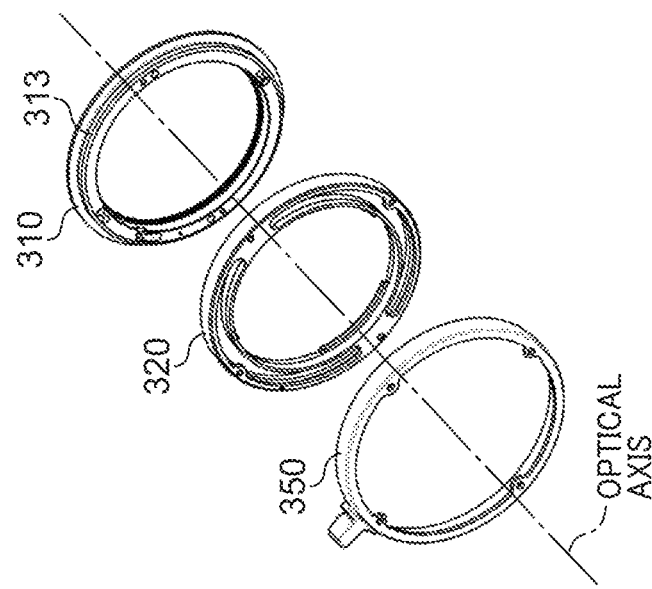
FIG. 3B is an exploded perspective view of the lens mount.

FIGS. 3A and 3B are exploded perspective views of the lens mount 300. A difference between FIGS. 3A and 3B is a difference in direction in which the lens mount 300 is viewed. The lens mount 300 includes a fixed mount member 310, a movable mount member 320, and an operation member 350. The fixed mount member 310 includes a mount surface 311 (body-side mount surface), a male screw part 313, a cylindrical hole part 314, and a rotation stopping convex part 315. The fixed mount member 310 is fixed to the fixing member 120 (see FIG. 1B). The movable mount member 320 includes mount claw portions 321a to 321c (body-side mount claw portions) and a female screw part 323. The female screw part 323 is screwed with the male screw part 313 of the fixed mount member 310. The operation member 350 includes a knob part 351, and is fixed to the movable mount member 320. By rotating the knob part 351, the movable mount member 320 can be rotated relatively to the fixed mount member 310.

Figure 4A:
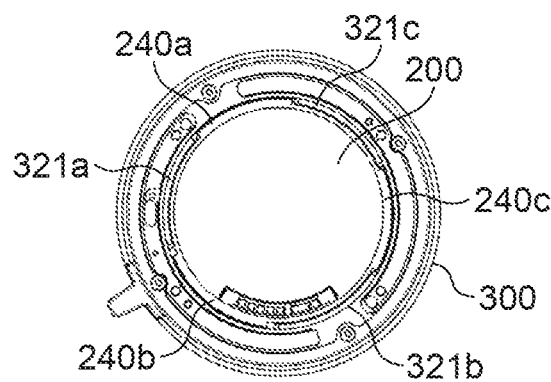
FIG. 4A is a rear view showing a process of attaching an interchangeable lens to the lens mount.
Figure 4B:
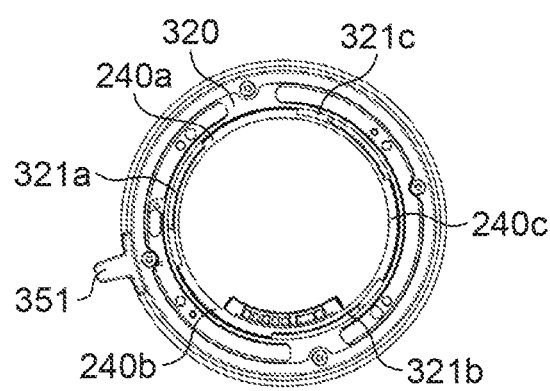
FIG. 4B is a rear view showing the process of attaching the interchangeable lens to the lens mount.
Figure 4C:
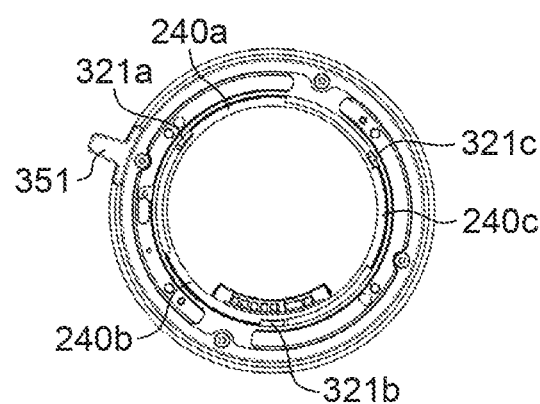
FIG. 4C is a rear view showing the process of attaching the interchangeable lens to the lens mount.
Figure 5A:
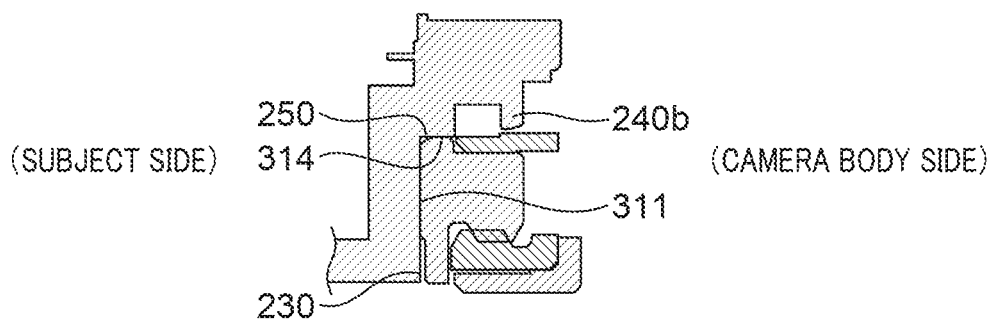
FIG. 5A is a cross-sectional view corresponding to FIG. 4A.
Figure 5B:
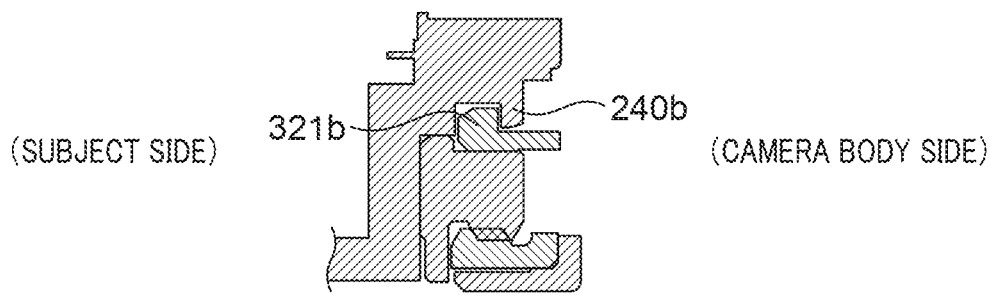
FIG. 5B is a cross-sectional view corresponding to FIG. 4B.
Figure 5C:
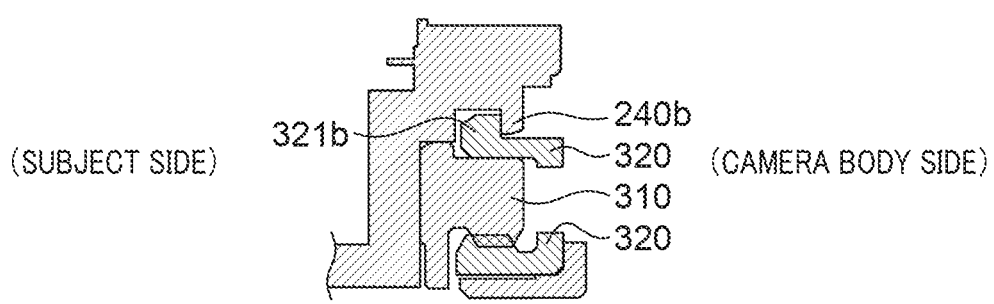
FIG. 5C is a cross-sectional view corresponding to FIG. 4C.

First, a form in which the interchangeable lens 200 is directly coupled to the camera body 110 will be described. FIGS. 4A to 4C are rear views (views from the camera body 110 side) showing a process of coupling the interchangeable lens 200 to the lens mount 300. FIGS. 5A to 5C are cross-sectional views respectively corresponding to FIGS. 4A to 4C, and show cross sections including an optical axis.

FIGS. 4A and 5A show a state where the interchangeable lens 200 has been brought in contact with the lens mount 300. In this state, the rotation stopping convex part 315 of the lens mount 300 engages with the rotation stopping concave part 260 of the interchangeable lens 200, and the cylindrical shaft part 250 of the interchangeable lens 200 and the cylindrical hole part 314 of the lens mount 300 engage with each other. Further, the mount surface 230 of the interchangeable lens 200 and the mount surface 311 of the lens mount 300 come into contact with each other, wherein the mount claw portions 240a to 240c of the interchangeable lens 200 and the mount claw portions 321a to 321c of the lens mount 300 do not overlap on optical axis projection.

FIGS. 4B and 5B show a state (intermediate state) in which the interchangeable lens 200 is being coupled to the lens mount 300. The knob part 351 of the lens mount 300 is rotated clockwise around the optical axis when viewed from the rear side of the lens mount 300 (the coupling surface with the camera body 110 side), whereby the movable mount member 320 of the lens mount 300 rotates around the optical axis. At the same time, the movable mount member 320 of the lens mount 300 moves in the optical axis direction toward the rear side. As a result, the mount claw portions 240a to 240c of the interchangeable lens 200 and the mount claw portions 321a to 321c of the lens mount 300 begin to overlap on the optical axis projection. At this time, as shown in FIG. 5B, there is a gap between the mount claw portion 321b of the lens mount 300 and the mount claw portion 240b of the interchangeable lens 200. Similarly, there are gaps between the mount claw portion 321a and the mount claw portion 240a and between the mount claw portion 321c and the mount claw portion 240c. Therefore, in the state shown in FIGS. 4B and 5B, rattling exists between the interchangeable lens 200 and the lens mount 300 by a size of the gap.

FIGS. 4C and 5C show a state where coupling between the interchangeable lens 200 and the lens mount 300 has been completed. From the state of FIGS. 4B and 5B, the knob part 351 of the lens mount 300 is further rotated clockwise around the optical axis when viewed from the rear side of the lens mount 300. As a result, as shown in FIG. 5C, the mount claw portion 321b of the lens mount 300 and the mount claw portion 240b of the interchangeable lens 200 engage with each other. Similarly, the mount claw portion 321a and the mount claw portion 240a engage with each other, and the mount claw portion 321c and the mount claw portion 240c engage with each other. Therefore, the state becomes a state where there is no gap between the mount claw portions 321a to 321c and the mount claw portions 240a to 240c. That is, the interchangeable lens 200 is drawn toward the camera body 110 side using a screw fastening force generated by rotating the movable mount member 320 with respect to the fixed mount member 310. In this way, the interchangeable lens 200 is coupled to the lens mount 300 without rattling.

Since there is no rattling between the interchangeable lens 200 and the lens mount 300, a sense of unity can be obtained between the interchangeable lens 200 and the camera body 110, and the image pickup apparatus 100 can be integrated. As a result, a photographer can operate the image pickup apparatus 100 without feeling a sense of incompatibility. It should be noted that the above-described structure in which the members are coupled without rattling by rotating the movable mount member 320 in the first embodiment is referred to as a "screw type mount" in the following description.

Figure 6A:
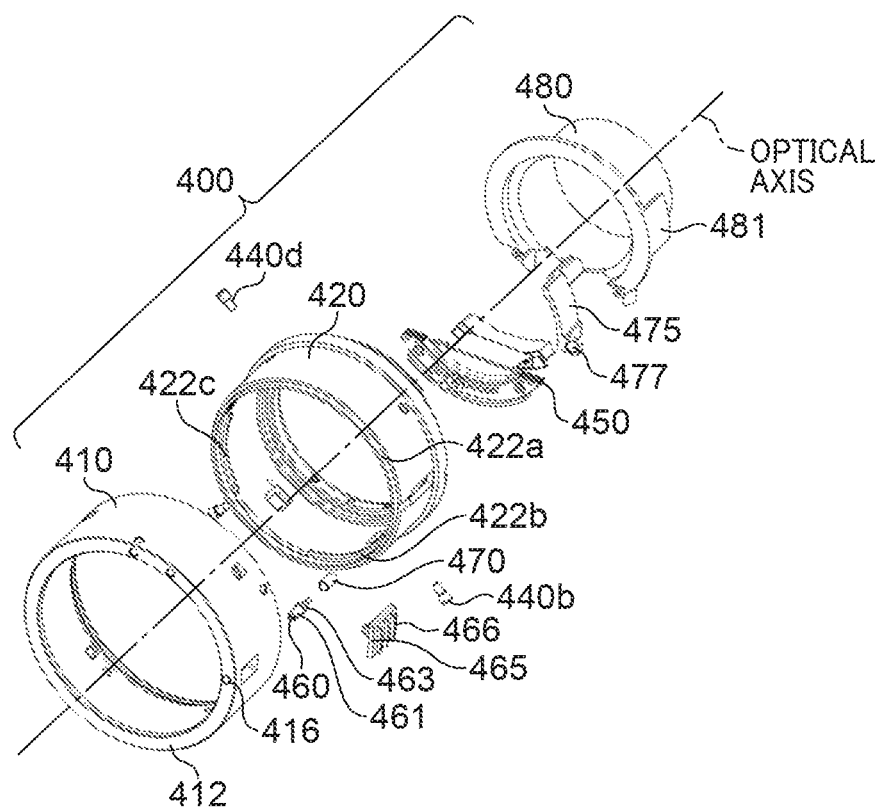
FIG. 6A is an exploded perspective view of a mount adapter.
Figure 6B:
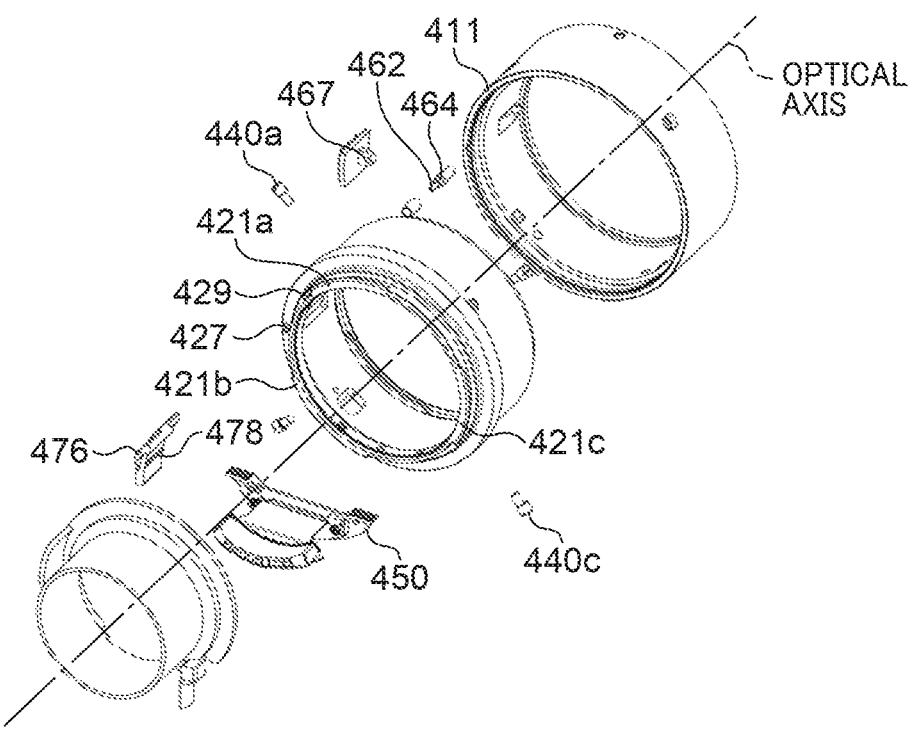
FIG. 6B is an exploded perspective view of the mount adapter.
Figure 7A:
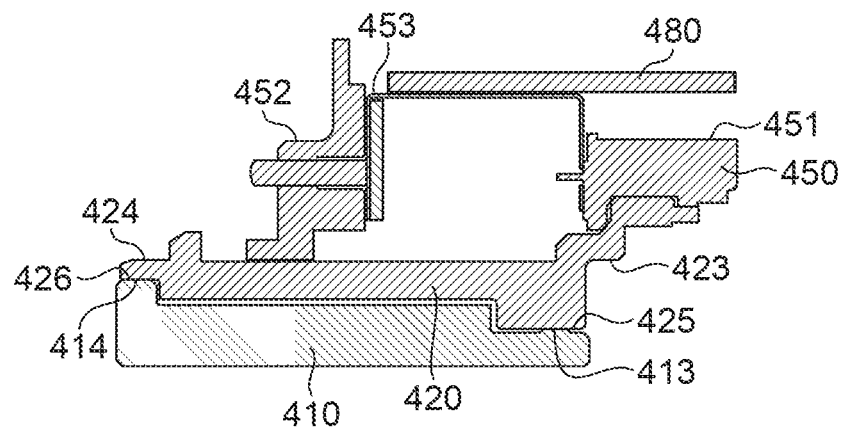
FIG. 7A is a cross-sectional view of the mount adapter.
Figure 7B:
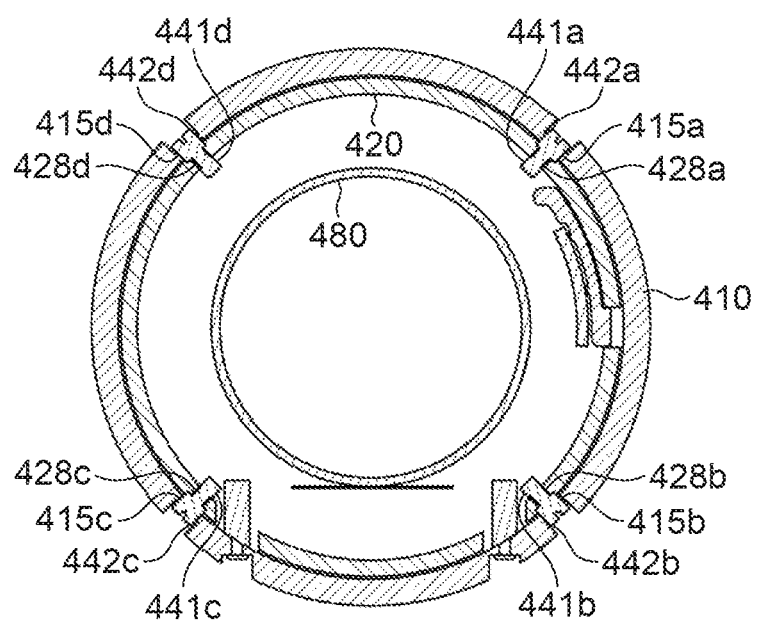
FIG. 7B is a cross-sectional view of the mount adapter.

Next, a form in which the interchangeable lens 200 is indirectly coupled to the camera body 110 via the mount adapter 400 as the adapter apparatus will be described. FIGS. 6A and 6B are exploded perspective views of the mount adapter 400. It should be noted that a difference between FIGS. 6A and 6B is a difference in direction in which the mount adapter 400 is viewed. FIGS. 7A and 7B are cross-sectional views of the mount adapter 400. FIG. 7A is a cross-sectional view taken along a plane including the optical axis. FIG. 7B is a cross-sectional view taken along a plane including guide pins 440a to 440d described later and orthogonal to the optical axis. It should be noted that the optical axis of the mount adapter 400 is a center axis passing through substantially the center of the opening of the mount adapter 400 and is an axis parallel to an optical axis of an optical system provided in the interchangeable lens 200 when the interchangeable lens 200 is mounted on the mount adapter 400. Hereinafter, in the description of each embodiment of the present invention, it is assumed that an axis (center axis) of the mount adapter is matched with an optical axis of the interchangeable lens when the interchangeable lens is mounted on the mount adapter.

The mount adapter 400 includes a fixed cylinder 410, a movable cylinder 420, guide pins 440a to 440d, an electric contact member 450, a rotation stopping member 460, an operation member 465, a biasing member 470, a restricting member 475, and a protection member 480. The fixed cylinder 410 (first cylinder) includes a first mount surface 411 (first surface), a second mount surface 412 (second surface), a first engagement hole part 413, a second engagement hole part 414, guide holes 415a to 415d, and a rotation stopping hole part 416.

The movable cylinder 420 (second cylinder) includes first mount claw portions 421a to 421c, second mount claw portions 422a to 422c, a cylindrical shaft part 423, and a cylindrical hole part 424. Further, the movable cylinder 420 includes a first engagement shaft part 425, a second engagement shaft part 426, a rotation stopping concave part 427, screw hole parts 428a to 428d, and a notch hole part 429. The first engagement shaft part 425 engages with the first engagement hole part 413 of the fixed cylinder 410, and the second engagement shaft part 426 engages with the second engagement hole part 414 of the fixed cylinder 410. It should be noted that the first mount claw portions 421a to 421c and the second mount claw portions 422a to 422c may be provided separately from the movable cylinder 420 and may be mechanically fixed to the movable cylinder 420. In other words, the configuration of the movable cylinder 420 described above is not limited to a configuration in which each part is integrally formed as long as the configuration is a configuration in which each part can rotate integrally with the claw portion and the movable part.

The guide pins 440a to 440d include screw parts 441a to 441d and contact parts 442a to 442d, respectively. The screw parts 441a to 441d are fastened to the screw hole parts 428a to 428d of the movable cylinder 420, respectively. The contact parts 442a to 442d engage with the guide holes 415a to 415d of the fixed cylinder 410, respectively. The movable cylinder 420 is movable in the optical axis direction with respect to the fixed cylinder 410, wherein the contact parts 442a to 442d come in contact with surfaces of the guide holes 415a to 415d orthogonal to the optical axis, so that the movable cylinder 420 is prevented from falling off the fixed cylinder 410 in the optical axis direction. In addition, the contact parts 442a to 442d come into contact with the surfaces of the guide holes 415a to 415d parallel to the optical axis, so that the movable cylinder 420 is prevented from rotating around the optical axis with respect to the fixed cylinder 410.

The electric contact member 450 includes a first electric contact 451, a second electric contact 452, and an electric wiring part 453, wherein the first electric contact 451 and the second electric contact 452 are electrically connected via the electric wiring part 453. The first electric contact 451 is fixed to the movable cylinder 420. The rotation stopping member 460 includes a first convex part 461, a second convex part 462, a flange part 463, and a male screw part 464. The first convex part 461 engages with the rotation stopping hole part 416 of the fixed cylinder 410. The operation member 465 includes an operation part 466 and a female screw part 467. The female screw part 467 is screwed with the male screw part 464 of the rotation stopping member 460.

The biasing member 470 is a compression spring. The biasing member 470 engages with the second convex part 462 of the rotation stopping member 460 and biases the rotation stopping member 460 in a direction to which the rotation stopping member 460 is protruded from the second mount surface 412. The restricting member 475 includes a convex part 476 (first contact part), a contact surface 477 (second contact part), and a sliding part 478. The convex part 476 engages with the notch hole part 429 of the movable cylinder 420. The protection member 480 includes a sliding surface 481. The protection member 480 is fixed to the fixed cylinder 410, and the second electric contact 452 is fixed to the protection member 480. The sliding surface 481 slides on the sliding part 478 of the restricting member 475.

Figure 8A:
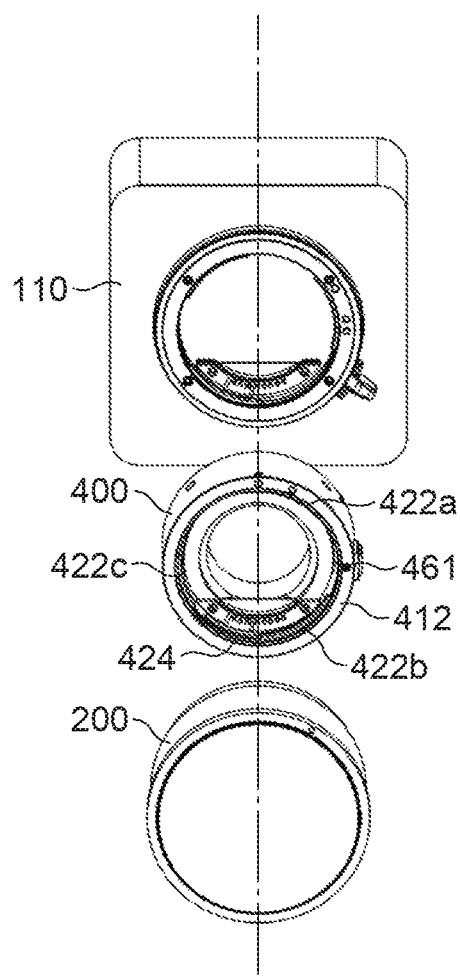
FIG. 8A is an exploded perspective view showing an arrangement before attaching the interchangeable lens to a camera body via the mount adapter.
Figure 8B:
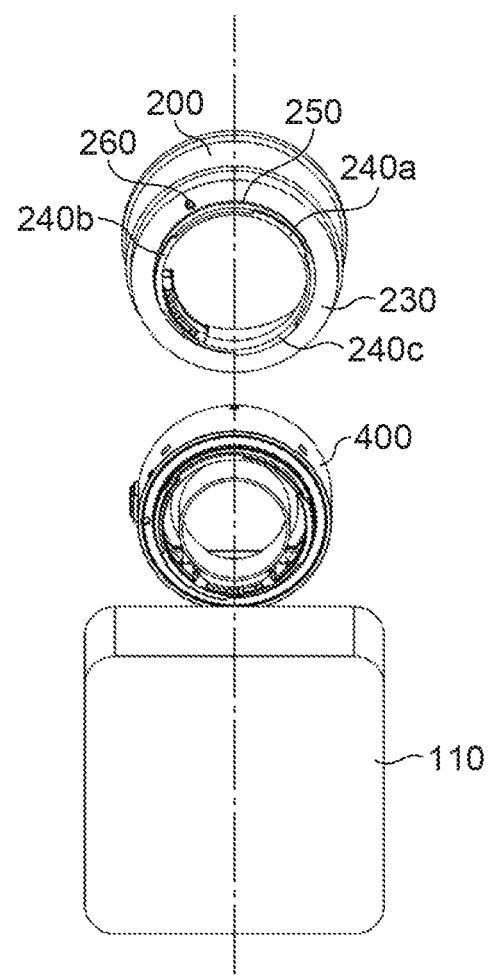
FIG. 8B is an exploded perspective view showing the arrangement before attaching the interchangeable lens to the camera body via the mount adapter.

Next, a form of coupling between the mount adapter 400 and the interchangeable lens 200 will be described. FIGS. 8A and 8B are exploded perspective views showing an arrangement before coupling the interchangeable lens 200 to the camera body 110 via the mount adapter 400. A difference between FIGS. 8A and 8B is a difference in direction in which the mount adapter 400 is viewed.

Figure 9A:
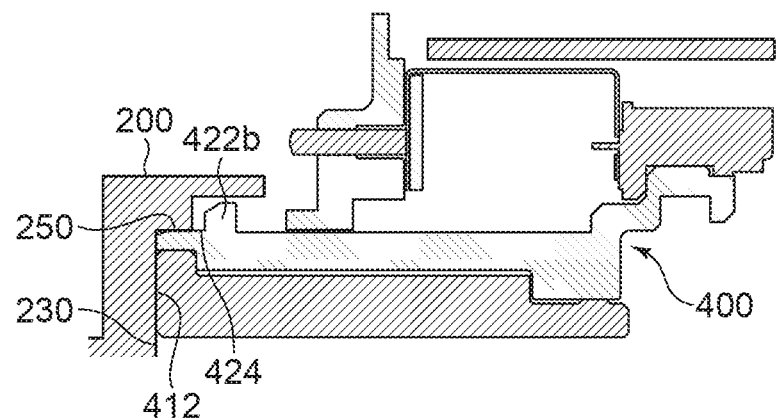
FIG. 9A is a cross-sectional view showing a process of attaching the interchangeable lens to the mount adapter.
Figure 9B:
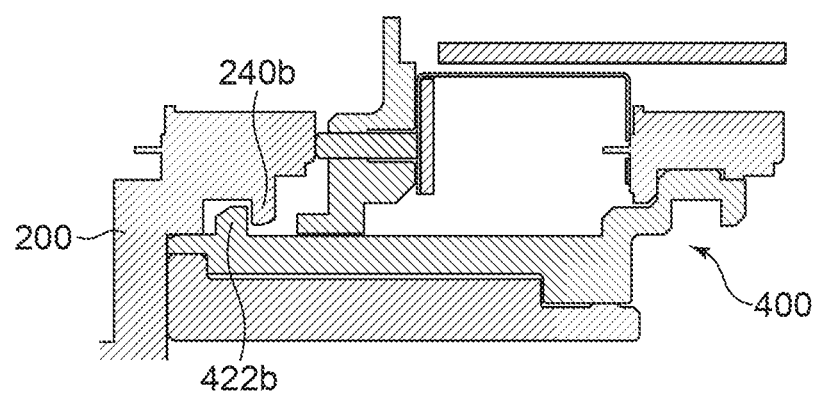
FIG. 9B is a cross-sectional view showing the process of attaching the interchangeable lens to the mount adapter.

FIGS. 9A and 9B are cross-sectional views showing a process of coupling the interchangeable lens 200 to the mount adapter 400. FIG. 9A shows a state where the interchangeable lens 200 has been brought into contact with the mount adapter 400. The mount claw portion 240a of the interchangeable lens 200 is fitted between the second mount claw portions 422a and 422c of the mount adapter 400. Subsequently, the cylindrical shaft part 250 of the interchangeable lens 200 and the cylindrical hole part 424 of the mount adapter 400 are engaged with each other. Then, the mount surface 230 of the interchangeable lens 200 and the second mount surface 412 of the mount adapter 400 are brought into contact with each other. At this time, a tip of the first convex part 461 of the rotation stopping member 460 of the mount adapter 400 is pressed by the mount surface 230 toward the second mount surface 412 in the optical axis direction. In this state, the mount claw portions 240a to 240c of the interchangeable lens 200 and the second mount claw portions 422a to 422c of the mount adapter 400 do not overlap on the optical axis projection.

FIG. 9B shows a state where coupling between the mount adapter 400 and the interchangeable lens 200 has been completed. FIG. 9B shows a state where the interchangeable lens 200 has been rotated by a predetermined angle clockwise around the optical axis when viewed from the front of the mount adapter 400 (the interchangeable lens 200 side) with respect to the mount adapter 400, from the state of FIG. 9A. In the state of FIG. 9B, the first convex part 461 of the mount adapter 400 engages with the rotation stopping concave part 260 of the interchangeable lens 200. Since the mount claw portions 240a to 240c of the interchangeable lens 200 and the second mount claw portions 422a to 422c of the mount adapter 400 overlap on the optical axis projection, the interchangeable lens 200 is held by the mount adapter 400. However, as shown in FIG. 9B, there are gaps in the optical axis direction between the mount claw portions 240a to 240c and the second mount claw portions 422a to 422c, and rattling occurs between the interchangeable lens 200 and the mount adapter 400 by a size of the gap. It should be noted that the above-described structure in which the members are coupled with rattling by rotating the interchangeable lens 200 is referred to as a "bayonet type mount" in the following description.

In the present embodiment, when the mount adapter 400 is coupled to the camera body 110 in a state where rattling occurs between the interchangeable lens 200 and the mount adapter 400, the rattling between the interchangeable lens 200 and the mount adapter 400 is eliminated. Subsequently, a form of coupling between the camera body 110 and the mount adapter 400 to which the interchangeable lens 200 has been coupled as described above will be described.

Figure 10A:
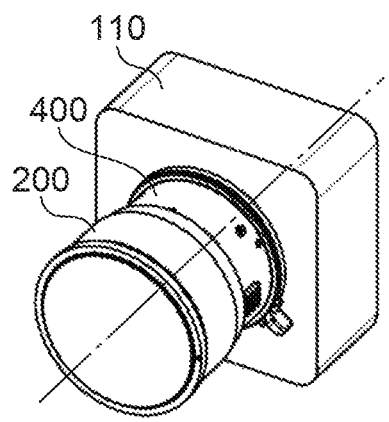
FIG. 10A is a perspective view showing a process of mounting the mount adapter, to which the interchangeable lens has been coupled, to the camera body.
Figure 10B:
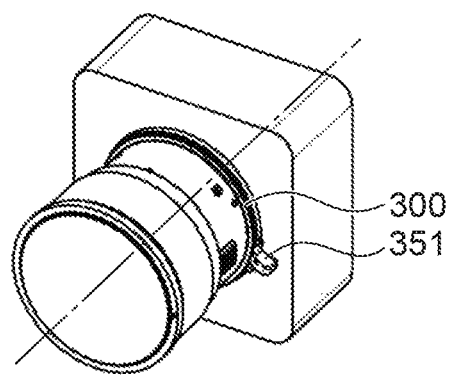
FIG. 10B is a perspective view showing the process of mounting the mount adapter, to which the interchangeable lens has been coupled, to the camera body.
Figure 10C:
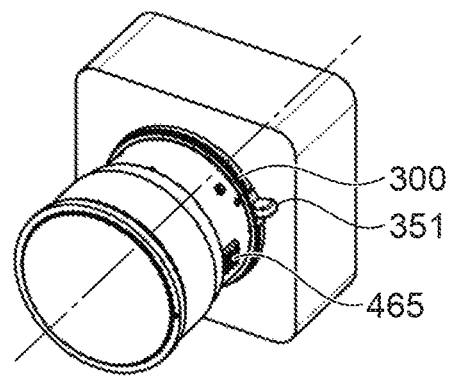
FIG. 10C is a perspective view showing the process of mounting the mount adapter, to which the interchangeable lens has been coupled, to the camera body.
Figure 11A:
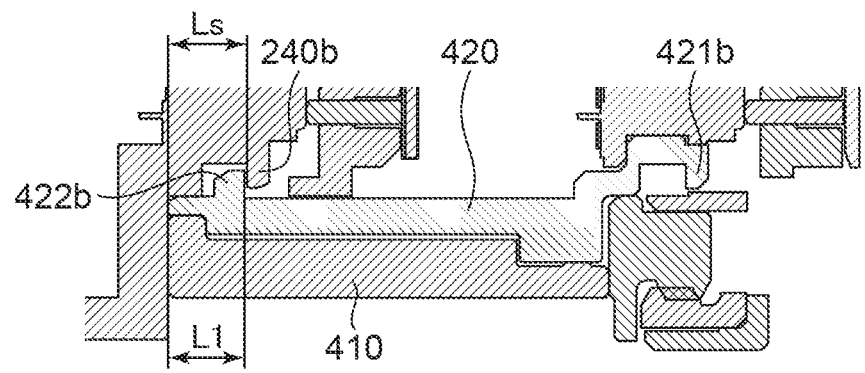
FIG. 11A is a cross-sectional view taken along a plane including an optical axis, corresponding to FIG. 10A.
Figure 11B:
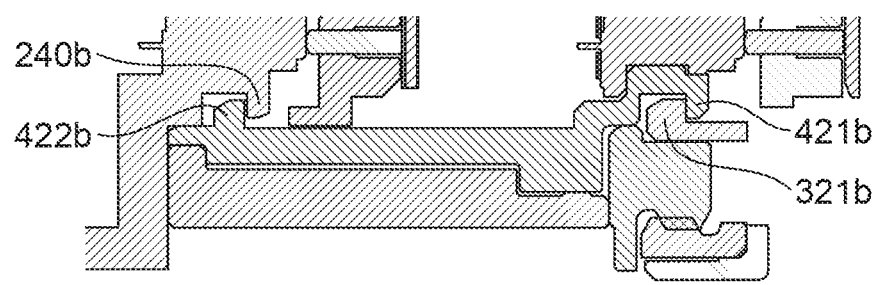
FIG. 11B is a cross-sectional view taken along the plane including the optical axis, corresponding to FIG. 10B.
Figure 11C:
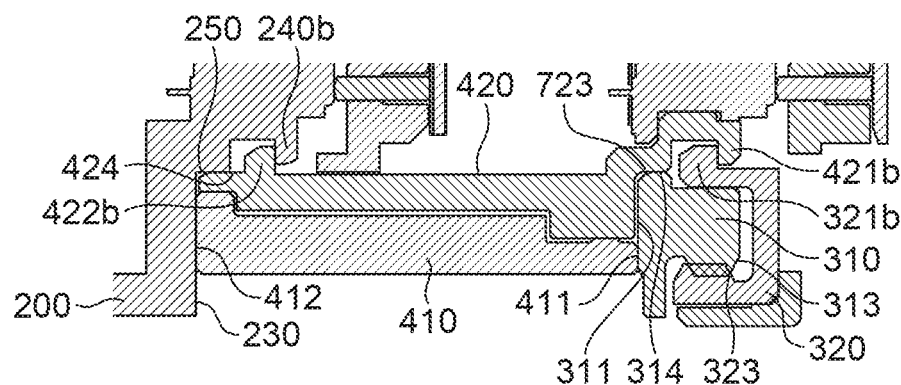
FIG. 11C is a cross-sectional view taken along the plane including the optical axis, corresponding to FIG. 10C.

FIGS. 10A to 10C are perspective views showing a process of coupling the mount adapter 400, to which the interchangeable lens 200 has been coupled, to the camera body 110. FIGS. 11A to 11C are cross-sectional views taken along a plane including an optical axis, respectively corresponding to FIGS. 10A to 10C. The mount adapter 400 is attached to and detached from the camera body 110 by the screw type mount described above.

FIGS. 10A and 11A show a state where the mount adapter 400 to which the interchangeable lens 200 has been coupled is brought into contact with the camera body 110. In this state, as described above, the gaps are generated in the optical axis direction between the second mount claw portions 422a to 422c of the movable cylinder 420 of the mount adapter 400 and the mount claw portions 240a to 240c of the interchangeable lens 200. Therefore, in the mount adapter 400, the second mount claw portions 422a to 422c are movable in the optical axis direction with respect to the fixed cylinder 410.

FIGS. 10B and 11B show a state where the mount adapter 400 to which the interchangeable lens 200 has been coupled is being coupled to the camera body 110. The knob part 351 of the lens mount 300 is rotated counterclockwise around the optical axis when viewed from the front side (interchangeable lens 200 side) of the lens mount 300. As a result, as shown in FIG. 11B, the mount claw portion 321b of the lens mount 300 and the first mount claw portion 421b provided at one end of the movable cylinder 420 of the mount adapter 400 engage with each other. Similarly, the mount claw portions 321a and 321c engage with the first mount claw portions 421a and 421c, respectively. At this time, there are still gaps in the optical axis direction between the second mount claw portions 422a to 422c provided at the other end of the movable cylinder 420 of the mount adapter 400 and the mount claw portions 240a to 240c of the interchangeable lens 200. Therefore, the second mount claw portions 422a to 422c of the movable cylinder 420 are movable in the optical axis direction with respect to the fixed cylinder 410. This means that there are gaps between the mount claw portions 321a to 321c of the lens mount 300 and the first mount claw portions 421a to 421c of the mount adapter 400. That is, in the state of FIGS. 10B and 11B, rattling occurs between the interchangeable lens 200 and the mount adapter 400 and between the mount adapter 400 and the camera body 110.

FIGS. 10C and 11C show a state where coupling between the camera body 110 and the mount adapter 400 to which the interchangeable lens 200 has been coupled has been completed. The knob part 351 is further rotated counterclockwise around the optical axis when viewed from the interchangeable lens 200 side. Then, the movable cylinder 420 of the mount adapter 400 is drawn into the side of the camera body 110, and the mount claw portions 240a to 240c and the second mount claw portions 422a to 422c are brought into pressure contact and engaged with each other (hereinafter, referred to as "pressure contact engagement").

By the fastening force of the mount adapter 400 generated in this way, the following first to fifth parts are subjected to pressure contact. The first part is a contact part between the mount surface 311 of the fixed mount member 310 of the lens mount 300 and the first mount surface 411 of the fixed cylinder 410 of the mount adapter 400. The second part is a contact part between the second mount surface 412 of the fixed cylinder 410 of the mount adapter 400 and the mount surface 230 of the interchangeable lens 200. The third part is an engagement part between the mount claw portion 240b of the interchangeable lens 200 and the second mount claw portion 422b of the movable cylinder 420 of the mount adapter 400. The fourth part is an engagement part between the first mount claw portion 421b of the movable cylinder 420 of the mount adapter 400 and the mount claw portion 321b of the movable mount member 320 of the lens mount 300. The fifth part is a screwing part between the female screw part 323 of the movable mount member 320 and the male screw part 313 of the fixed mount member 310 in the lens mount 300.

That is, considering the mount surface 311 of the fixed mount member 310 as a reference, the mount claw portions 321a to 321c of the movable mount member 320 draw the first mount claw portions 421a to 421c of the movable cylinder 420 toward the camera body 110 side. Accompanying this, the second mount claw portions 422a to 422c of the movable cylinder 420 draw the mount claw portions 240a to 240c of the interchangeable lens 200 toward the camera body 110 side. At this time, the fixed cylinder 410 functions as a spacer between the interchangeable lens 200 and the camera body 110. In this way, the screw fastening force generated by rotating the movable mount member 320 with respect to the fixed mount member 310 is transmitted to the interchangeable lens 200 via the mount adapter 400. As a result, the camera body 110, the mount adapter 400, and the interchangeable lens 200 are coupled without rattling.

The mount adapter 400 has not only a feature of eliminating rattling between the coupled devices but also has a feature that the number of components requiring precision is small. These features will be described below.

Light incident from the interchangeable lens 200 passes through the mount adapter 400 and forms an image on an image pickup device (not shown) provided in the camera body 110. At this time, if a distance in the optical axis direction from the image pickup device to the interchangeable lens 200 varies, the image may be formed on the image pickup device with insufficient optical performance of the interchangeable lens 200, and a desired image may not be obtained. A length of the mount adapter 400 in the optical axis direction affects the distance in the optical axis direction. Here, a connection surface to the mount adapter 400 is the mount surface 311 of the lens mount 300 in the camera body 110 and the mount surface 230 in the interchangeable lens 200. The component interposed between the mount surface 311 and the mount surface 230 is only the fixed cylinder 410. Therefore, since the distance in the optical axis direction from the camera body 110 to the interchangeable lens 200 depends only on the fixed cylinder 410, the number of components requiring precision can be suppressed by using the mount adapter 400. Further, only the distance from the first mount surface 411 to the second mount surface 412 of the fixed cylinder 410 affects the distance in the optical axis direction, so that the number of parts requiring precision can be reduced. In this way, in the mount adapter 400, the distance in the optical axis direction hardly varies between the components, and quality control is facilitated.

If the optical axis of the interchangeable lens 200 and the optical axis of the camera body 110 deviate from each other, an image forming range of the interchangeable lens 200 is not matched with an image forming range of the camera body 110, and so-called vignetting may occur in a shot image. Therefore, the optical axis of the interchangeable lens 200 and the optical axis of the camera body 110 are preferably on the same line. Among the connection surfaces to the mount adapter 400, the cylindrical hole part 314 in the camera body 110 and the cylindrical shaft part 250 in the interchangeable lens 200 affect the deviation of the optical axis. In the mount adapter 400, the part interposed between the cylindrical hole part 314 and the cylindrical shaft part 250 is only the movable cylinder 420, that is, the deviation between the optical axis of the interchangeable lens 200 and the optical axis of the camera body 110 depends only on the movable cylinder 420. Therefore, it is possible to suppress the number of components requiring precision. Further, only the coaxiality of the cylindrical shaft part 423 engaging with the cylindrical hole part 314 of the movable cylinder 420 and the cylindrical hole part 424 engaging with the cylindrical shaft part 250 affects the deviation between the optical axis of the interchangeable lens 200 and the optical axis of the camera body 110. Therefore, it is possible to reduce the number of parts requiring precision in the movable cylinder 420. As described above, in the mount adapter 400, the deviation of the optical axis hardly varies between the components, and quality control is facilitated.

These obtained effects make it possible, when the mount adapter 400 plays a role of expanding optical functions in addition to a role of coupling the interchangeable lens 200 and the camera body 110, to sufficiently exhibit the functions. These effects can be obtained similarly in the second to sixth embodiments described later.

Subsequently, prevention of an erroneous operation at the mount adapter 400 will be described. It is assumed that an attempt is made to remove the interchangeable lens 200 in a state where the camera body 110, the mount adapter 400, and the interchangeable lens 200 are coupled as shown in FIGS. 10C and 11C. In this case, the mount claw portions 240a to 240c of the interchangeable lens 200 and the second mount claw portions 422a to 422c of the mount adapter 400 may be worn, and durability performance may be degraded. Therefore, it is necessary to couple the mount adapter 400 and the interchangeable lens 200 before coupling the mount adapter 400 and the camera body 110. Further, it is necessary to release coupling between the mount adapter 400 and the camera body 110 before releasing coupling between the mount adapter 400 and the interchangeable lens 200. That is, it is necessary to operate the screw type mount of the lens mount 300 last at the time of coupling and first at the time of releasing coupling, and it is necessary to prompt a user to perform such an operation procedure.

Therefore, the following configuration is applied to the mount adapter 400. That is, when the interchangeable lens 200 is being coupled by the bayonet type mount in a state where the camera body 110 and the mount adapter 400 are coupled by the screw type mount, the movable cylinder 420 of the mount adapter 400 is already drawn toward the camera body 110 side by the screw type mount. For this reason, a distance Ls from the mount surface 230 to the mount claw portions 240a to 240c shown in FIG. 11A is shorter than a distance L1 from the second mount surface 412 to the second mount claw portions 422a to 422c also shown in FIG. 11A. Therefore, when an attempt is made to rotate the interchangeable lens 200 brought into contact with the mount adapter 400, the ends of the mount claw portions 240a to 240c come into contact with the ends of the second mount claw portions 422a to 422c, and the interchangeable lens 200 cannot be rotated. In this way, in a state where the mount adapter 400 is coupled to the camera body 110, the interchangeable lens 200 cannot be coupled to the mount adapter 400, and as a result, it is possible to prompt the user to perform operations in the correct order.

Figure 12:
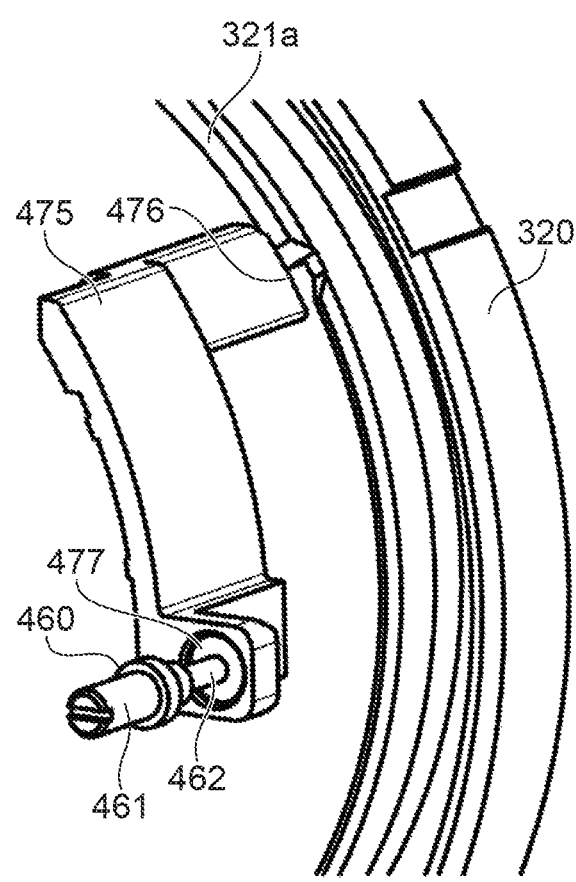
FIG. 12 is a perspective view for explaining main components for preventing an erroneous operation in the mount adapter.

FIG. 12 is a perspective view in which main components for preventing an erroneous operation in the mount adapter 400 are extracted. An erroneous operation preventing mechanism includes the movable mount member 320, the restricting member 475, and the rotation stopping member 460. For example, it is assumed that an attempt is made to remove the interchangeable lens 200 in a state where the camera body 110 and the interchangeable lens 200 are normally coupled via the mount adapter 400. However, the mount claw portion 321a of the lens mount 300 presses the convex part 476 of the restricting member 475 toward the interchangeable lens 200, and the contact surface 477 of the restricting member 475 comes into contact with the tip of the second convex part 462 of the rotation stopping member 460. Therefore, since the rotation stopping member 460 cannot be pressed against the second mount surface 412 of the mount adapter 400, the operation member 465 (see FIG. 10C) cannot also be operated.

In order to remove the interchangeable lens 200 from the mount adapter 400, it is necessary to operate the operation member 465 to release the engagement between the rotation stopping concave part 260 (see FIG. 8B) and the first convex part 461. With the above-mentioned structure, it is possible to prevent the interchangeable lens 200 from being removed from the mount adapter 400, in a state where the camera body 110 and the mount adapter 400 are coupled. As a result, it is possible to prompt the user to perform operations in the correct order.

In the present embodiment, the configuration has been described in which the interchangeable lens 200 is coupled to the camera body 110 via the mount adapter 400 without rattling, by the screw type mount provided in the camera body 110 (lens mount 300). However, the screw type mount does not necessarily need to be provided in the camera body 110, and may be provided in the interchangeable lens 200. Further, the screw type mount is not limited to being provided for only one of the mount adapter 400, the interchangeable lens 200, and the camera body 110. For example, the screw type mounts may be provided on both the interchangeable lens 200 and the camera body 110.

Second Embodiment

Figure 13A:
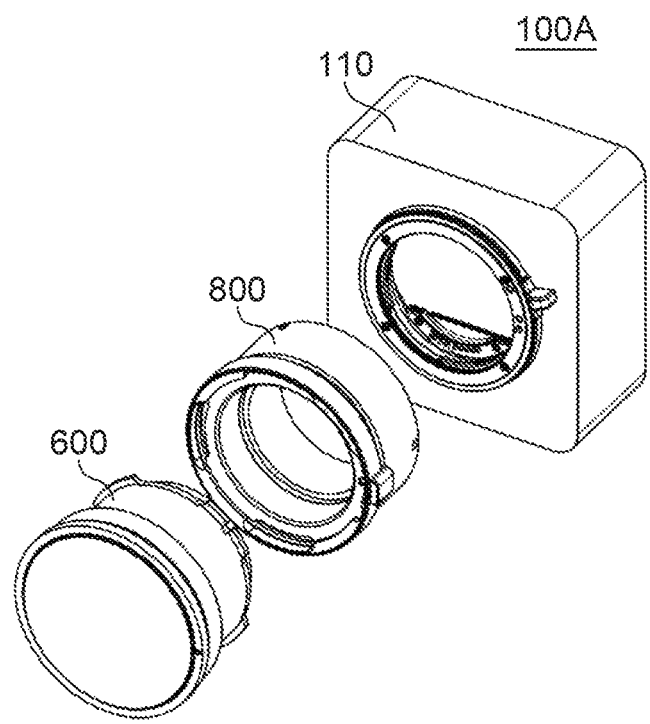
FIG. 13A is an exploded perspective view of an image pickup apparatus according to a second embodiment of the present invention.
Figure 13B:
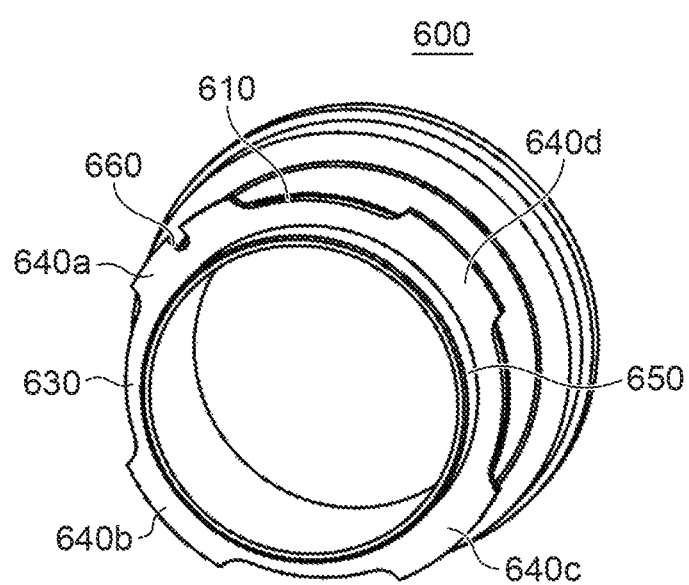
FIG. 13B is a perspective view of an interchangeable lens of the image pickup apparatus according to the second embodiment of the present invention, when viewed from a rear side.

FIG. 13A is an exploded perspective view of an image pickup apparatus 100A according to a second embodiment of the present invention. The image pickup apparatus 100A includes a camera body 110, a mount adapter 800, and an interchangeable lens 600. Since the camera body 110 is the same as a camera body 110 configuring an image pickup apparatus 100 described in the first embodiment, detailed description thereof is omitted. FIG. 13B is a perspective view of the interchangeable lens 600 when viewed from a rear side. The interchangeable lens 600 includes a mount part 610, and the mount part 610 includes a mount surface 630 (lens-side mount surface), mount claw portions 640a to 640d (lens-side mount claw portions), a cylindrical shaft part 650, and a rotation stopping concave part 660.

Figure 14A:
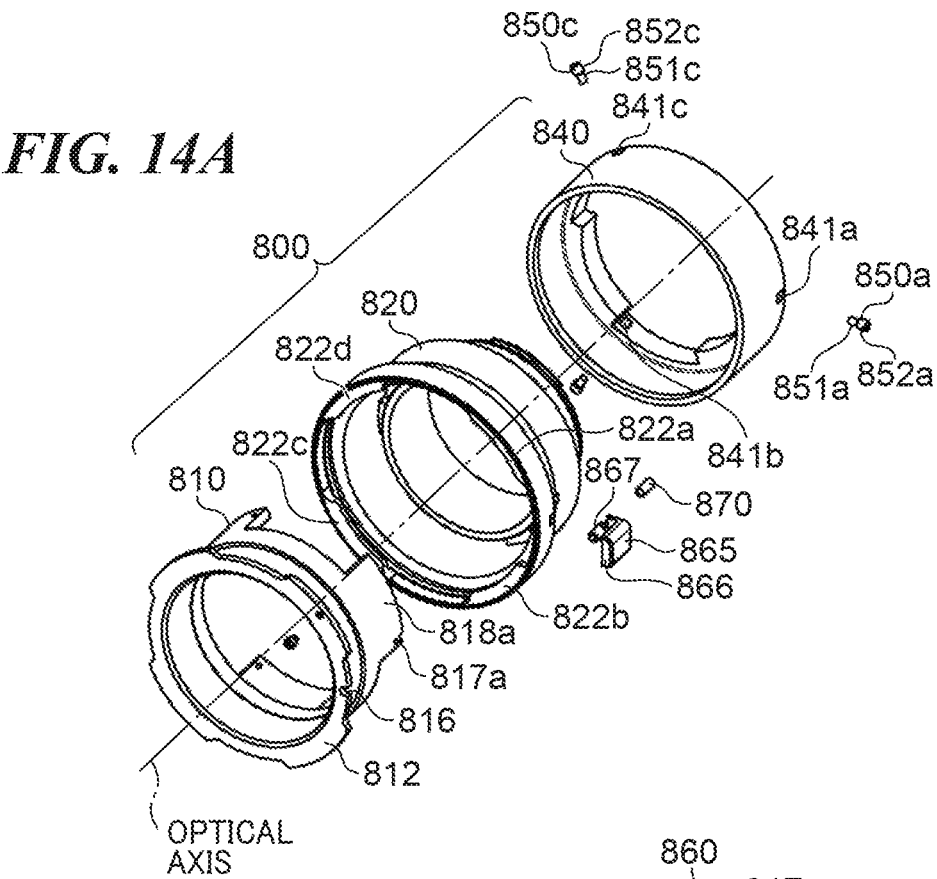
FIG. 14A is an exploded perspective view of a mount adapter.
Figure 14B:
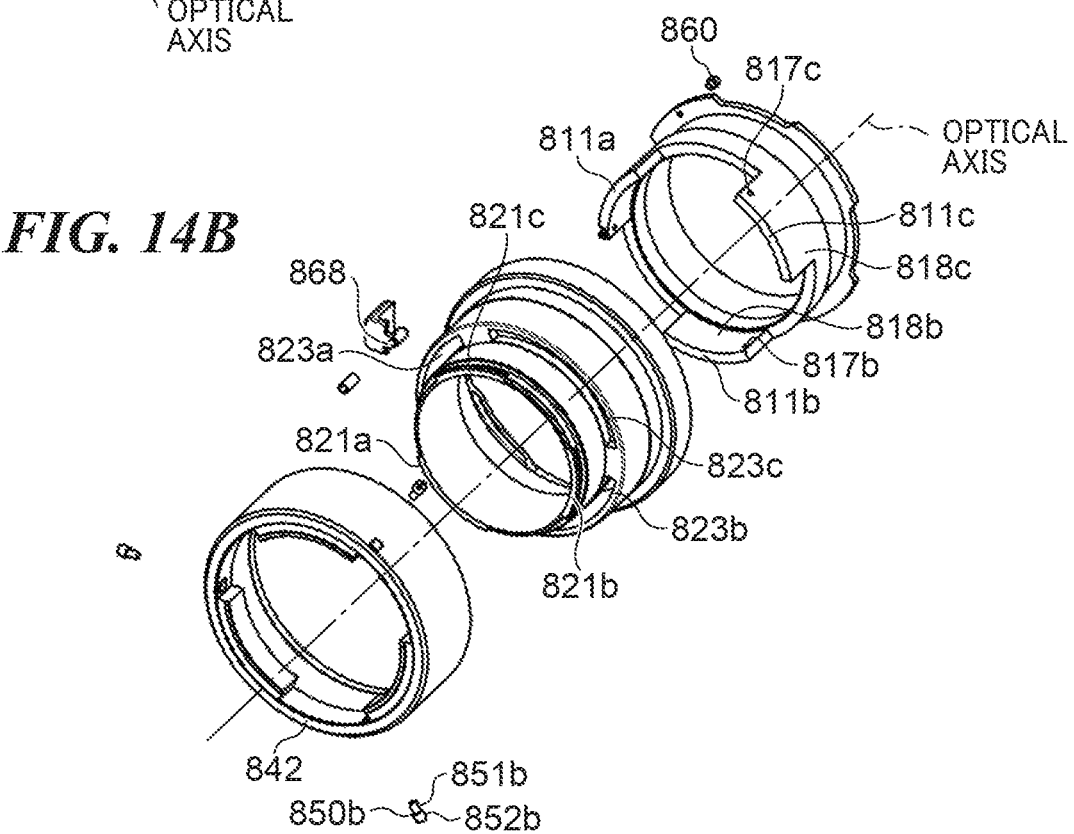
FIG. 14B is an exploded perspective view of the mount adapter.
Figure 15A:
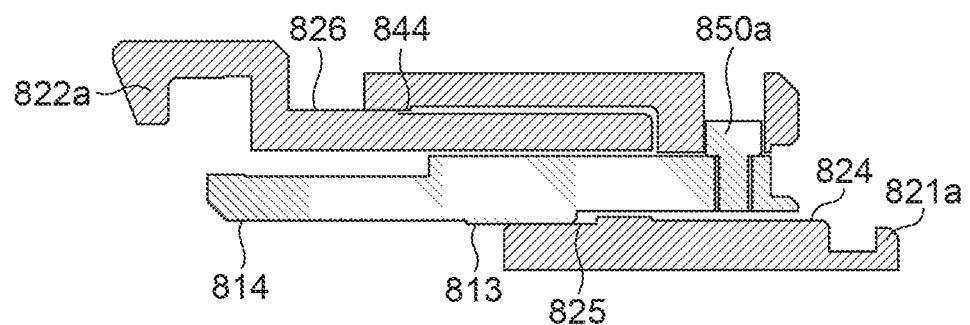
FIG. 15A is a cross-sectional view of the mount adapter.
Figure 15B:
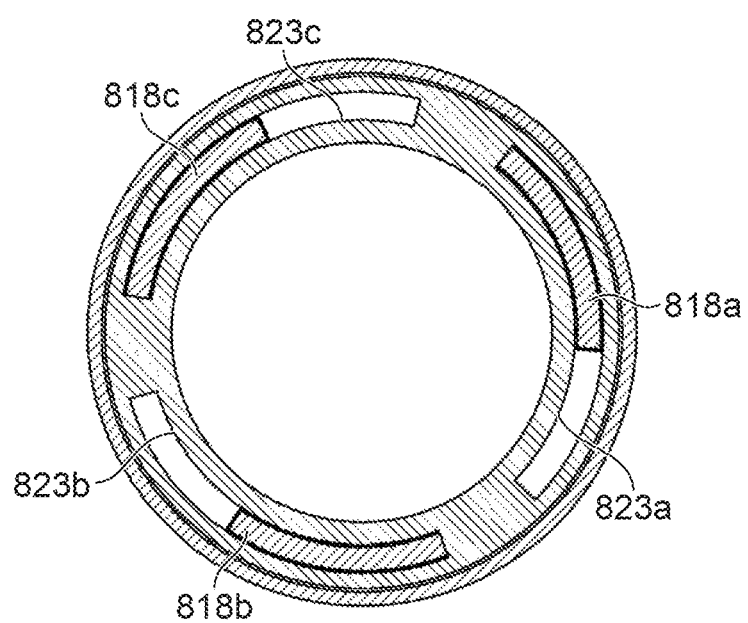
FIG. 15B is a cross-sectional view of the mount adapter.

FIGS. 14A and 14B are exploded perspective views of the mount adapter 800. A difference between FIGS. 14A and 14B is a difference in direction in which the mount adapter 800 is viewed. FIGS. 15A and 15B are cross-sectional views of the mount adapter 800. FIG. 15A is a cross-sectional view taken along a plane including an optical axis. Further, FIG. 15B is a cross-sectional view taken along a plane orthogonal to the optical axis. The mount adapter 800 includes a fixed cylinder 810, a movable cylinder 820, an outer cylinder 840, guide pins 850a to 850c, a rotation stopping member 860, an operation member 865, and a biasing member 870.

The fixed cylinder 810 includes first mount surfaces 811a to 811c, a second mount surface 812, an engagement hole part 813, a cylindrical hole part 814, a rotation stopping concave part 815, a notch part 816, screw hole parts 817a to 817c, and arm parts 818a to 818c. The movable cylinder 820 includes first mount claw portions 821a to 821c, second mount claw portions 822a to 822d, rotation groove parts 823a to 823c, a cylindrical shaft part 824, a first engagement shaft part 825, and a second engagement shaft part 826. The rotation groove parts 823a to 823c engage with the arm parts 818a to 818c, respectively, and the first engagement shaft part 825 engages with the engagement hole part 813. By these engagements, the movable cylinder 820 is rotatable around the optical axis within a predetermined range with respect to the fixed cylinder 810, and is slidable along the optical axis direction.

The outer cylinder 840 includes guide holes 841a to 841c, a mount surface 842, and an engagement hole part 844. The engagement hole part 844 engages with the second engagement shaft part 826 of the movable cylinder 820, so that the outer cylinder 840 is slidable and rotatable with respect to the movable cylinder 820. The guide pins 850a to 850c include screw parts 851a to 851c and contact parts 852a to 852c, respectively. The screw parts 851a to 851c are fastened to the screw hole parts 817a to 817c provided in the fixed cylinder 810, respectively. The contact parts 852a to 852c engage with the guide holes 841a to 841c of the outer cylinder 840, respectively. The contact parts 852a to 852c come into contact with surfaces orthogonal to the optical axis in the guide holes 841a to 841c, so that the outer cylinder 840 is prevented from falling off the fixed cylinder 810 in the optical axis direction. As a result, the outer cylinder 840 prevents the movable cylinder 820 from falling off the fixed cylinder 810 in the optical axis direction. Further, the contact parts 852a to 852c come into contact with the surfaces of the guide holes 841a to 841c parallel to the optical axis, so that rotation around the optical axis of the outer cylinder 840 with respect to the fixed cylinder 810 is prevented.

The rotation stopping member 860 is fixed to the fixed cylinder 810. The operation member 865 is fixed to the movable cylinder 820. The operation member 865 includes an operation part 866, a first convex part 867, and a second convex part 868. The first convex part 867 engages with the notch part 816 of the fixed cylinder 810. The biasing member 870, which is a compression spring, engages with the second convex part 868 of the operation member 865 and biases the first convex part 867 in a direction in which the first convex part 867 approaches the second mount surface 812.

FIGS. 16A to 16C are perspective views showing a process of coupling the interchangeable lens 600 to the mount adapter 800. The interchangeable lens 600 is coupled to the mount adapter 800 by a structure similar to a bayonet type mount. FIG. 16A shows a state where the operation member 865 has been pressed against the biasing force by the biasing member 870. In this state, the movable cylinder 820 can rotate with respect to the fixed cylinder 810. FIG. 16B shows a state where the second mount surface 812 of the mount adapter 800 and the mount surface 630 of the interchangeable lens 600 come into contact with each other. In this state, the cylindrical hole part 814 and the cylindrical shaft part 650 engage with each other (see FIGS. 15A and 18A). In the state of FIG. 16B, the rotation stopping member 860 and the rotation stopping concave part 660 engage with each other. At this time, the second mount claw portions 822a to 822d and the mount claw portions 640a to 640d overlap on optical axis projection.

FIG. 16C shows a state where the first convex part 867 of the operation member 865 and the notch part 816 of the fixed cylinder 810 are engaged with each other by the operation member 865 being operated to rotate the movable cylinder 820 around the optical axis. In this state, the second mount claw portions 822a to 822d and the mount claw portions 640a to 640d overlap on the optical axis projection, and the interchangeable lens 600 is held by the mount adapter 800. However, there are gaps between the mount claw portions 640a to 640d and the second mount claw portions 822a to 822c (see FIGS. 18A to 18C). That is, there is rattling between the interchangeable lens 600 and the mount adapter 800 by a size of the gap.

Figure 17A:
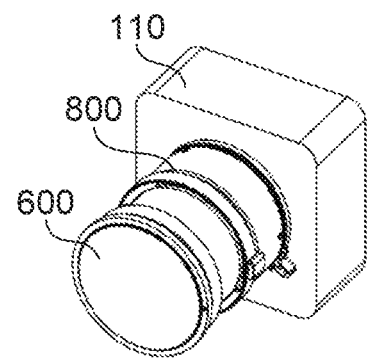
FIG. 17A is a perspective view showing a process of coupling the mount adapter, to which the interchangeable lens has been coupled, to the camera body.
Figure 17B:
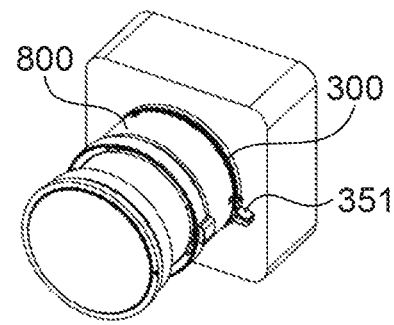
FIG. 17B is a perspective view showing the process of coupling the mount adapter, to which the interchangeable lens has been coupled, to the camera body.
Figure 17C:
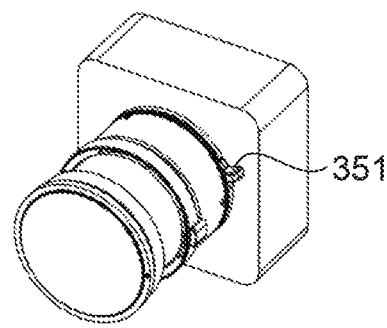
FIG. 17C is a perspective view showing the process of coupling the mount adapter, to which the interchangeable lens has been coupled, to the camera body.
Figure 18A:
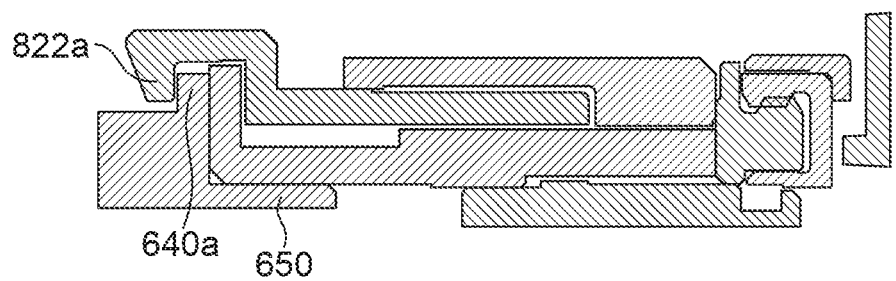
FIG. 18A is a cross-sectional view taken along a plane including an optical axis, corresponding to FIG. 17A.
Figure 18B:
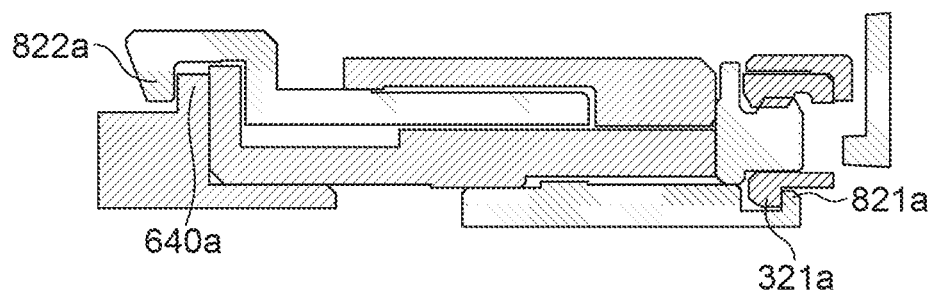
FIG. 18B is a cross-sectional view taken along the plane including the optical axis, corresponding to FIG. 17B.
Figure 18C:
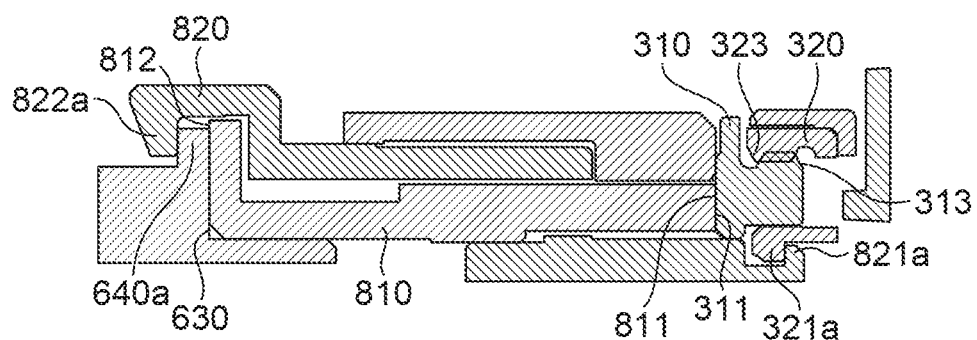
FIG. 18C is a cross-sectional view taken along the plane including the optical axis, corresponding to FIG. 17C.

FIGS. 17A to 17C are perspective views showing a process of coupling the mount adapter 800, to which the interchangeable lens 600 has been coupled, to the camera body 110. FIGS. 18A to 18C are cross-sectional views taken along a plane including the optical axis, respectively corresponding to FIGS. 17A to 17C. It should be noted that the mount adapter 800 is attached to and detached from the camera body 110 (lens mount 300) by the screw type mount. An operation method of the lens mount 300 (operation member 350) at that time is the same as an operation method by which the interchangeable lens 200 is coupled to the lens mount 300 in the first embodiment.

FIGS. 17A and 18A show a state where the mount adapter 800 to which the interchangeable lens 600 has been coupled is brought into contact with the camera body 110. In this state, since there are gaps between the second mount claw portions 822a to 822d and the mount claw portions 640a to 640d, rattling occurs between the interchangeable lens 600 and the mount adapter 800.

FIGS. 17B and 18B show a state where the mount adapter 800 to which the interchangeable lens 600 has been coupled is being coupled to the camera body 110. When a knob part 351 of the lens mount 300 is rotated counterclockwise around the optical axis when viewed from the interchangeable lens 600 side, as shown in FIG. 18B, the mount claw portion 321a of the lens mount 300 and the first mount claw portion 821a of the mount adapter 800 engage with each other. Similarly, the mount claw portions 321b and 321c, and the first mount claw portions 821b and 821c engage with each other, respectively. However, there are gaps between the second mount claw portions 822a to 822d of the mount adapter 800 and the mount claw portions 640a to 640d of the interchangeable lens 600.

Here, the second mount claw portions 822a to 822d are movable in the optical axis direction with respect to the fixed cylinder 810. This means that there are gaps between the mount claw portions 321a to 321c of the lens mount 300 and the first mount claw portions 821a to 821c of the mount adapter 800. That is, in the state of FIGS. 17B and 18B, rattling occurs between the interchangeable lens 600 and the mount adapter 800 and between the mount adapter 800 and the camera body 110.

FIGS. 17C and 18C show a state where coupling between the camera body 110 and the mount adapter 800 to which the interchangeable lens 600 has been coupled has been completed. By further rotating the knob part 351 of the lens mount 300, the mount claw portion 640b and the first mount claw portion 821a come into pressure contact engagement with each other, as shown in FIG. 18C. Similarly, the mount claw portions 640b and 640c, and the first mount claw portions 821b and 821c come into pressure contact engagement with each other, respectively.

The following first to fifth parts are subjected to pressure contact by the fastening force of the lens mount 300 generated in this way. The first part is a contact part between the mount surface 311 of the fixed mount member 310 of the lens mount 300 and the first mount surface 811 of the fixed cylinder 810 of the mount adapter 800. The second part is a contact part between the second mount surface 812 of the fixed cylinder 810 of the mount adapter 800 and the mount surface 630 of the interchangeable lens 600. The third part is an engagement part between the mount claw portion 640a of the interchangeable lens 600 and the second mount claw portion 822a of the movable cylinder 820 of the mount adapter 800. The fourth part is an engagement part between the first mount claw portion 821a of the movable cylinder 820 of the mount adapter 800 and the mount claw portion 321a of the movable mount member 320 of the lens mount 300. The fifth part is a screwing part between a female screw part 323 of the movable mount member 320 and a male screw part 313 of the fixed mount member 310 in the lens mount 300.

That is, considering the mount surface 311 of the fixed mount member 310 as a reference, the mount claw portions 321a to 321c of the movable mount member 320 draw the first mount claw portions 821a to 821c of the movable cylinder 820 toward the camera body 110 side. Accompanying this, the second mount claw portions 822a to 822c of the movable cylinder 820 draw the mount claw portions 640a to 640c of the interchangeable lens 600 toward the camera body 110 side. At this time, the fixed cylinder 810 functions as a spacer between the interchangeable lens 600 and the camera body 110. In this way, the screw fastening force of the lens mount 300 is transmitted to the interchangeable lens 600 via the mount adapter 800, so that the camera body 110, the mount adapter 800, and the interchangeable lens 600 are coupled without rattling.

It should be noted that the outer cylinder 840 of the mount adapter 800 is preferably biased toward the camera body 110. In this way, the mount surface 842 of the outer cylinder 840 comes into contact with the mount surface 311 of the lens mount 300, so that sealability between the mount adapter 800 and the camera body 110 can be improved, and dust-proof performance and drip-proof performance can be improved. Further, it is possible to prevent occurrence of a situation where the outer cylinder 840 is shaky and undesired sound is inadvertently generated, during shooting.

Third Embodiment

Figure 19A:
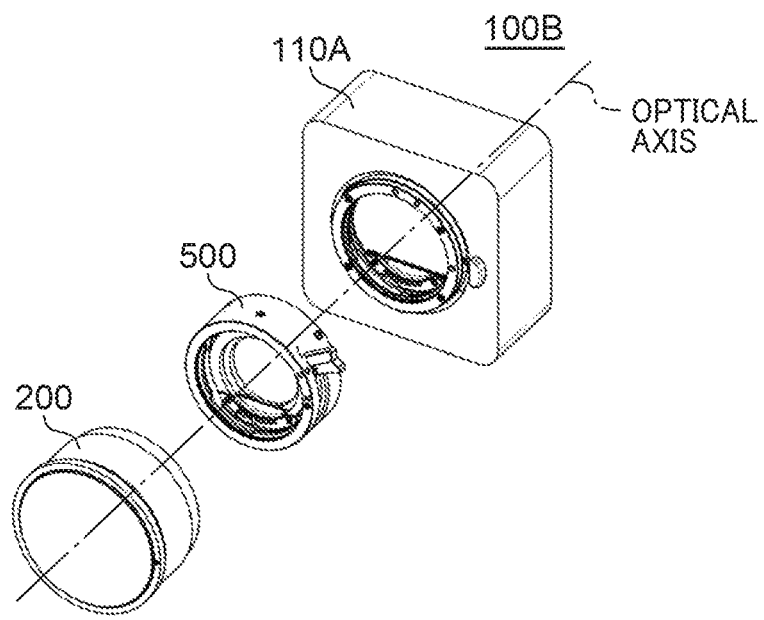
FIG. 19A is an exploded perspective view of an image pickup apparatus according to a third embodiment of the present invention.
Figure 19B:
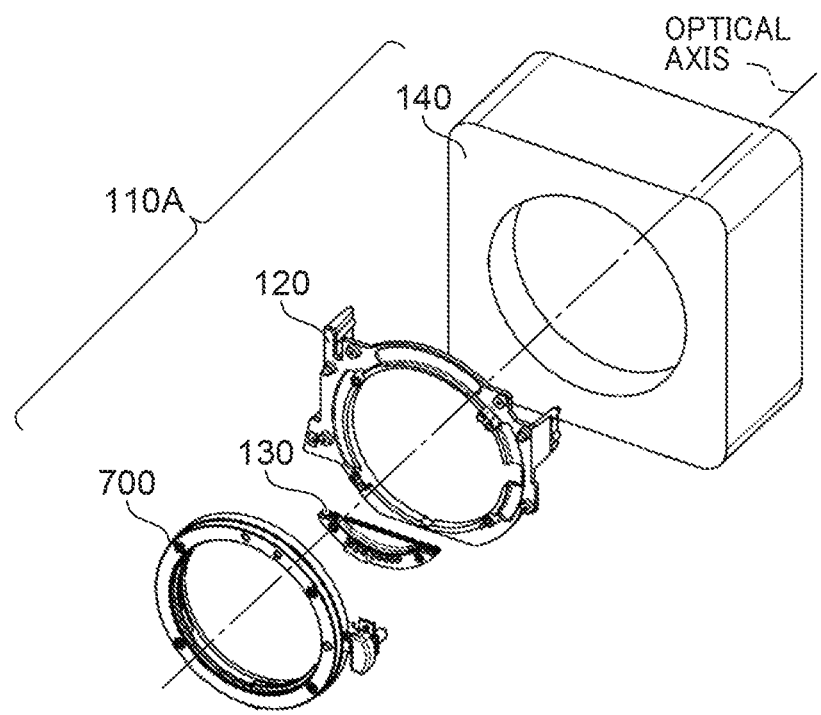
FIG. 19B is an exploded perspective view of a camera body of the image pickup apparatus according to the third embodiment of the present invention.

FIG. 19A is an exploded perspective view of an image pickup apparatus 100B according to a third embodiment of the present invention. The image pickup apparatus 100B includes an interchangeable lens 200, a mount adapter 500, and a camera body 110A. Since the interchangeable lens 200 is the same as an interchangeable lens 200 configuring an image pickup apparatus 100 described in the first embodiment, description thereof is omitted. FIG. 19B is an exploded perspective view of the camera body 110A. The camera body 110A includes a casing 140, a fixing member 120, an electric contact member 130, and a lens mount 700. Since the casing 140, the fixing member 120, and the electric contact member 130 are the same as a casing 140, a fixing member 120, and an electric contact member 130 configuring the image pickup apparatus 100 described in the first embodiment, descriptions thereof are omitted. The lens mount 700 is fixed to the fixing member 120.

Figure 20A:
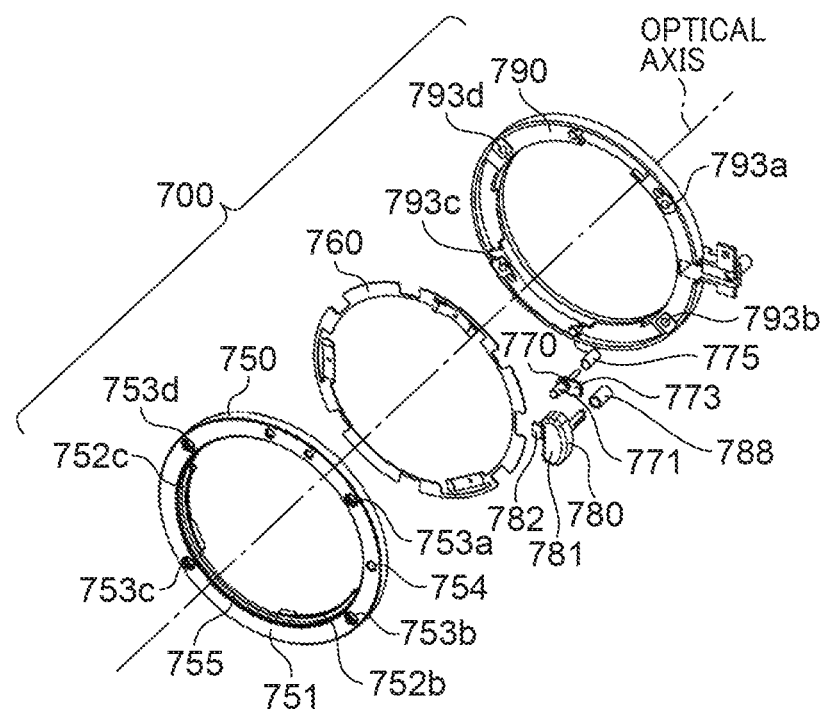
FIG. 20A is an exploded perspective view of a lens mount.
Figure 20B:
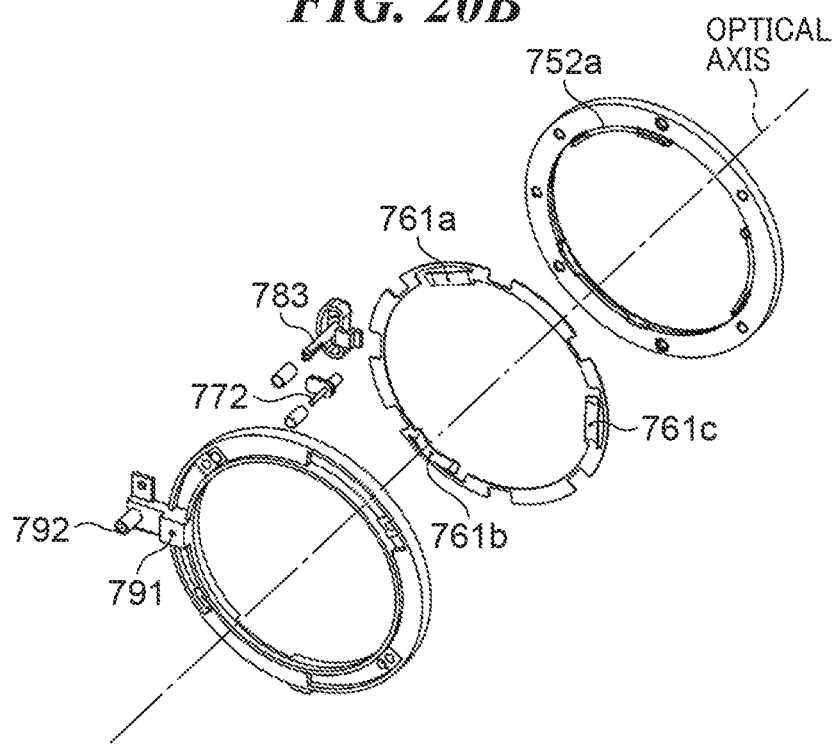
FIG. 20B is an exploded perspective view of the lens mount.

FIGS. 20A and 20B are exploded perspective views of the lens mount 700. A difference between FIGS. 20A and 20B is a difference in direction in which the lens mount 700 is viewed. The lens mount 700 includes a mount member 750, a biasing member 760, a rotation stopping member 770, a biasing member 775, an operation member 780, a biasing member 788, and an annular member 790. It should be noted that the annular member 790 does not need to have a complete ring shape, and may be, for example, an arc-shaped member of which a part is cut.

The mount member 750 includes a mount surface 751 (body-side mount surface), mount claw portions 752a to 752c (body-side mount claw portions), clearance holes 753a to 753d, a hole part 754, and a cylindrical hole part 755. The biasing member 760 includes biasing parts 761a to 761c. Each of the biasing parts 761a to 761c is configured by a plate spring. The rotation stopping member 770 includes a first convex part 771, a second convex part 772, and an arm part 773. The first convex part 771 engages with the hole part 754 of the mount member 750 and protrudes from the mount surface 751. The biasing member 775, which is a compression spring, engages with the second convex part 772 of the rotation stopping member 770 and biases the rotation stopping member 770 in a direction to which the rotation stopping member 770 is protruded from the mount surface 751.

The operation member 780 includes an operation part 781, an arm part 782, and a shaft part 783. The arm part 782 presses the arm part 773 of the rotation stopping member 770 accompanying an operation of pressing the operation member 780. The biasing member 788, which is a compression spring, engages with the shaft part 783 of the operation member 780 and biases the operation member 780 in a direction to which the operation member 780 is protruded from the camera body 110A. The annular member 790 includes a hole part 791, a hole part 792, and clearance hole parts 793a to 793d. The hole part 791 engages with the second convex part 772 of the rotation stopping member 770. The hole part 792 engages with the shaft part 783 of the operation member 780. Screws (not shown), which are inserted through the clearance holes 753a to 753d, are inserted into the clearance hole parts 793a to 793d, respectively, and these screws are fastened to the fixing member 120, so that the lens mount 700 is fixed to the camera body 110A.

Figure 21A:
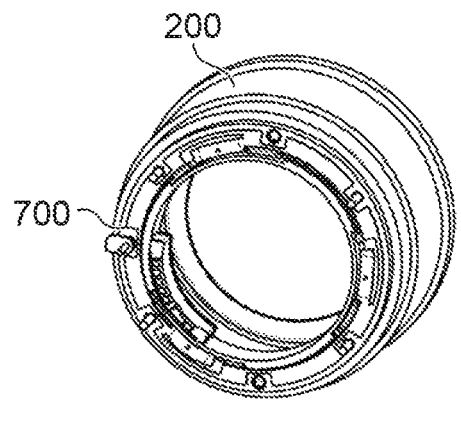
FIG. 21A is a perspective view showing a process of coupling an interchangeable lens to the lens mount.
Figure 21B:
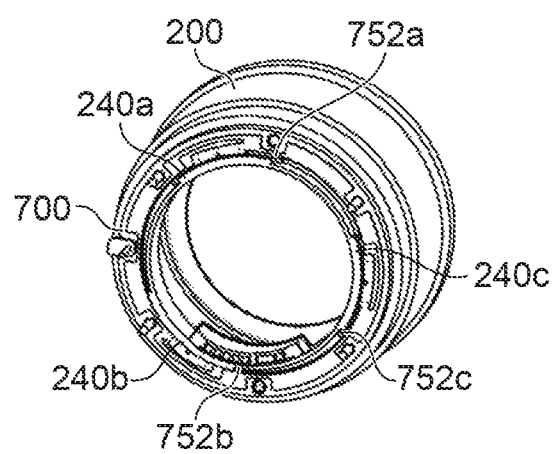
FIG. 21B is a perspective view showing the process of coupling the interchangeable lens to the lens mount.
Figure 22A:
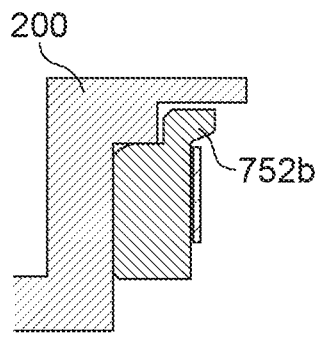
FIG. 22A is a cross-sectional view taken along a plane including an optical axis, corresponding to FIG. 21A.
Figure 22B:
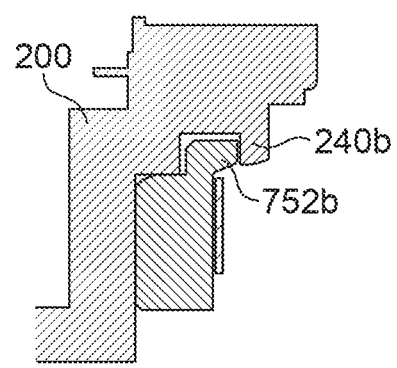
FIG. 22B is a cross-sectional view taken along the plane including the optical axis, corresponding to FIG. 21B.

FIGS. 21A and 21B are perspective views showing a process of coupling the interchangeable lens 200 to the lens mount 700. FIGS. 22A and 22B are cross-sectional views taken along a plane including an optical axis, respectively corresponding to FIGS. 21A and 21B. The interchangeable lens 200 is attached to and detached from the lens mount 700 with a bayonet type mount.

FIGS. 21A and 22A show a state where the interchangeable lens 200 is pressed against the lens mount 700 (a state where the mount surface 751 of the mount member 750 and the mount surface 230 of the interchangeable lens 200 come in contact with each other). FIGS. 21B and 22B show a state after the interchangeable lens 200 pressed against the lens mount 700 is rotated around the optical axis. In this state, the mount claw portions 240a to 240c are biased toward the camera body 110A by the biasing member 760, so that the interchangeable lens 200 is coupled to the lens mount 700. However, as shown in FIG. 22B, there is a gap between the mount claw portion 752b and the mount claw portion 240b. Similarly, there are gaps between the mount claw portion 752a and the mount claw portion 240a and between the mount claw portion 752c and the mount claw portion 240c. Therefore, rattling occurs between the camera body 110A (lens mount 700) and the interchangeable lens 200. In the present embodiment, the mount adapter 500 is disposed between the lens mount 700 and the interchangeable lens 200, so that rattling does not occur between the lens mount 700 and the mount adapter 500 and between the interchangeable lens 200 and the mount adapter 500.

Figure 23A:
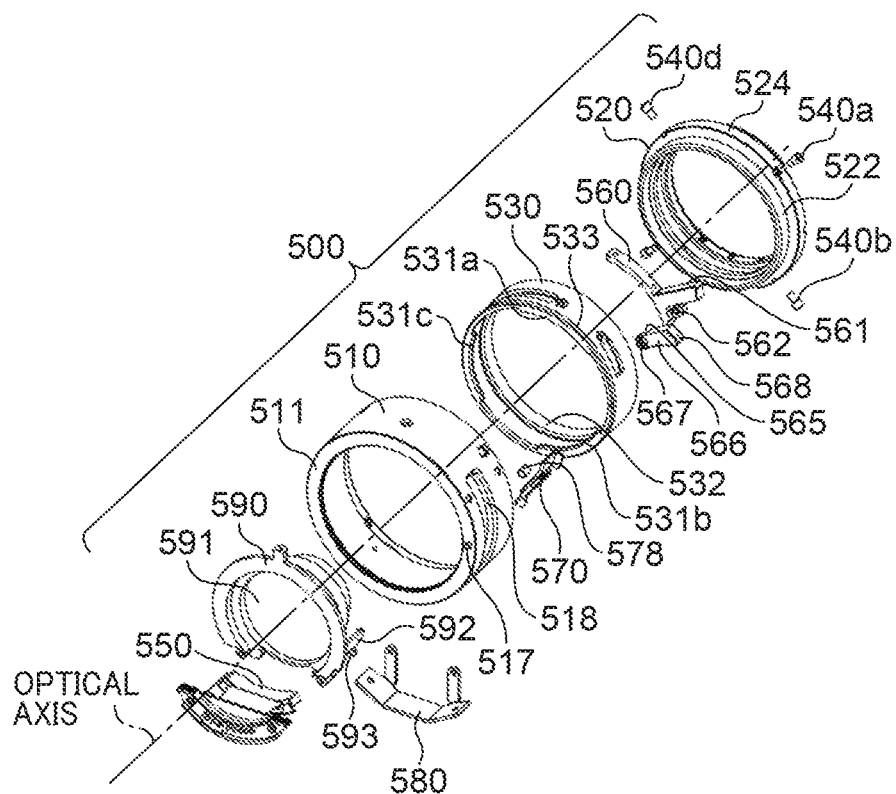
FIG. 23A is an exploded perspective view of a mount adapter.
Figure 23B:
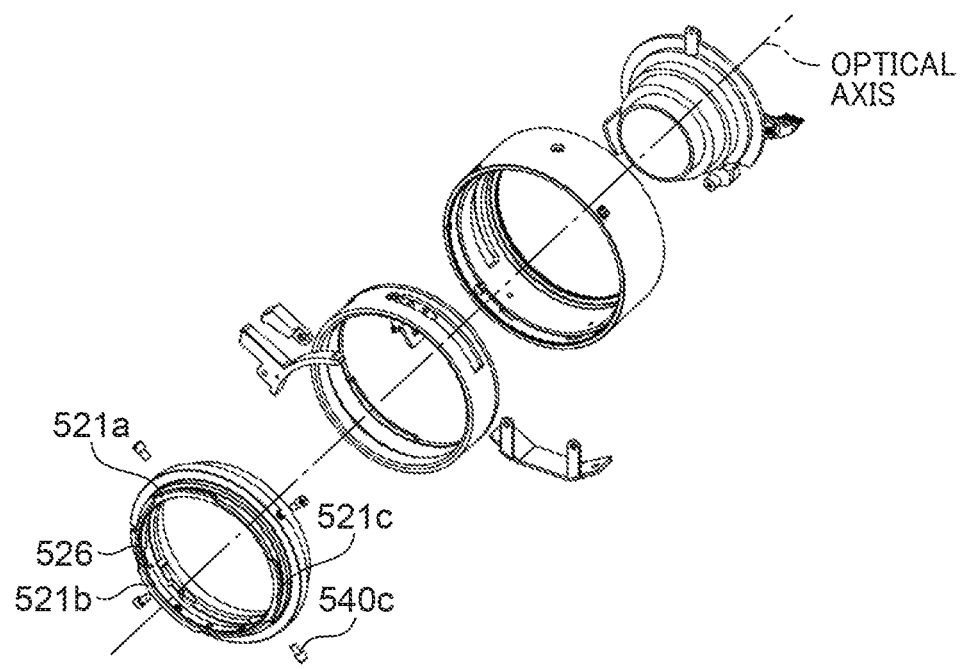
FIG. 23B is an exploded perspective view of the mount adapter.
Figure 24A:
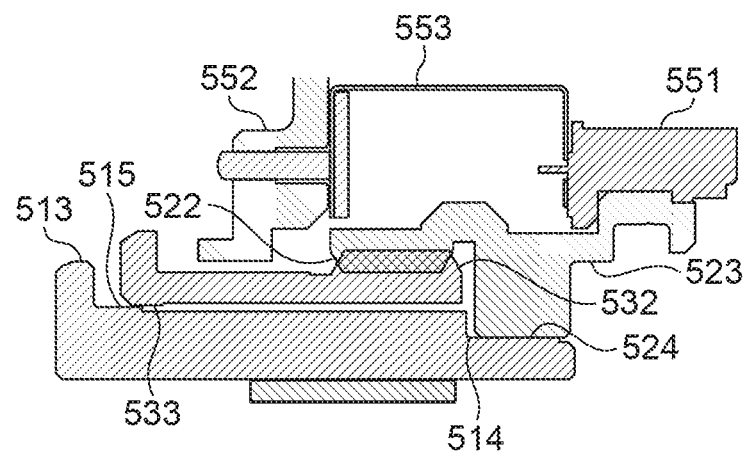
FIG. 24A is a cross-sectional view of the mount adapter.
Figure 24B:
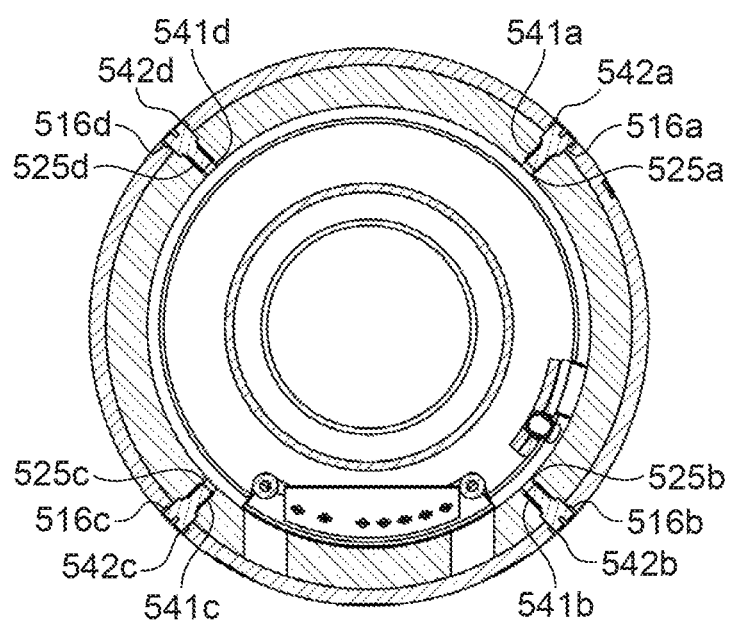
FIG. 24B is a cross-sectional view of the mount adapter.

Subsequently, a configuration and a function of the mount adapter 500 will be described in detail. FIGS. 23A and 23B are exploded perspective views of the mount adapter 500. A difference between FIGS. 23A and 23B is a difference in direction in which the mount adapter 500 is viewed. FIGS. 24A and 24B are cross-sectional views of the mount adapter 500. FIG. 24A is a cross-sectional view taken along a plane including the optical axis. Further, FIG. 24B is a cross-sectional view taken along a plane including guide pins 540a to 540d described later and orthogonal to the optical axis.

The mount adapter 500 includes a fixed cylinder 510, a first movable cylinder (first movable part) 520, a second movable cylinder (second movable part) 530, guide pins 540a to 540d, and an electric contact member 550. Further, the mount adapter 500 includes an operation member 560, an operation auxiliary member 565, a restricting member 570, a biasing member 578, an internal cylinder holding member 580, and an internal cylinder 590.

The fixed cylinder 510 includes a first mount surface 511, a second mount surface 512, a cylindrical hole part 513, a first engagement hole part 514, a second engagement hole part 515, guide holes 516a to 516d, a rotation stopping convex part 517, and an operation groove part 518. The first movable cylinder 520 includes first mount claw portions 521a to 521c, a male screw part 522, a cylindrical shaft part 523, an engagement shaft part 524, screw hole parts 525a to 525d, a regulation hole part 526, and a rotation stopping concave part 527. The engagement shaft part 524 engages with the first engagement hole part 514 of the fixed cylinder 510. The second movable cylinder 530 includes second mount claw portions 531a to 531c, a female screw part 532, and an engagement shaft part 533. The female screw part 532 is screwed with the male screw part 522 of the first movable cylinder 520. The engagement shaft part 533 engages with the second engagement hole part 515 of the fixed cylinder 510.

The guide pins 540a to 540d include screw parts 541a to 541d and contact parts 542a to 542d, respectively. The screw parts 541a to 541d are fastened to the screw hole parts 525a to 525d of the first movable cylinder 520, respectively. The contact parts 542a to 542d engage with the guide holes 516a to 516d of the fixed cylinder 510, respectively, and come into contact with the surfaces of the guide holes 516a to 516d orthogonal to the optical axis, so that the first movable cylinder 520 is prevented from falling off the fixed cylinder 510 in the optical axis direction. Further, the contact parts 542a to 542d come in contact with the surfaces, parallel to the optical axis, of the guide holes 516a to 516d of the fixed cylinder 510, respectively, so that the first movable cylinder 520 is prevented from rotating around the optical axis with respect to the fixed cylinder 510.

The electric contact member 550 includes a first electric contact 551, a second electric contact 552, and an electric wiring part 553. The first electric contact 551 and the second electric contact 552 are electrically connected via the electric wiring part 553. The first electric contact 551 is fixed to the first movable cylinder 520. The operation member 560 includes an operation part 561 and a rotation shaft part 562. The operation member 560 is fixed to the second movable cylinder 530. The operation part 561 protrudes from the operation groove part 518 of the fixed cylinder 510. The operation auxiliary member 565 includes an operation part 566, a rotation hole part 567, and a contact surface 568. The rotation hole part 567 engages with the rotation shaft part 562, so that the operation auxiliary member 565 is rotatably held with respect to the operation member 560.

Figure 25:
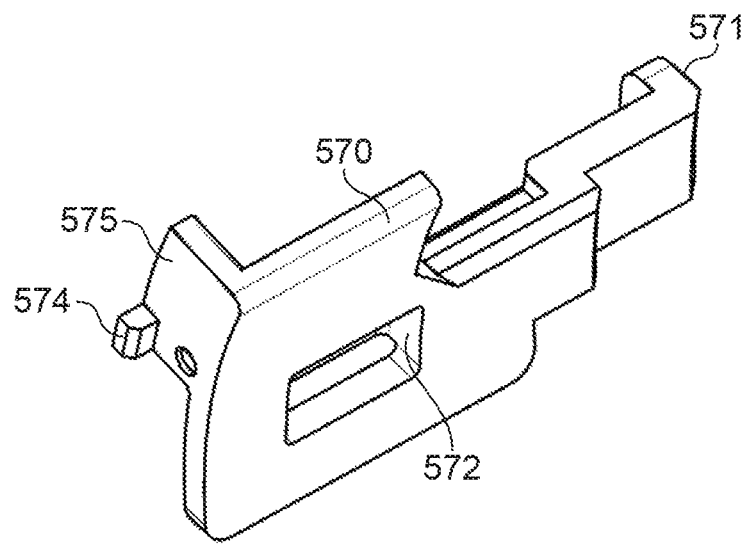
FIG. 25 is a perspective view of a restricting member.

FIG. 25 is a perspective view of the restricting member 570. The restricting member 570 includes a first contact surface 572, a second contact surface 573, a first convex part 574, and a second convex part 575. The first convex part 574 protrudes from the regulation hole part 526 of the first movable cylinder 520. The biasing member 578 is a compression spring, and one end of the biasing member 578 comes into contact with the second contact surface 573 of the restricting member 570. The internal cylinder holding member 580 is fixed to the fixed cylinder 510, is inserted into the first movable cylinder 520, and extends to the inside of the first movable cylinder 520. The internal cylinder 590 includes an optical member 591, a sliding part 592, and a contact surface 593. The optical member 591 is an optical member having magnification optical performance in the present embodiment. The sliding part 592 slides with the restricting member 570. The contact surface 593 comes into contact with the other end of the biasing member 578, so that the restricting member 570 is biased in a direction toward the second mount surface 512.

Figure 26A:
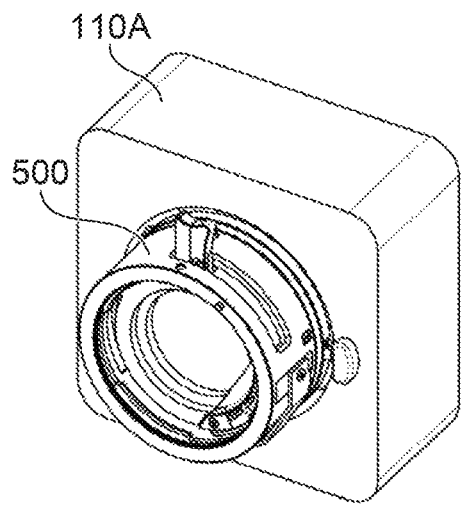
FIG. 26A is a perspective view showing a process of coupling the mount adapter to the camera body.
Figure 26B:
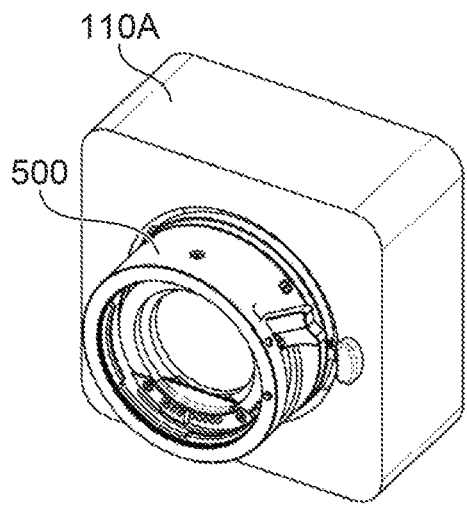
FIG. 26B is a perspective view showing the process of coupling the mount adapter to the camera body.

FIGS. 26A and 26B are perspective views showing a process of coupling the mount adapter 500 to the camera body 110A. The mount adapter 500 is attached to and detached from the camera body 110A (lens mount 700) by a bayonet type mount. FIG. 26A shows a state where the mount adapter 500 is pressed against the camera body 110A. FIG. 26B shows a state after the mount adapter 500 is rotated around the optical axis from the state of FIG. 26A. Since the mounting of the mount adapter 500 to the camera body 110A is performed in a similar way to the mounting of the interchangeable lens 200 to the camera body 110A, detailed description is omitted. In the state of FIG. 26B, the mount adapter 500 is held by the camera body 110A, and the first mount claw portions 521a to 521c of the mount adapter 500 are biased to the camera body 110A side by the biasing member 760 of the lens mount 700.

Figure 27A:
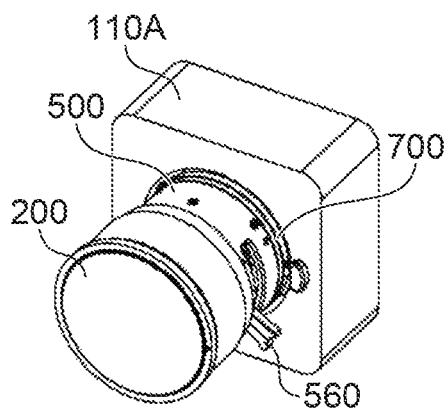
FIG. 27A is a perspective view showing a process of coupling the interchangeable lens to the mount adapter coupled to the camera body.
Figure 27B:
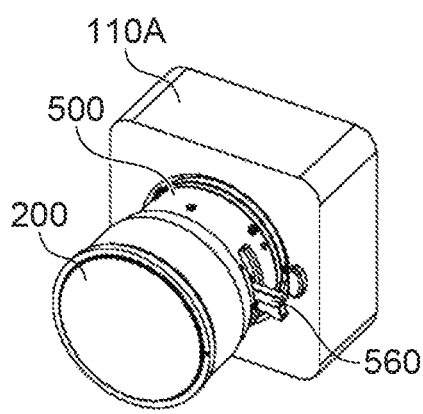
FIG. 27B is a perspective view showing the process of coupling the interchangeable lens to the mount adapter coupled to the camera body.
Figure 27C:
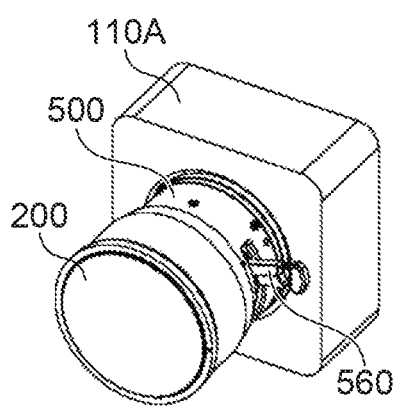
FIG. 27C is a perspective view showing the process of coupling the interchangeable lens to the mount adapter coupled to the camera body.
Figure 28A:
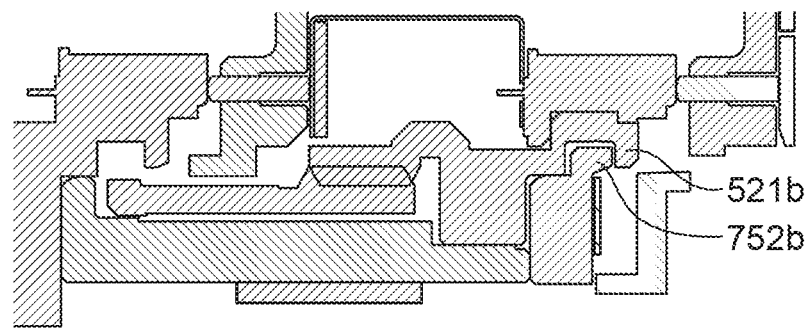
FIG. 28A is a cross-sectional view taken along a plane including an optical axis, corresponding to FIG. 27A.
Figure 28B:
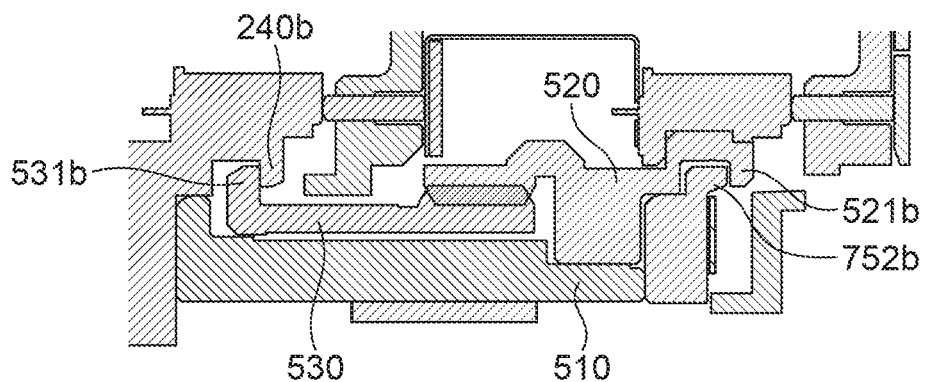
FIG. 28B is a cross-sectional view taken along the plane including the optical axis, corresponding to FIG. 27B.
Figure 28C:
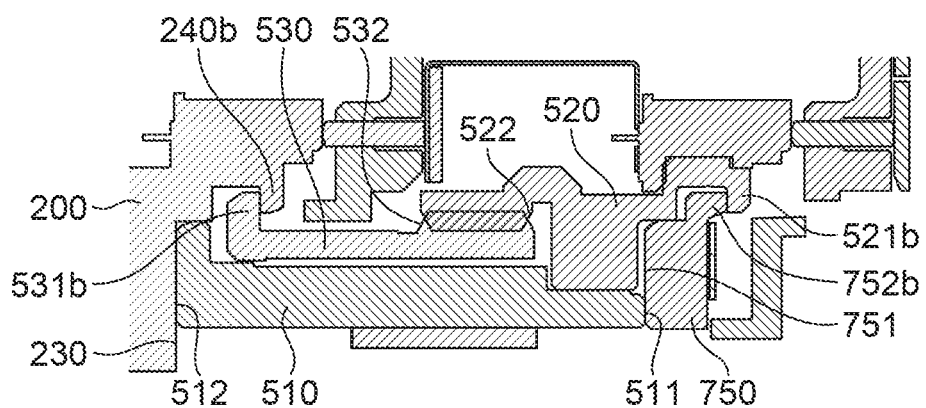
FIG. 28C is a cross-sectional view taken along the plane including the optical axis, corresponding to FIG. 27C.

FIGS. 27A to 27C are perspective views showing a process of coupling the interchangeable lens 200 to the mount adapter 500 coupled to the camera body 110A. FIGS. 28A to 28C are cross-sectional views taken along a plane including the optical axis, corresponding to FIGS. 27A to 27C. The interchangeable lens 200 is attached to and detached from the mount adapter 500 by a screw type mount.

FIGS. 27A and 28A show a state where the interchangeable lens 200 has been brought into contact with the mount adapter 500. In this state, as described with reference to FIGS. 26A and 26B, there are gaps between the first mount claw portions 521a to 521c of the mount adapter 500 and the mount claw portions 752a to 752c of the lens mount 700. Therefore, rattling occurs between the mount adapter 500 and the lens mount 700.

FIGS. 27B and 28B show a state where the interchangeable lens 200 is being coupled to the mount adapter 500. The operation member 560 of the mount adapter 500 is rotated counterclockwise around the optical axis when viewed from the interchangeable lens 200 side. As a result, as shown in FIG. 28B, the second mount claw portion 531b of the mount adapter 500 and the mount claw portion 240b of the interchangeable lens 200 engage with each other. Similarly, the second mount claw portion 531a and the mount claw portion 240a engage with each other, and the second mount claw portion 531c and the mount claw portion 240c engage with each other. However, at this time, there are gaps between the first mount claw portions 521a to 521c of the mount adapter 500 and the mount claw portions 752a to 752c of the lens mount 700. Further, the first movable cylinder 520 screwed with the second movable cylinder 530 is movable in the optical axis direction with respect to the fixed cylinder 510. This means that, in the state of FIGS. 27B and 28B, there are gaps between the mount claw portions 240a to 240c of the interchangeable lens 200 and the second mount claw portions 531a to 531c of the mount adapter 500. Therefore, rattling occurs between the interchangeable lens 200 and the mount adapter 500 and between the mount adapter 500 and the camera body 110A.

FIGS. 27C and 28C show a state where coupling between the interchangeable lens 200 and the mount adapter 500 has been completed. When the operation member 560 is further rotated, as shown in FIG. 28C, the first movable cylinder 520 screwed with the second movable cylinder 530 moves toward the interchangeable lens 200 side, so that the first mount claw portion 521b and the mount claw portion 752b come into pressure contact engagement with each other. Similarly, the first mount claw portions 521a and 521c and the mount claw portions 752a and 752c come into pressure contact engagement with each other.

By the fastening force of the mount adapter 500 generated in this way, the following first to fifth parts are subjected to pressure contact. The first part is a contact part between the mount surface 751 of the mount member 750 of the lens mount 700 and the first mount surface 511 of the fixed cylinder 510 of the mount adapter 500. The second part is a contact part between the second mount surface 512 of the fixed cylinder 510 of the mount adapter 500 and the mount surface 230 of the interchangeable lens 200. The third part is an engagement part between the mount claw portion 240b of the interchangeable lens 200 and the second mount claw portion 531b of the second movable cylinder 530 of the mount adapter 500. The fourth part is a screwing part between the female screw part 532 of the second movable cylinder 530 and the male screw part 522 of the first movable cylinder 520 in the mount adapter 500. The fifth part is an engagement part between the first mount claw portion 521b of the first movable cylinder 520 of the mount adapter 500 and the mount claw portion 752b of the mount member 750 of the lens mount 700.

That is, considering the second mount claw portions 531a to 531c of the second movable cylinder 530 as a reference, the first mount claw portions 521a to 521c of the first movable cylinder 520 draw the mount claw portions 752a to 752c of the mount member 750 toward the interchangeable lens 200 side. At the same time, the second mount claw portions 531a to 531c of the second movable cylinder 530 draw the mount claw portions 240a to 240c of the interchangeable lens 200 toward the camera body 110A side. At this time, the fixed cylinder 510 functions as a spacer between the interchangeable lens 200 and the camera body 110A. In this way, the fastening force of the screw of the mount adapter 500 is transmitted to the camera body 110A and the interchangeable lens 200, so that the camera body 110A, the mount adapter 500, and the interchangeable lens 200 are coupled without rattling.

Figure 29A:
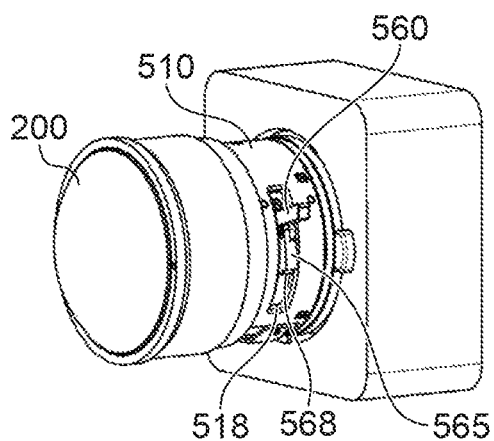
FIG. 29A is a perspective view for explaining a mechanism for preventing the interchangeable lens from falling off the mount adapter.
Figure 29B:
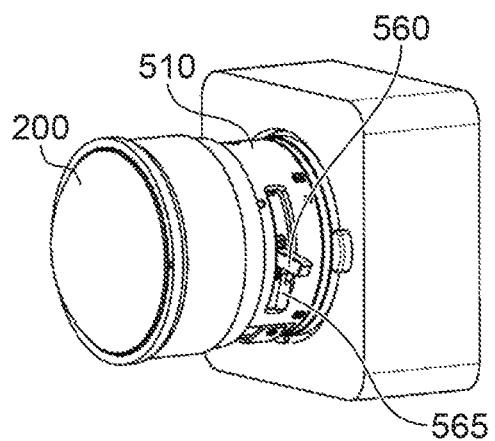
FIG. 29B is a perspective view for explaining the mechanism for preventing the interchangeable lens from falling off the mount adapter.

Subsequently, a function to prevent the interchangeable lens 200 from falling off the mount adapter 500 will be described. FIGS. 29A and 29B are perspective views for explaining a mechanism for preventing the interchangeable lens 200 from falling off the mount adapter 500. FIG. 29A shows a state where the operation auxiliary member 565 has been rotated with respect to the operation member 560. FIG. 29B shows a state where the operation member 560 has been rotated clockwise around the optical axis, from the state of FIG. 29A, when viewed from the interchangeable lens 200 side. In the state of FIG. 29B, the contact surface 568 of the operation auxiliary member 565 comes into contact with an end of the operation groove part 518 of the fixed cylinder 510. Then, the mount claw portions 240a to 240c of the interchangeable lens 200 and the second mount claw portions 531a to 531c of the mount adapter 500 overlap on optical axis projection (see FIGS. 21A and 21B). Therefore, as long as the operation auxiliary member 565 is rotated, it is possible to prevent the interchangeable lens 200 from being removed from the mount adapter 500, even when the operation member 560 is accidentally rotated.

Next, a function of preventing an erroneous operation at the mount adapter 500 will be described. It is assumed that an attempt is made to remove the mount adapter 500 from the camera body 110A in a state where the screw fastening force in the mount adapter 500 is generated. In this case, the mount claw portions 752a to 752c of the lens mount 700 and the first mount claw portions 521a to 521c of the mount adapter 500 may be worn, and durability performance may be degraded (see FIGS. 21A and 21B). Therefore, it is necessary to couple the mount adapter 500 and the camera body 110A before coupling the interchangeable lens 200 and the mount adapter 500. Further, it is necessary to release coupling between the interchangeable lens 200 and the mount adapter 500 before releasing coupling between the mount adapter 500 and the camera body 110A. That is, in the image pickup apparatus 100B, it is necessary to operate the screw type mount provided in the mount adapter 500 last at the time of coupling and first at the time of releasing coupling, and it is necessary to prompt a user to perform such an operation procedure.

Figure 30A:
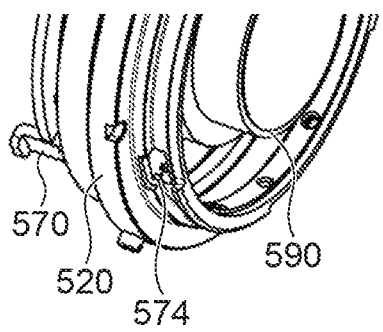
FIG. 30A is a perspective view showing main components for preventing an erroneous operation in the mount adapter.
Figure 30B:
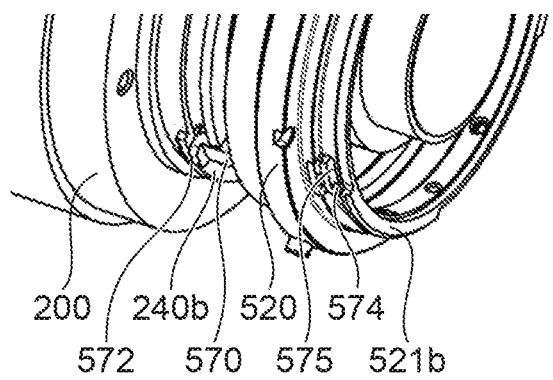
FIG. 30B is a perspective view showing the main components for preventing an erroneous operation in the mount adapter.

FIGS. 30A and 30B are perspective views showing main components for preventing an erroneous operation in the mount adapter 500, and show a part of the first movable cylinder 520, the restricting member 570, the internal cylinder 590, and the interchangeable lens 200. FIG. 30A is a perspective view of a part of the mount adapter 500 when viewed from a rear side. The first convex part 574 of the restricting member 570 protrudes from the first movable cylinder 520. As a result, when the mount adapter 500 is coupled to the camera body 110A, the first convex part 574 comes into contact with the end of the mount claw portion 752b of the mount member 750 even if a problem occurs in which the first convex part 771 does not engage with the rotation stopping concave part 527. Therefore, rotation of the mount adapter 500 with respect to the camera body 110A is regulated (see FIGS. 20A and 20B).

FIG. 30B is a perspective view of a state where the interchangeable lens 200 is coupled to the mount adapter 500 when viewed from the rear side of the mount adapter 500. If the interchangeable lens 200 is coupled to the mount adapter 500, the first contact surface 572 of the restricting member 570 is pressed in the optical axis direction toward the camera body 110A by the mount claw portion 240b of the interchangeable lens 200. As a result, not only the first convex part 574 but also the second convex part 575 protrudes from the first movable cylinder 520 in the vicinity of the first mount claw portion 521b. In this state, when it is assumed that an attempt is made to couple the mount adapter 500 to the camera body 110A by a bayonet type mount after the interchangeable lens 200 is coupled to the mount adapter 500 with a screw type mount. In this case, before the mount surface 751 of the lens mount 700 and the first mount surface 511 of the mount adapter 500 come into contact with each other (see FIGS. 28A to 28C), the mount claw portion 752a of the lens mount 700 is brought into contact with the second convex part 575. As a result, the mount adapter 500 cannot be coupled to the camera body 110A, so that it is possible to prompt the user to perform operations in the correct order.

Further, in a state where the interchangeable lens 200, the mount adapter 500, and the camera body 110A are coupled, it is necessary to first remove the interchangeable lens 200 from the mount adapter 500. When it is assumed that an attempt is made to remove the mount adapter 500 to which the interchangeable lens 200 is coupled from the camera body 110A, the second convex part 575 of the restricting member 570 comes into contact with the end of the mount claw portion 240a of the interchangeable lens 200. In that state, the mount claw portions 240a to 240c of the interchangeable lens 200 and the mount claw portions 752a to 752c of the lens mount 700 overlap on the optical axis projection. In this way, the mount adapter 500 cannot be removed from the camera body 110A in a state where the interchangeable lens 200 is coupled to the mount adapter 500. In this way, it is possible to prompt the user to perform operations in the correct order.

As described above, in the present embodiment, the interchangeable lens 200 and the camera body 110A are coupled without rattling via the mount adapter 500 provided with the screw type mount on the first mount surface 511 side. However, the screw type mount does not necessarily need to be provided on the side of the first mount surface 511 of the mount adapter 500, and may be provided on the second mount surface 512 side. Further, the screw type mount is not restricted to be provided for only one of the mount adapter 500, the interchangeable lens 200, and the camera body 110A. For example, in addition to the mount adapter 500, the interchangeable lens 200 and the camera body 110A may be provided with the screw type mount.

Fourth Embodiment

Figure 31:
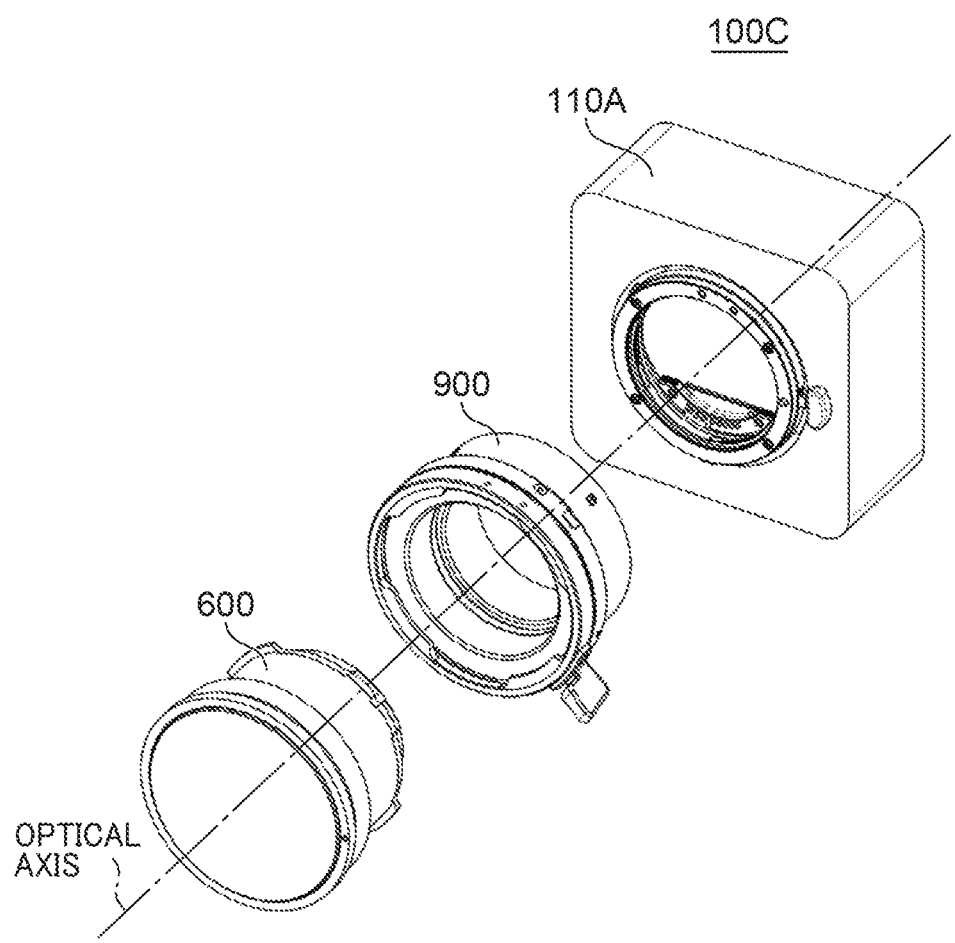
FIG. 31 is an exploded perspective view of an image pickup apparatus according to a fourth embodiment of the present invention.

FIG. 31 is an exploded perspective view of an image pickup apparatus 100C according to a fourth embodiment of the present invention. The image pickup apparatus 100C includes an interchangeable lens 600, a mount adapter 900, and a camera body 110A. Since the interchangeable lens 600 is the same as an interchangeable lens 600 configuring an image pickup apparatus 100A described in the second embodiment, description thereof is omitted herein. Further, since the camera body 110A is the same as a camera body 110A configuring an image pickup apparatus 100B described in the third embodiment, description thereof is omitted herein.

Figure 32A:
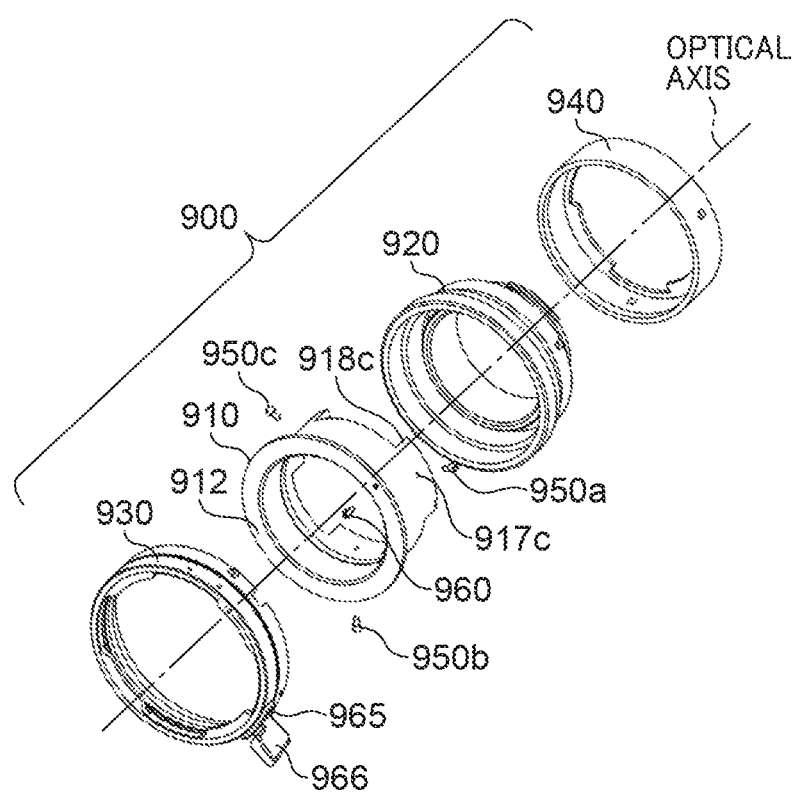
FIG. 32A is an exploded perspective view of a mount adapter.
Figure 32B:
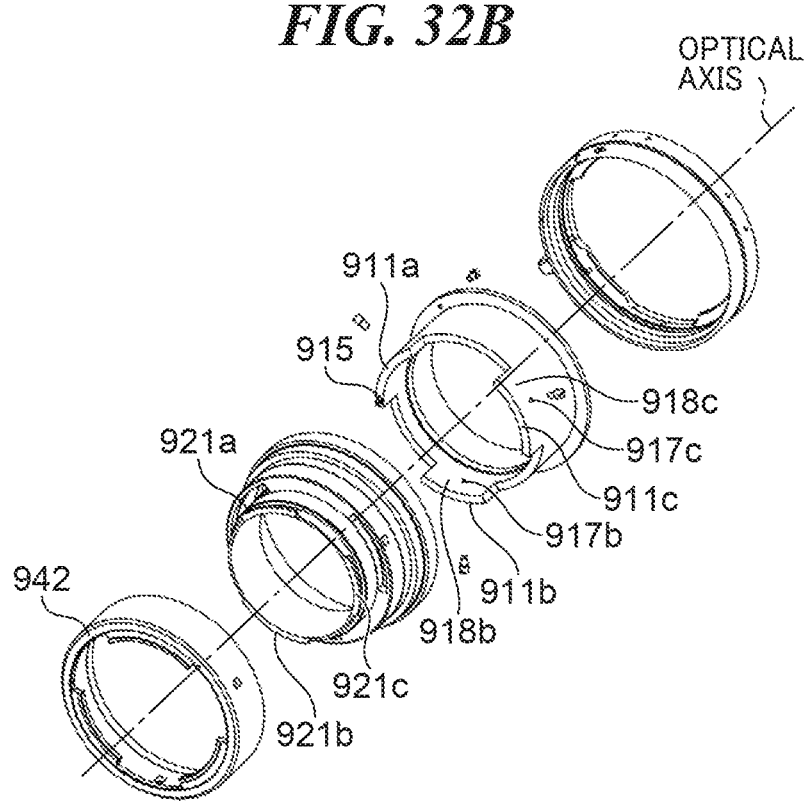
FIG. 32B is an exploded perspective view of the mount adapter.
Figure 33A:
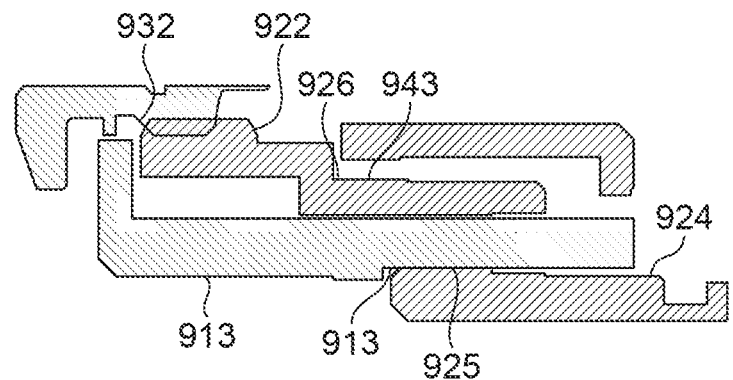
FIG. 33A is a cross-sectional view of the mount adapter.
Figure 33B:
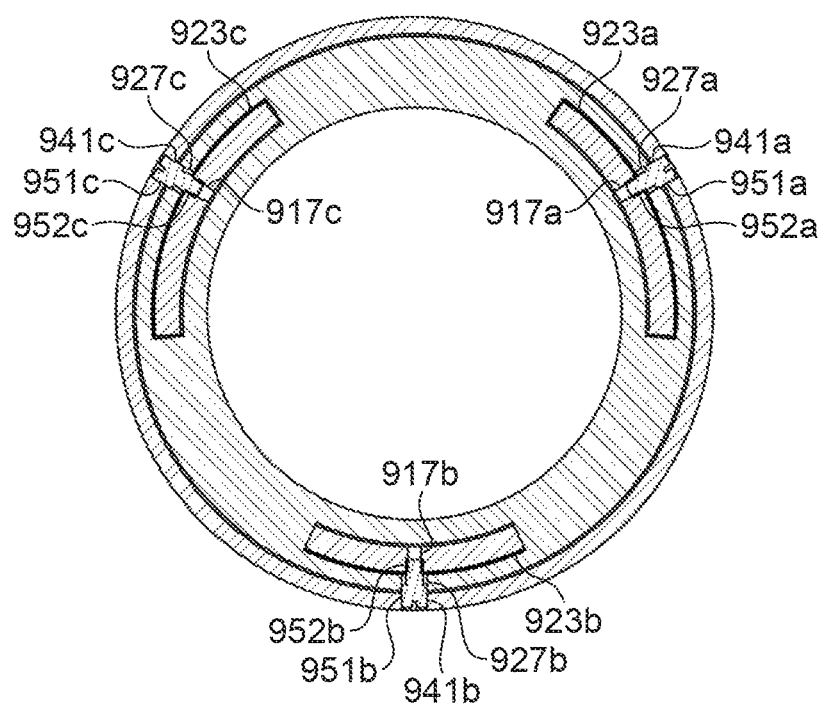
FIG. 33B is a cross-sectional view of the mount adapter.

FIGS. 32A and 32B are exploded perspective views of the mount adapter 900. A difference between FIGS. 32A and 32B is a difference in direction in which the mount adapter 900 is viewed. FIGS. 33A and 33B are cross-sectional views of the mount adapter 900. FIG. 33A is a cross-sectional view taken along a plane including an optical axis. Further, FIG. 33B is a cross-sectional view taken along a plane including first guide pins 950a to 950c described later and orthogonal to the optical axis.

The mount adapter 900 includes a fixed cylinder 910, a first movable cylinder (first movable part) 920, a second movable cylinder (second movable part) 930, an outer cylinder 940, first guide pins 950a to 950c, second guide pins 955a to 955c, a rotation stopping member 960, and an operation member 965. The fixed cylinder 910 includes a first mount surface 911a to 911c, a second mount surface 912, a cylindrical hole part 913, an engagement hole part 914, a rotation stopping concave part 915, screw holes 917a to 917d, and arm parts 918a to 918c. The first movable cylinder 920 includes first mount claw portions 921a to 921c, a male screw part 922, groove parts 923a to 923c, a cylindrical shaft part 924, a first engagement shaft part 925, a second engagement shaft part 926, and guide holes 927a to 927c. The groove parts 923a to 923c engage with the arm parts 918a to 918c of the fixed cylinder 910, respectively. The first engagement shaft part 925 engages with the engagement hole part 914 of the fixed cylinder 910. The second movable cylinder 930 includes second mount claw portions 931a to 931d and a female screw part 932. The female screw part 932 is screwed with the male screw part 922 of the first movable cylinder 920.

The outer cylinder 940 includes guide holes 941a to 941c, a mount surface 942, and an engagement hole part 943. The engagement hole part 943 engages with the second engagement shaft part 926 of the first movable cylinder 920. The first guide pins 950a to 950c include screw parts 951a to 951c and contact parts 952a to 952c. The first guide pins 950a to 950c are respectively inserted through the guide holes 941a to 941c of the outer cylinder 940 and the guide holes 927a to 927c of the first movable cylinder 920, and are respectively fixed to the screw holes 917a to 917c of the fixed cylinder 910. The rotation stopping member 960 is fixed to the fixed cylinder 910. The operation member 965 includes a knob part 966, and is fixed to the second movable cylinder 930.

Figure 34A:
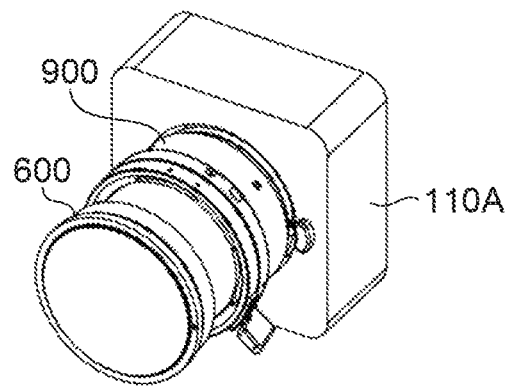
FIG. 34A is a perspective view showing a process of coupling an interchangeable lens to the mount adapter coupled to a camera body.
Figure 34B:
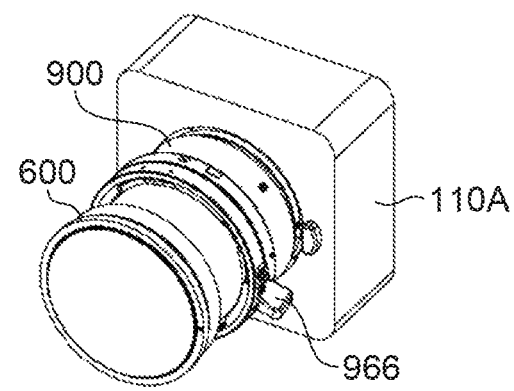
FIG. 34B is a perspective view showing the process of coupling the interchangeable lens to the mount adapter coupled to the camera body.
Figure 34C:
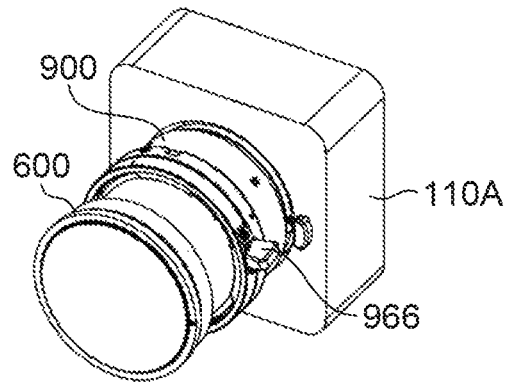
FIG. 34C is a perspective view showing the process of coupling the interchangeable lens to the mount adapter coupled to the camera body.
Figure 35A:
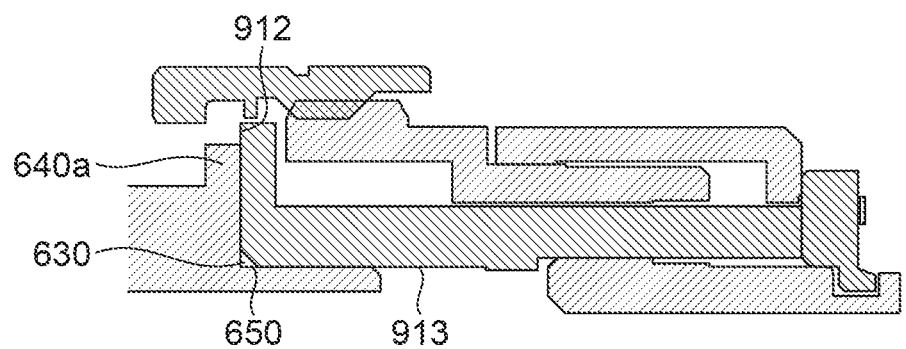
FIG. 35A is a cross-sectional view taken along a plane including an optical axis, corresponding to FIG. 34A.
Figure 35B:
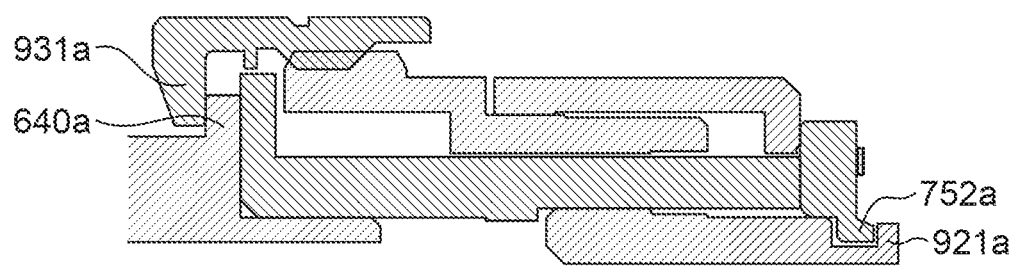
FIG. 35B is a cross-sectional view taken along the plane including the optical axis, corresponding to FIG. 34B.
Figure 35C:
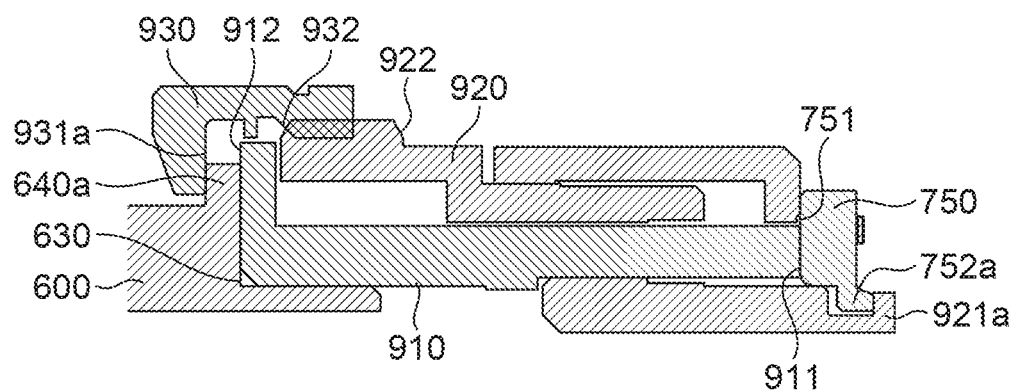
FIG. 35C is a cross-sectional view taken along the plane including the optical axis, corresponding to FIG. 34C.

FIGS. 34A to 34C are perspective views showing a process of coupling the interchangeable lens 600 to the mount adapter 900 coupled to the camera body 110A. FIGS. 35A to 35C are cross-sectional views taken along a plane including the optical axis, corresponding to FIGS. 34A to 34C. The mount adapter 900 is attached to the camera body 110A with a bayonet type mount, and description of the attachment process is omitted. The interchangeable lens 600 is attached to the mount adapter 900 with a structure similar to a screw type mount, as described later.

FIGS. 34A and 35A show a state where the interchangeable lens 600 has been brought into contact with the mount adapter 900 coupled to the camera body 110A. The cylindrical shaft part 650 of the interchangeable lens 600 and the cylindrical hole part 913 of the mount adapter 900 are engaged. Subsequently, the rotation stopping concave part 660 of the interchangeable lens 600 and the rotation stopping member 960 of the mount adapter 900 are engaged (see FIGS. 32A and 32B), and the mount surface 630 of the interchangeable lens 600 and the second mount surface 912 of the mount adapter 900 are brought into contact with each other. In this state, the mount claw portions 640a to 640d do not overlap the second mount claw portions 931a to 931d on the optical axis projection. It should be noted that there are gaps between the first mount claw portions 921a to 921c and the mount claw portions 752a to 752c of the lens mount 700, and rattling occurs between the camera body 110A and the mount adapter 900 by a size of the gap.

FIGS. 34B and 35B show a state where the interchangeable lens 600 is being coupled to the mount adapter 900 coupled to the camera body 110A. When the knob part 966 is rotated clockwise around the optical axis when viewed from the side of the interchangeable lens 600, the mount claw portions 640a to 640d and the second mount claw portions 931a to 931d overlap on the optical axis projection and begin to engage with each other. At this point of time, a gap is formed between the first mount claw portions 921a to 921c of the mount adapter 900 and the mount claw portions 752a to 752c of the lens mount 700 (camera body 110A). Further, the first mount claw portions 921a to 921c are movable in the optical axis direction with respect to the fixed cylinder 910. This means that there are gaps between the mount claw portions 640a to 640d and the second mount claw portions 931a to 931d. That is, rattling occurs between the interchangeable lens 600 and the mount adapter 900 and between the mount adapter 900 and the camera body 110A.

FIGS. 34C and 35C show a state where coupling between the interchangeable lens 600 and the mount adapter 900 coupled to the camera body 110A has been completed. When the knob part 966 is further rotated, the first mount claw portions 921a to 921c and the mount claw portions 752a to 752c come into pressure contact engagement with each other. By the fastening force of the mount adapter 900 generated in this way, the following first to fifth parts are subjected to pressure contact. The first part is a contact part between the mount surface 751 of the mount member 750 of the lens mount 700 and the first mount surface 911 of the fixed cylinder 910 of the mount adapter 900. The second part is a contact part between the second mount surface 912 of the fixed cylinder 910 of the mount adapter 900 and the mount surface 630 of the interchangeable lens 600. The third part is an engagement part between the mount claw portions 640a to 640d of the interchangeable lens 600 and the second mount claw portions 931a to 931d of the second movable cylinder 930 of the mount adapter 900. The fourth part is a screwing part between the female screw part 932 of the second movable cylinder 930 and the male screw part 922 of the first movable cylinder 920 in the mount adapter 900. The fifth part is an engagement part between the first mount claw portions 921a to 921c of the first movable cylinder 920 of the mount adapter 900 and the mount claw portions 752a to 752c of the mount member 750 of the lens mount 700.

That is, considering the second mount claw portions 931a to 931d of the second movable cylinder 930 as a reference, the first mount claw portions 921a to 921c of the first movable cylinder 920 draw the mount claw portions 752a to 752c of the mount member 750 toward the interchangeable lens 600 side. At the same time, the second mount claw portions 931a to 931c of the second movable cylinder 930 draw the mount claw portions 640a to 640d of the interchangeable lens 600 toward the camera body 110A side. At this time, the fixed cylinder 910 functions as a spacer between the interchangeable lens 600 and the camera body 110A. In this way, the screw fastening force of the mount adapter 900 is transmitted to the camera body 110A and the interchangeable lens 600, so that the camera body 110A, the mount adapter 900, and the interchangeable lens 600 are coupled without rattling.

In the present embodiment, the configuration in which the screw type mount is provided on the second mount surface 912 side of the mount adapter 900 has been described. However, the screw type mount does not necessarily need to be provided on the second mount surface 912 side of the mount adapter 900, and may be provided on the first mount surface 911 side. Further, although the form in which the bayonet type mount is used for coupling the mount adapter 900 and the camera body 110A has been described, the screw type mount may be used for the coupling.

Fifth Embodiment

Figure 36:
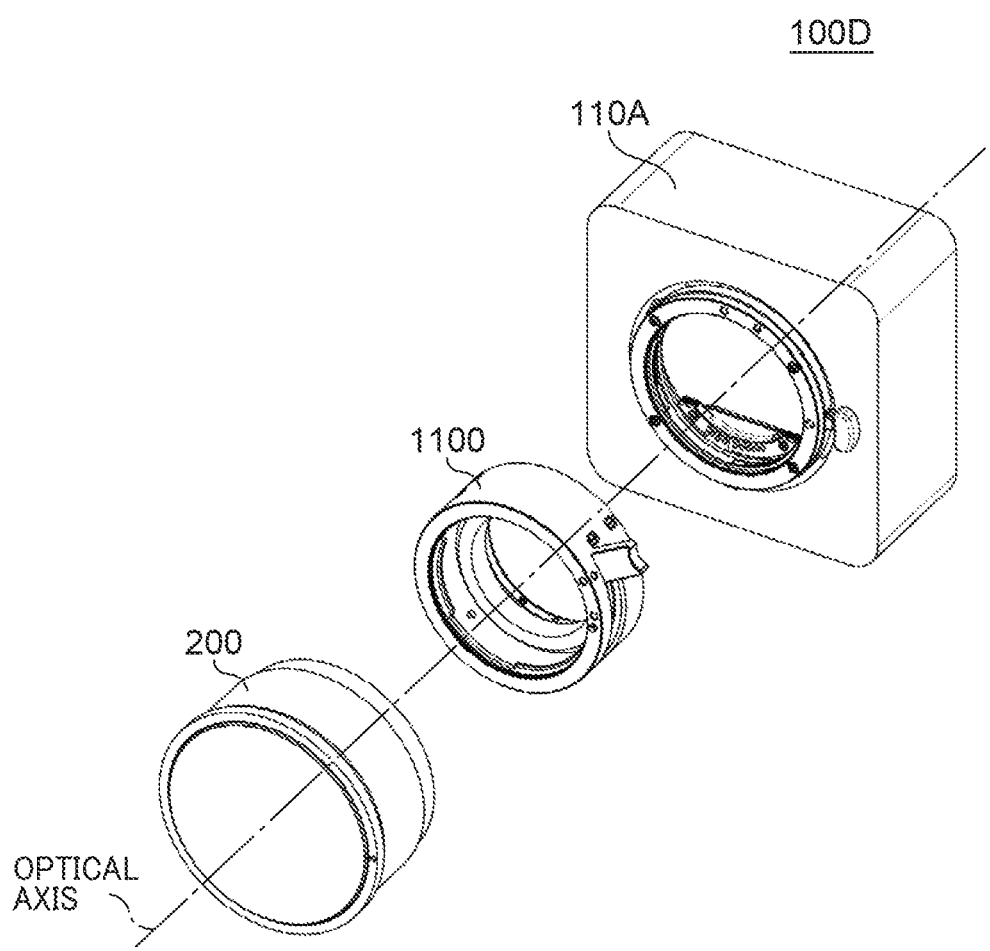
FIG. 36 is an exploded perspective view of an image pickup apparatus according to a fifth embodiment of the present invention.

FIG. 36 is an exploded perspective view of an image pickup apparatus 100D according to a fifth embodiment of the present invention. The image pickup apparatus 100D includes an interchangeable lens 200, a mount adapter 1100, and a camera body 110A. Since the interchangeable lens 200 is the same as an interchangeable lens 200 configuring an image pickup apparatus 100 described in the first embodiment, description thereof is omitted. Further, since the camera body 110A is the same as a camera body 110A configuring an image pickup apparatus 100B described in the third embodiment, description thereof is omitted.

Figure 37A:
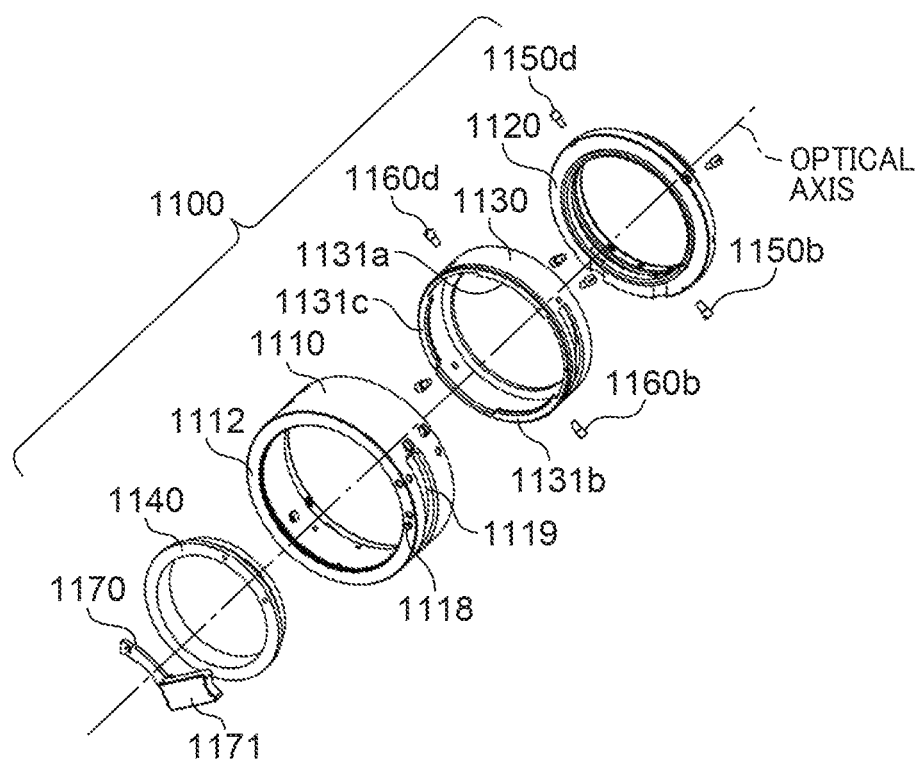
FIG. 37A is an exploded perspective view of a mount adapter.
Figure 37B:
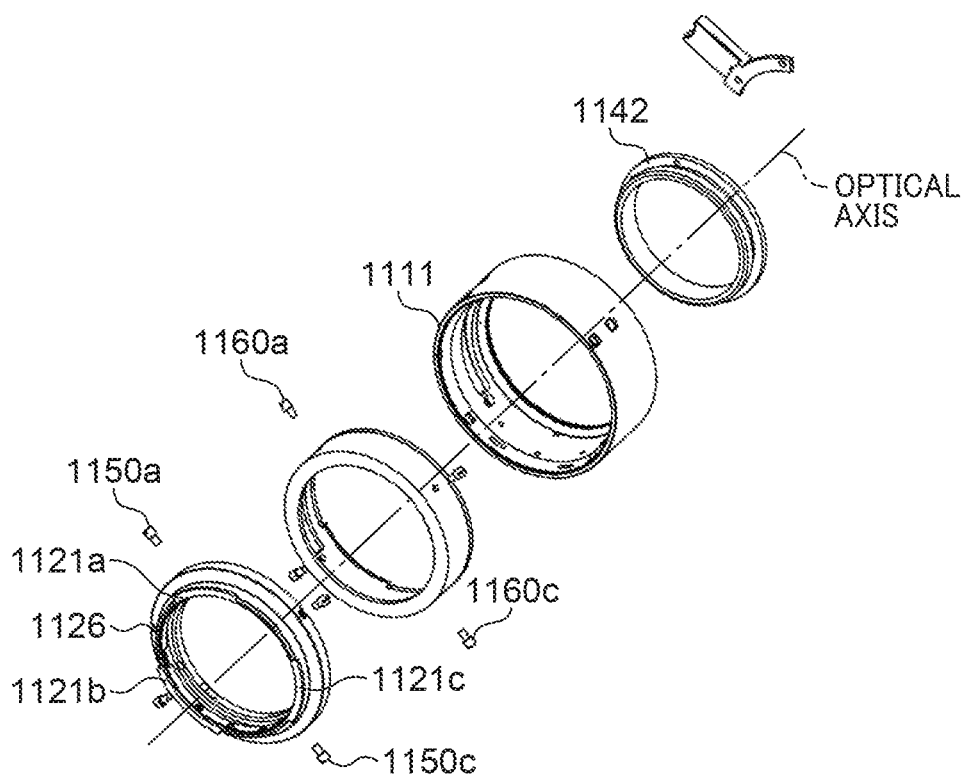
FIG. 37B is an exploded perspective view of the mount adapter.
Figure 38:
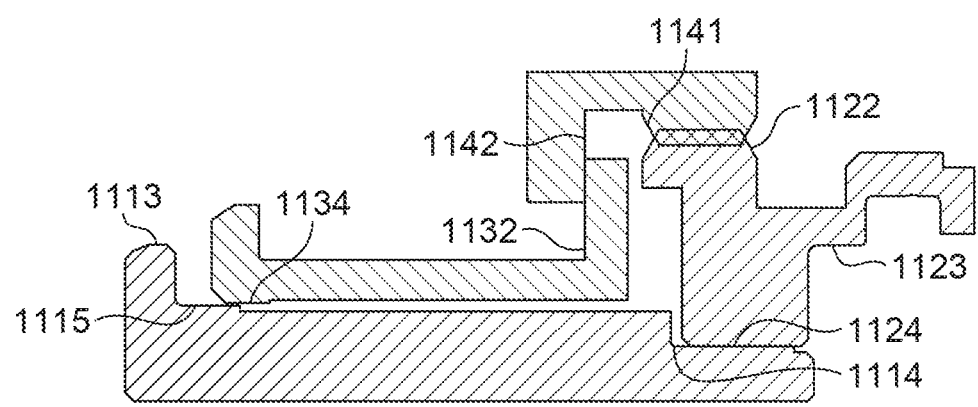
FIG. 38 is a cross-sectional view of the mount adapter taken along a plane including an optical axis.
Figure 39A:
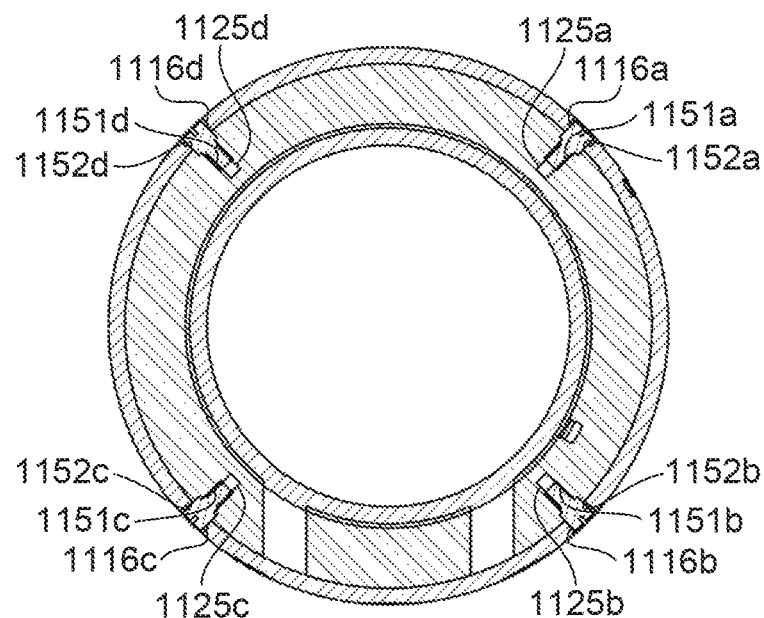
FIG. 39A is a cross-sectional view of the mount adapter taken along a plane orthogonal to an optical axis.
Figure 39B:
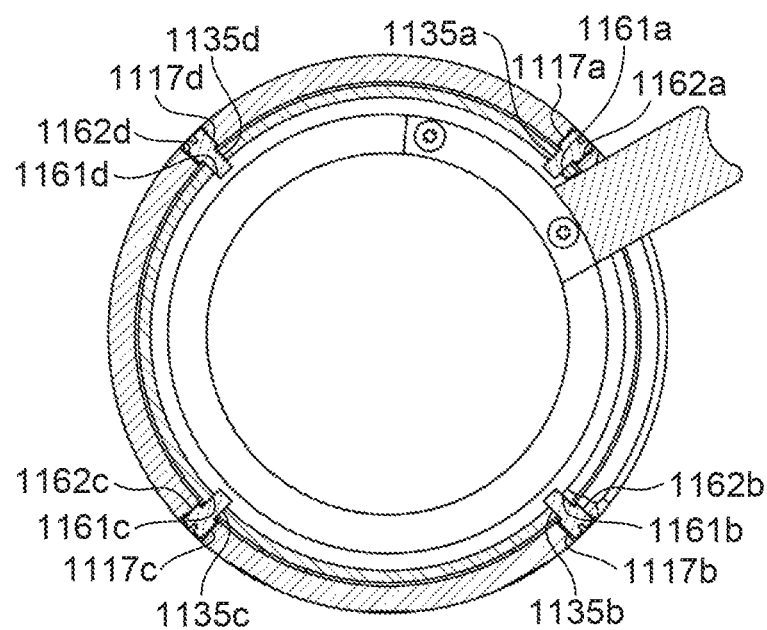
FIG. 39B is a cross-sectional view of the mount adapter taken along the plane orthogonal to the optical axis.

FIGS. 37A and 37B are exploded perspective views of the mount adapter 1100. It should be noted that a difference between FIGS. 37A and 37B is a difference in direction in which the mount adapter 1100 is viewed. FIG. 38 is a cross-sectional view of the mount adapter 1100 taken along a plane including an optical axis. FIG. 39A is a cross-sectional view taken along a plane including first guide pins 1150a to 1150d described later and orthogonal to the optical axis. FIG. 39B is a cross-sectional view taken along a plane including second guide pins 1160a to 1160d described later and orthogonal to the optical axis.

The mount adapter 1100 includes a fixed cylinder 1110, a first movable cylinder (first movable part) 1120, a second movable cylinder (second movable part) 1130, a movable annular member 1140, and first guide pins 1150a to 1150d, second guide pins 1160a to 1160d, and an operation member 1170. The fixed cylinder 1110 includes a first mount surface 1111, a second mount surface 1112, a cylindrical hole part 1113, a first engagement hole part 1114, and a second engagement hole part 1115. Further, the fixed cylinder 1110 includes first guide holes 1116a to 1116d, second guide holes 1117a to 1117d, a rotation stopping convex part 1118, and an operation groove part 1119.

The first movable cylinder 1120 includes first mount claw portions 1121a to 1121c, a female screw part 1122, a cylindrical shaft part 1123, an engagement shaft part 1124, screw hole parts 1125a to 1125d, and a rotation stopping concave part 1126. The engagement shaft part 1124 engages with the first engagement hole part 1114 of the fixed cylinder 1110. The second movable cylinder 1130 includes second mount claw portions 1131a to 1131c, a flange receiving part 1132, an engagement shaft part 1134, and screw hole parts 1135a to 1135d. The engagement shaft part 1134 engages with the second engagement hole part 1115 of the fixed cylinder 1110.

The movable annular member 1140 includes a male screw part 1141 and a flange part 1142. The male screw part 1141 is screwed with the female screw part 1122 of the first movable cylinder 1120. The flange part 1142 engages (comes into contact) with the flange receiving part 1132 of the second movable cylinder 1130. The first guide pins 1150a to 1150d include screw parts 1151a to 1151d and contact parts 1152a to 1152d. The screw parts 1151a to 1151d are fastened to the screw hole parts 1125a to 1125d of the first movable cylinder 1120, respectively. The contact parts 1152a to 1152d engage with the first guide holes 1116a to 1116d of the fixed cylinder 1110, respectively. The contact parts 1152a to 1152d come into contact with the surfaces orthogonal to the optical axis in the first guide holes 1116a to 1116d, so that the first movable cylinder 1120 is prevented from falling off the fixed cylinder 1110. Further, the contact parts 1152a to 1152d engage with the surfaces of the first guide holes 1116a to 1116d parallel to the optical axis, so that the first movable cylinder 1120 is prevented from rotating around the optical axis with respect to the fixed cylinder 1110.

The second guide pins 1160a to 1160d include screw parts 1161a to 1161d and contact parts 1162a to 1162d. The screw parts 1161a to 1161d are fastened to the screw hole parts 1135a to 1135d of the second movable cylinder 1130, respectively. The contact parts 1162a to 1162d engage with the second guide holes 1117a to 1117d of the fixed cylinder 1110, respectively. The contact parts 1162a to 1162d come into contact with the surfaces perpendicular to the optical axis in the second guide holes 1117a to 1117d, so that the second movable cylinder 1130 is prevented from falling off the fixed cylinder 1110. Further, the contact parts 1162a to 1162d engage with the surfaces of the second guide holes 1117a to 1117d parallel to the optical axis, so that the second movable cylinder 1130 is prevented from rotating around the optical axis with respect to the fixed cylinder 1110. The operation member 1170 includes an operation part 1171. The operation member 1170 is fixed to the movable annular member 1140, and by rotating the operation part 1171, the movable annular member 1140 can be rotated around the optical axis.

Figure 40A:
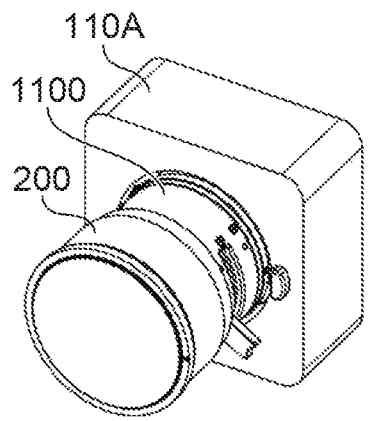
FIG. 40A is a perspective view showing a process of coupling a camera body, a mount adapter, and an interchangeable lens.
Figure 40B:
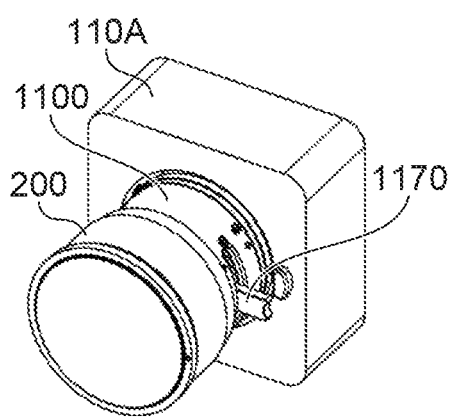
FIG. 40B is a perspective view showing the process of coupling the camera body, the mount adapter, and the interchangeable lens.
Figure 40C:
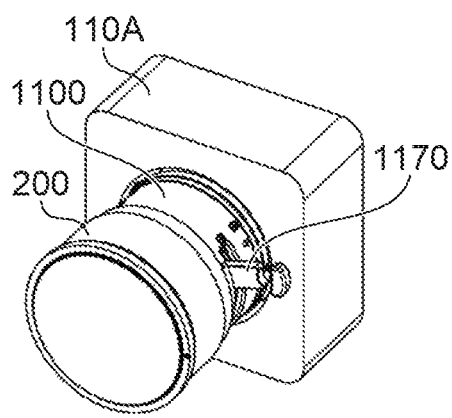
FIG. 40C is a perspective view showing the process of coupling the camera body, the mount adapter, and the interchangeable lens.
Figure 41A:
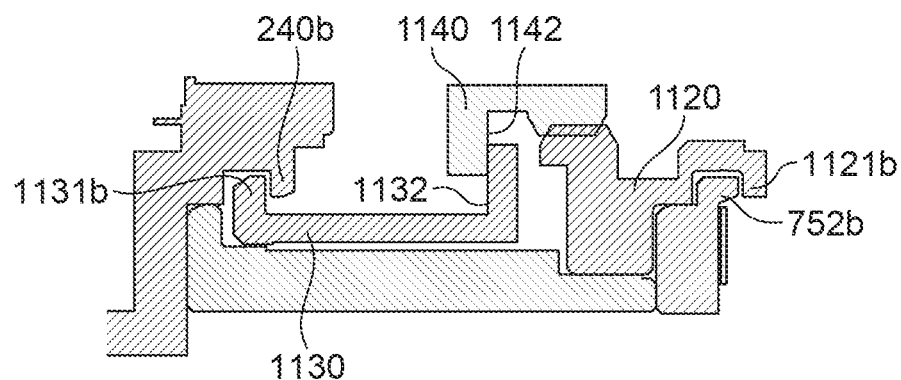
FIG. 41A is a cross-sectional view taken along a plane including an optical axis, corresponding to FIG. 40A.
Figure 41B:
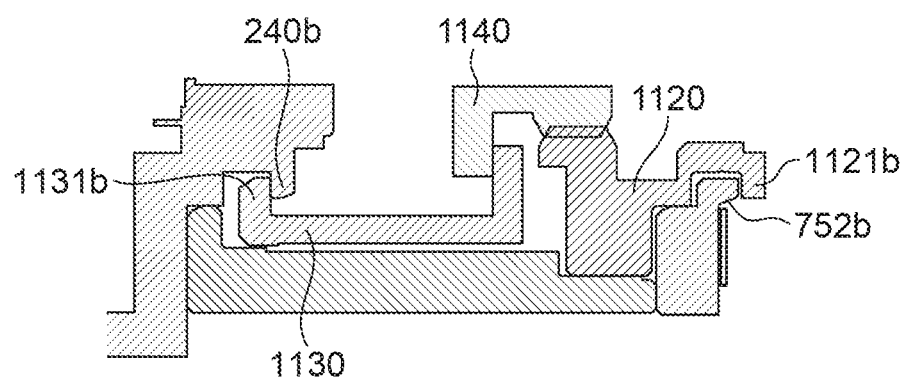
FIG. 41B is a cross-sectional view taken along the plane including the optical axis, corresponding to FIG. 40B.
Figure 41C:
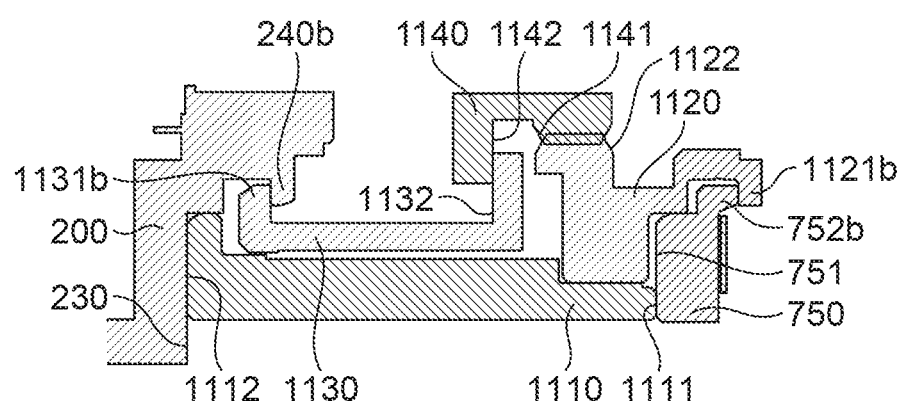
FIG. 41C is a cross-sectional view taken along the plane including the optical axis, corresponding to FIG. 40C.

FIGS. 40A to 40C are perspective views showing a process of coupling the camera body 110A, the mount adapter 1100, and the interchangeable lens 200. FIGS. 41A to 41C are cross-sectional views taken along a plane including the optical axis, corresponding to FIGS. 40A to 40C. The mount adapter 1100 is first attached to the camera body 110A with a bayonet type mount, and then coupled in a structure similar to a screw type mount. Similarly, the interchangeable lens 200 is first attached to the mount adapter 1100 with the bayonet type mount, and then coupled in a structure similar to the screw type mount.

FIGS. 40A and 41A show a state where the camera body 110A and the interchangeable lens 200 have been attached to the mount adapter 1100 with the bayonet type mount. In this state, the flange receiving part 1132 of the second movable cylinder 1130 and the flange part 1142 of the movable annular member 1140 come into contact with each other. However, since there is a gap between the mount claw portion 240b of the interchangeable lens 200 and the second mount claw portion 1131b of the second movable cylinder 1130 engaging with each other, rattling occurs between the interchangeable lens 200 and the mount adapter 1100. Further, since there is a gap between the mount claw portion 752b of the camera body 110A (lens mount 700) and the first mount claw portion 1121b of the first movable cylinder 1120 engaging with each other, rattling occurs between the camera body 110A and the mount adapter 1100.

FIGS. 40B and 41B show a state where the interchangeable lens 200 and the camera body 110A are being coupled to the mount adapter 1100 with a structure similar to the screw type mount. The operation member 1170 is rotated counterclockwise around the optical axis when viewed from the interchangeable lens 200 side. As a result, the mount claw portion 240b and the second mount claw portion 1131b come into contact with each other. However, as shown in FIG. 41B, there is a gap between the mount claw portion 752b and the first mount claw portion 1121b. Here, the movable annular member 1140 screwed to the first movable cylinder 1120 is movable in an optical axis direction with respect to the fixed cylinder 1110, and the second movable cylinder 1130 is also movable in the optical axis direction. Therefore, this means that there are gaps between the mount claw portions 240a to 240c of the interchangeable lens 200 and the second mount claw portions 1131a to 1131c of the mount adapter 1100. That is, in the state of FIGS. 40B and 41B, rattling occurs between the interchangeable lens 200 and the mount adapter 1100 and between the mount adapter 1100 and the camera body 110A.

FIGS. 40C and 41C show a state where the interchangeable lens 200 and the camera body 110A have been coupled to the mount adapter 1100 with a structure similar to the screw type mount. When the operation member 1170 is further rotated counterclockwise around the optical axis when viewed from the interchangeable lens 200 side, the first mount claw portion 1121b and the mount claw portion 752b come into pressure contact engagement with each other, as shown in FIG. 41C. Similarly, the first mount claw portions 1121a and 1121c and the mount claw portions 752a and 752c come into pressure contact engagement with each other.

By the fastening force of the mount adapter 1100 generated in this way, the following first to sixth parts are subjected to pressure contact. The first part is a contact part between the mount surface 751 of the mount member 750 of the lens mount 700 and the first mount surface 1111 of the fixed cylinder 1110 of the mount adapter 1100. The second part is a contact part between the second mount surface 1112 of the fixed cylinder 1110 of the mount adapter 1100 and the mount surface 230 of the interchangeable lens 200. The third part is an engagement part between the mount claw portion 240b of the interchangeable lens 200 and the second mount claw portion 1131b of the second movable cylinder 1130 of the mount adapter 1100. The fourth part is a contact part between the flange receiving part 1132 of the second movable cylinder 1130 and the flange part 1142 of the movable annular member 1140 in the mount adapter 1100. The fifth part is a screwing part between the male screw part 1141 of the movable annular member 1140 and the female screw part 1122 of the first movable cylinder 1120 in the mount adapter 1100. The sixth part is an engagement part between the first mount claw portion 1121b of the first movable cylinder 1120 of the mount adapter 1100 and the mount claw portion 752b of the mount member 750 of the lens mount 700.

That is, considering the second mount claw portions 1131a to 1131c of the second movable cylinder 1130 as a reference, the following movement occurs. That is, the first mount claw portions 1121a to 1121c of the first movable cylinder 1120 screwed to the movable annular member 1140 draw the mount claw portions 752a to 752c of the mount member 750 toward the interchangeable lens 200 side via the movable annular member 1140. At the same time, the second mount claw portions 1131a to 1131c of the second movable cylinder 1130 draw the mount claw portions 240a to 240c of the interchangeable lens 200 toward the camera body 110A side. At this time, the fixed cylinder 1110 functions as a spacer between the interchangeable lens 200 and the camera body 110A. In this way, the screw fastening force of the mount adapter 1100 is transmitted to the camera body 110A and the interchangeable lens 200, so that the camera body 110A, the mount adapter 1100, and the interchangeable lens 200 can be coupled without rattling.

In the present embodiment, the method for coupling the interchangeable lens 200 and the camera body 110A via the mount adapter 1100 without rattling by the screw type mount provided on the first mount surface 1111 side of the mount adapter 1100 has been described. However, the screw type mount does not necessarily need to be provided on the first mount surface 1111 side of the mount adapter 1100, and may be provided on the second mount surface 1112 side. Further, the screw type mount does not need to be provided for only one of the mount adapter 1100, the interchangeable lens 200, and the camera body 110A. For example, the screw type mount may be provided on the interchangeable lens 200 or the camera body 110A, in addition to the mount adapter 1100.

Sixth Embodiment

Figure 42:
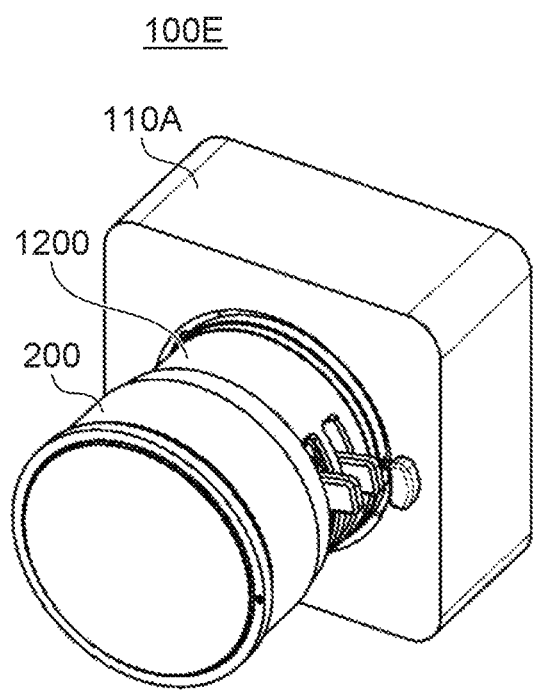
FIG. 42 is an external perspective view of an image pickup apparatus according to a sixth embodiment of the present invention.

FIG. 42 is an external perspective view of an image pickup apparatus 100E according to a sixth embodiment of the present invention. The image pickup apparatus 100E includes an interchangeable lens 200, a mount adapter 1200, and a camera body 110A. Since the interchangeable lens 200 is the same as an interchangeable lens 200 configuring an image pickup apparatus 100 described in the first embodiment, description thereof is omitted herein. Further, since the camera body 110A is the same as a camera body 110A configuring an image pickup apparatus 100B described in the third embodiment, description thereof is omitted herein.

Figure 43A:
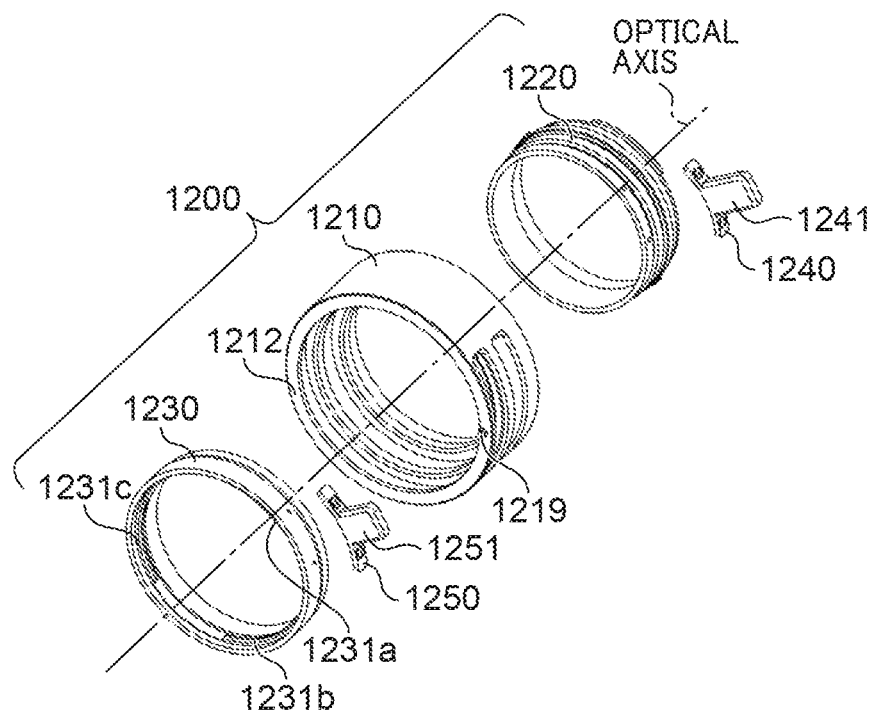
FIG. 43A is an exploded perspective view of a mount adapter.
Figure 43B:
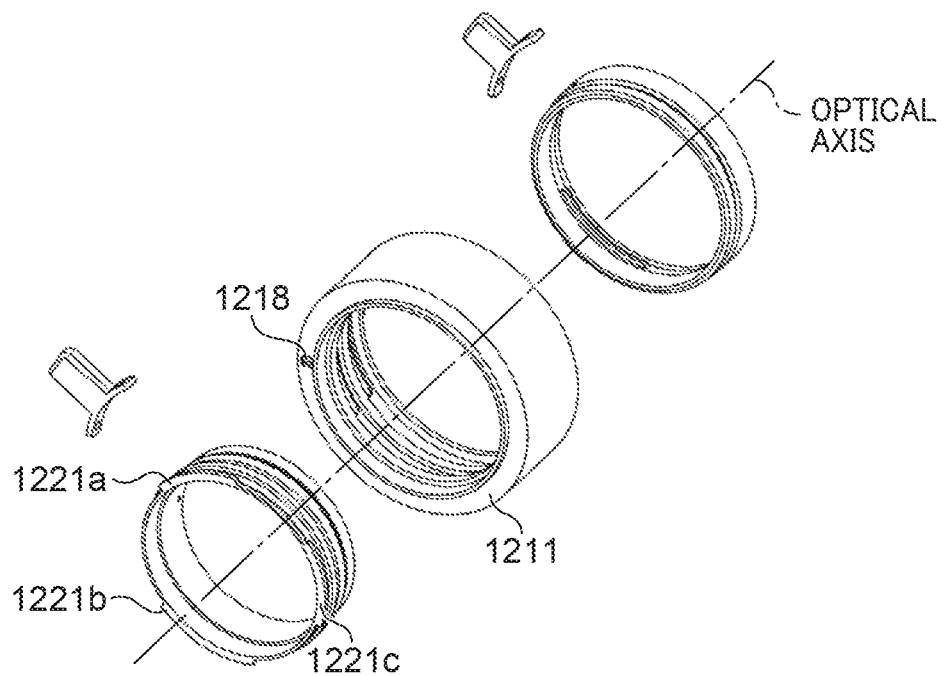
FIG. 43B is an exploded perspective view of the mount adapter.
Figure 44:
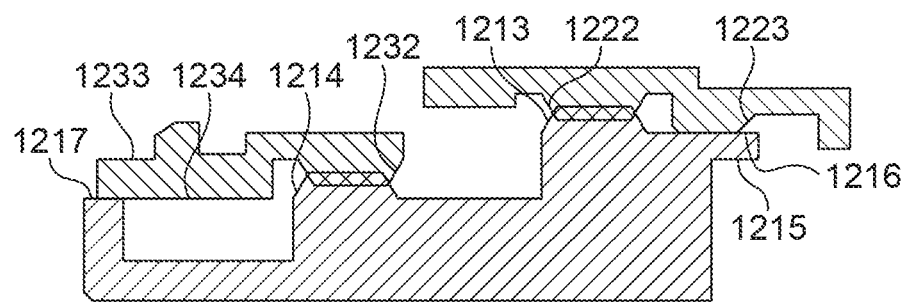
FIG. 44 is a cross-sectional view of the mount adapter taken along a plane including an optical axis.

FIGS. 43A and 43B are exploded perspective views of the mount adapter 1200. A difference between FIGS. 43A and 43B is a difference in direction in which the mount adapter 1200 is viewed. FIG. 44 is a cross-sectional view of the mount adapter 1200 taken along a plane including an optical axis. The mount adapter 1200 includes a fixed cylinder 1210, a first movable cylinder (movable part) 1220, a second movable cylinder (movable part) 1230, a first operation member 1240, and a second operation member 1250. The fixed cylinder 1210 includes a first mount surface 1211, a second mount surface 1212, a first female screw part 1213, a second female screw part 1214, a cylindrical shaft part 1215, a first engagement hole part 1216, a second engagement hole part 1217, a rotation stopping concave part 1218, and a rotation stopping convex part 1219.

The first movable cylinder 1220 includes first mount claw portions 1221a to 1221c, a first male screw part 1222, and an engagement shaft part 1223. The first male screw part 1222 is screwed with the first female screw part 1213 of the fixed cylinder 1210, and the engagement shaft part 1223 engages with the first engagement hole part 1216 of the fixed cylinder 1210. The second movable cylinder 1230 includes second mount claw portions 1231a to 1231c, a second male screw part 1232, a cylindrical hole part 1233, and an engagement shaft part 1234. The second male screw part 1232 is screwed with the second female screw part 1214 of the fixed cylinder 1210, and the engagement shaft part 1234 engages with the second engagement hole part 1217 of the fixed cylinder 1210.

The first operation member 1240 includes an operation part 1241. The first operation member 1240 is attached to the first movable cylinder 1220, and the operation part 1241 protrudes from a groove part provided in a circumferential direction on the fixed cylinder 1210 toward outer circumference. The second operation member 1250 includes an operation part 1251. The second operation member 1250 is attached to the second movable cylinder 1230, and the operation part 1242 protrudes from a groove part provided in the circumferential direction on the fixed cylinder 1210 toward the outer circumference.

Figure 45A:
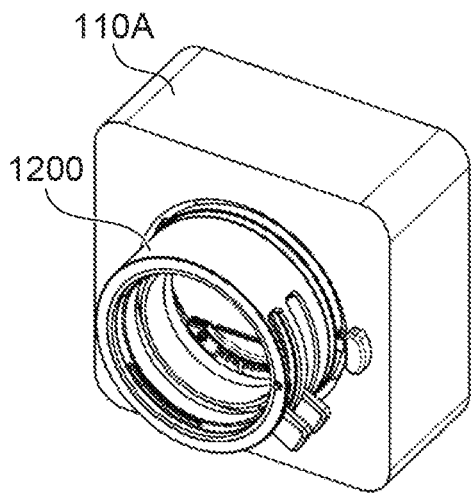
FIG. 45A is a perspective view showing a process of coupling the mount adapter to a camera body.
Figure 45B:
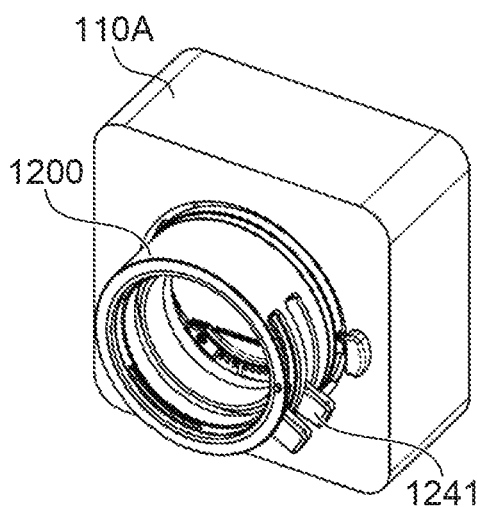
FIG. 45B is a perspective view showing the process of coupling the mount adapter to the camera body.
Figure 45C:
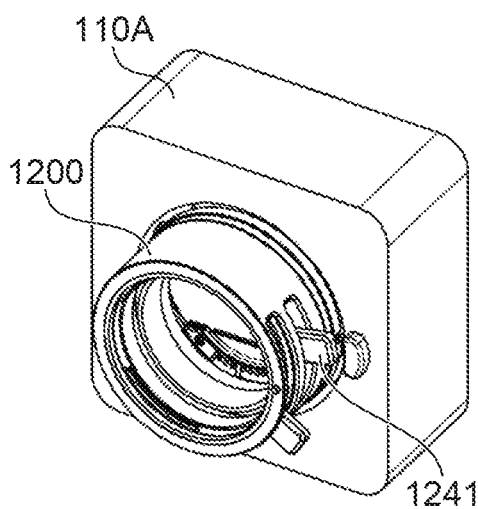
FIG. 45C is a perspective view showing the process of coupling the mount adapter to the camera body.
Figure 46A:
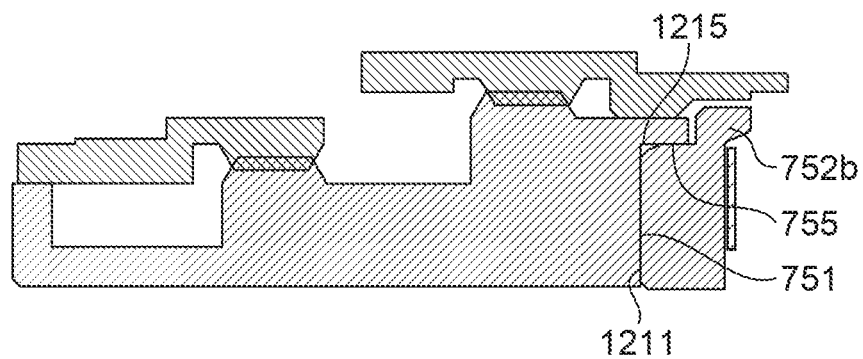
FIG. 46A is a cross-sectional view taken along a plane including the optical axis, corresponding to FIG. 45A.
Figure 46B:
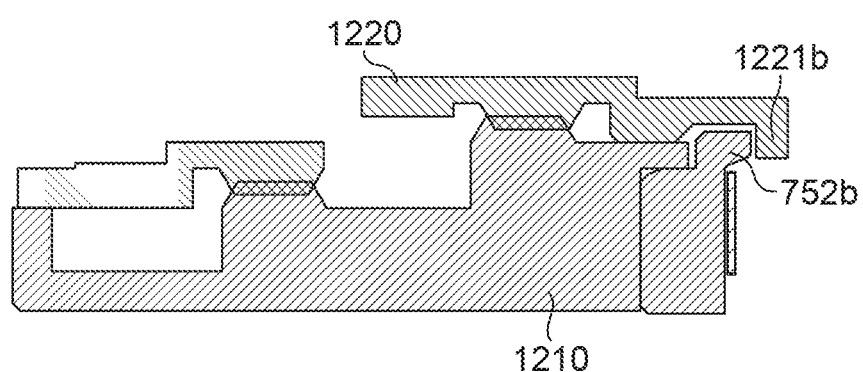
FIG. 46B is a cross-sectional view taken along the plane including the optical axis, corresponding to FIG. 45B.
Figure 46C:
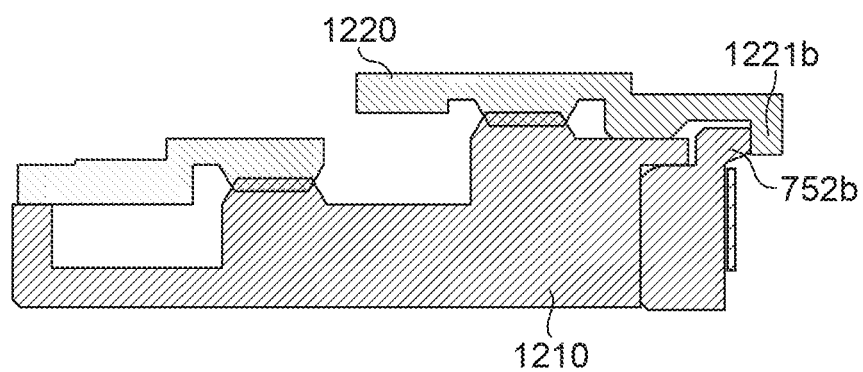
FIG. 46C is a cross-sectional view taken along the plane including the optical axis, corresponding to FIG. 45C.

FIGS. 45A to 45C are perspective views showing a process of coupling the mount adapter 1200 to the camera body 110A. FIGS. 46A to 46C are cross-sectional views taken along a plane including the optical axis, respectively corresponding to FIGS. 45A to 45C. FIGS. 45A and 46A show a state where the mount adapter 1200 has been brought in contact with the camera body 110A. First, the first convex part 771 of the lens mount 700 and the rotation stopping concave part 1218 of the mount adapter 1200 are engaged with each other (see FIG. 20 as appropriate). Subsequently, the cylindrical hole part 755 of the lens mount 700 and the cylindrical shaft part 1215 of the mount adapter 1200 are engaged with each other. Then, the mount surface 751 of the lens mount 700 and the first mount surface 1211 of the mount adapter 1200 are brought into contact with each other. At this time, the mount claw portions 752a to 752c of the lens mount 700 and the first mount claw portions 1221a to 1221c of the mount adapter 1200 do not overlap on optical axis projection.

FIGS. 45B and 46B show a state where the mount adapter 1200 is being coupled to the camera body 110A. When the operation part 1241 of the mount adapter 1200 is rotated counterclockwise around the optical axis when viewed from the front side of the mount adapter 1200 (the side to which the interchangeable lens 200 is coupled), the first movable cylinder 1220 of the mount adapter 1200 rotates around the optical axis. At the same time, since the first movable cylinder 1220 is screwed with the fixed cylinder 1210, the first movable cylinder 1220 moves in an optical axis direction toward the front side of the mount adapter 1200. As a result, as shown in FIG. 46B, the mount claw portion 752b and the first mount claw portion 1221b begin to overlap on optical axis projection, and at the same time, a distance in the optical axis direction between the mount claw portion 752b and the first mount claw portion 1221b is reduced. Similarly, the mount claw portions 752a and 752c and the first mount claw portions 1221a and 1221c begin to overlap on the optical axis projection, and a distance in the optical axis direction between the mount claw portions 752a and 752c and the first mount claw portions 1221a and 1221c is also reduced. However, since there are gaps between the mount claw portions 752a to 752c and the first mount claw portions 1221a to 1221c, rattling occurs between the camera body 110A (lens mount 700) and the mount adapter 1200.

FIGS. 45C and 46C show a state where coupling between the mount adapter 400 and the camera body 110A has been completed. The operation part 1241 is rotated further counterclockwise around the optical axis when viewed from the front side of the mount adapter 400, as compared with the state shown in FIG. 45B. Then, as shown in FIG. 46C, the mount claw portion 752b and the first mount claw portion 1221b come into pressure contact and engage with each other (hereinafter, referred to as "pressure contact engagement"). Similarly, the mount claw portion 752a and the first mount claw portion 1221a come into pressure contact engagement with each other, and the mount claw portion 752c and the first mount claw portion 1221c come into pressure contact engagement with each other. That is, considering the mount adapter 1200 as a reference, the mount claw portions 752a to 752c are drawn toward the mount adapter 1200 by the screw fastening force generated by rotating the first movable cylinder 1220 with respect to the fixed cylinder 1210. In this way, there is no gap between the mount claw portions 752a to 752c and the first mount claw portions 1221a to 1221c, and the camera body 110A (lens mount 700) and the mount adapter 1200 are coupled without rattling.

Figure 47A:
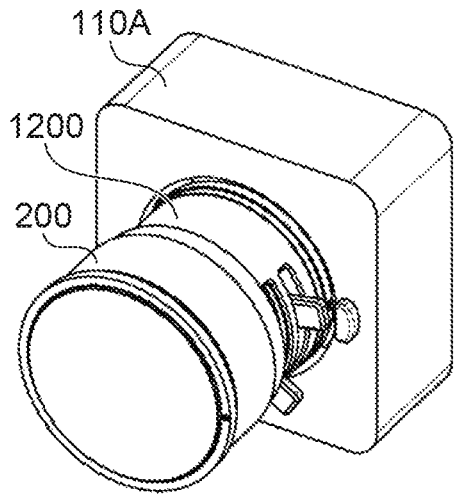
FIG. 47A is a diagram showing a process of coupling the interchangeable lens to the mount adapter coupled to the camera body.
Figure 47B:
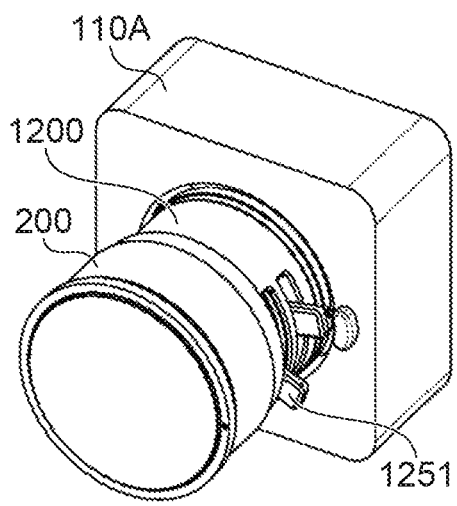
FIG. 47B is a diagram showing the process of coupling the interchangeable lens to the mount adapter coupled to the camera body.
Figure 47C:
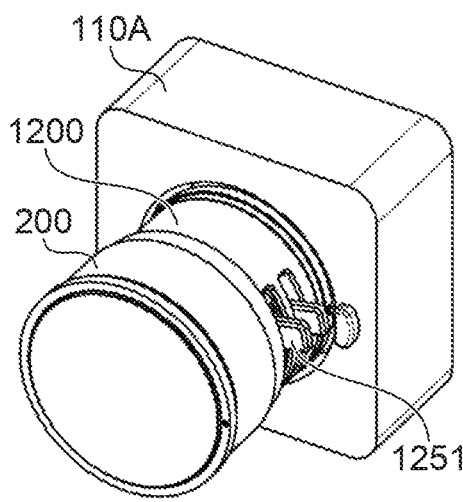
FIG. 47C is a diagram showing the process of coupling the interchangeable lens to the mount adapter coupled to the camera body.
Figure 48A:
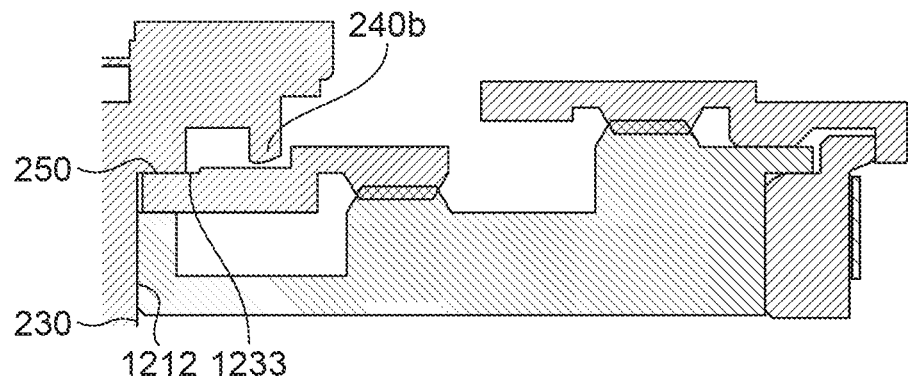
FIG. 48A is a cross-sectional view taken along a plane including an optical axis, corresponding to FIG. 47A.
Figure 48B:
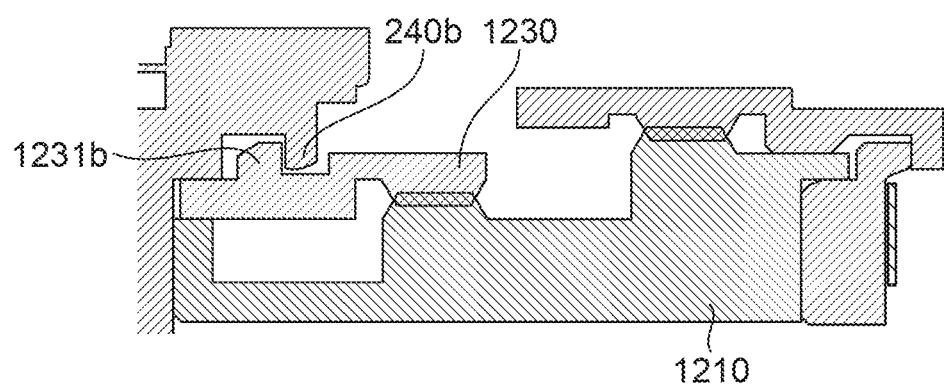
FIG. 48B is a cross-sectional view taken along the plane including the optical axis, corresponding to FIG. 47B.
Figure 48C:
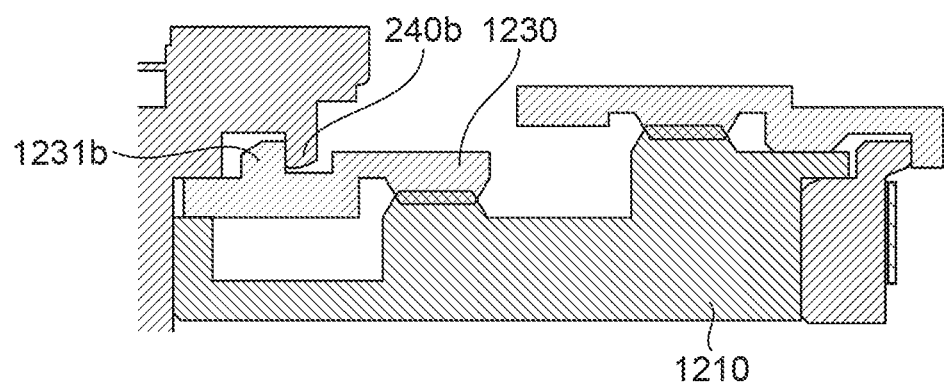
FIG. 48C is a cross-sectional view taken along the plane including the optical axis, corresponding to FIG. 47C.

FIGS. 47A to 47C are diagrams showing a process of coupling the interchangeable lens 200 to the mount adapter 1200 coupled to the camera body 110A. FIGS. 48A to 48C are cross-sectional views taken along a plane including the optical axis, respectively corresponding to FIGS. 47A to 47C. FIGS. 47A and 48A show a state where the interchangeable lens 200 is brought into contact with the mount adapter 1200. First, the rotation stopping convex part 1219 of the mount adapter 1200 and the rotation stopping concave part 260 of the interchangeable lens 200 are engaged with each other (see FIGS. 2 and 43). Subsequently, the cylindrical hole part 1233 of the mount adapter 1200 and the cylindrical shaft part 250 of the interchangeable lens 200 are engaged with each other, and the second mount surface 1212 of the mount adapter 1200 and the mount surface 230 of the interchangeable lens 200 are brought into contact with each other. At this time, the second mount claw portions 1231a to 1231c of the mount adapter 1200 and the mount claw portions 240a to 240c of the interchangeable lens 200 do not overlap on the optical axis projection.

FIGS. 47B and 48B show a state where the interchangeable lens 200 is being coupled to the mount adapter 400. When the operation part 1251 of the mount adapter 1200 is rotated counterclockwise around the optical axis when viewed from the interchangeable lens 200 side, the second movable cylinder 1230 of the mount adapter 1200 rotates around the optical axis. At the same time, since the second movable cylinder 1230 is screwed with the fixed cylinder 1210, the second movable cylinder 1230 moves in the optical axis direction toward the camera body 110A side. As a result, as shown in FIG. 48B, the second mount claw portion 1231b and the mount claw portion 240b begin to overlap on the optical axis projection, and at the same time, a distance in the optical axis direction between the second mount claw portion 1231b and the mount claw portion 240b is reduced. Similarly, the second mount claw portions 1231a and 1231c and the mount claw portions 240a and 240c begin to overlap on the optical axis projection, and a distance in the optical axis direction between the second mount claw portions 1231a and 1231c and the mount claw portions 240a and 240c is reduced. However, in the state shown in FIGS. 47B and 48B, there are gaps between the second mount claw portions 1231a to 1231c and the mount claw portions 240a to 240c. That is, rattling occurs between the mount adapter 400 and the interchangeable lens 200.

FIGS. 47C and 48C show a state where the interchangeable lens 200 has been coupled to the mount adapter 1200. The operation part 1251 is rotated further counterclockwise around the optical axis when viewed from the interchangeable lens 200 side, as compared with the state shown in FIG. 47B. As a result, as shown in FIG. 48C, the second mount claw portion 1231b and the mount claw portion 240b come into pressure contact engagement with each other. Similarly, the second mount claw portion 1231*a* and the mount claw portion 240*a* come into pressure contact engagement with each other, and the second mount claw portion 1231*c* and the mount claw portion 240*c* come into pressure contact engagement with each other. That is, considering the mount adapter 1200 as a reference, the mount claw portions 240*a* to 240*c* are drawn toward the mount adapter 1200 by using the screw fastening force generated by rotating the second movable cylinder 1230 with respect to the fixed cylinder 1210. In this way, there is no gap between the second mount claw portions 1231*a* to 1231*c* and the mount claw portions 240*a* to 240*c*, and the mount adapter 1200 and the interchangeable lens 200 are coupled without rattling.

By the way described above, the interchangeable lens 200, the mount adapter 1200, and the camera body 110A are coupled without rattling, so that a sense of unity is obtained, and the image pickup apparatus 100E can be integrated. Therefore, a photographer can operate the image pickup apparatus 100 without feeling a sense of incompatibility. It should be noted that, in the present embodiment, screw type mounts are provided on the first mount surface 1211 side and the second mount surface 1212 side in the mount adapter 1200. However, the screw type mount does not necessarily need to be provided in the mount adapter 1200, and may be provided in the camera body 110A or may be provided in the interchangeable lens 200.

While the present invention has been described in detail on the basis of the preferred embodiments, the present invention is not limited to these specific embodiments, and various forms within a scope not departing from the gist of the present invention are also included in the present invention. Further, each of the embodiments described above is merely an embodiment of the present invention, and the embodiments can be appropriately combined.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, a camera body and a camera accessory can be coupled via an adapter apparatus without rattling.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An adapter apparatus, to and from which a first device and a second device are capable of being attached and detached, comprising:
   a first cylinder; and
   a second cylinder engaging with the first cylinder and movable in an axial direction of the first cylinder with respect to the first cylinder,
   wherein the first cylinder includes a first surface which comes into contact with the first device and a second surface which comes into contact with the second device, and
   the second cylinder includes a first claw portion which engages with a claw portion provided in the first device and a second claw portion which engages with a claw portion provided in the second device.

2. The adapter apparatus according to claim 1, further comprising an electric contact member having:
   a first electric contact fixed to the second cylinder and electrically connected to an electric contact of the first device;
   a second electric contact fixed to the first cylinder and electrically connected to an electric contact of the second device; and
   a wiring part electrically connecting the first electric contact and the second electric contact.

3. The adapter apparatus according to claim 1, further comprising:
   a convex part movable in the axial direction and protruding from the second surface,
   wherein the convex part engages with a concave part provided in the second device, in state where the second device comes into contact with the second surface and the second device is attached to the adapter apparatus.

4. The adapter apparatus according to claim 3, further comprising:
   a restricting member having a first contact part and a second contact part,
   wherein, in a state where the first contact part is pressed in an optical axis direction toward the second device by the first device, the restricting member prevents, by the second contact part, the convex part from being pressed toward the second surface.

5. The adapter apparatus according to claim 1, wherein the second cylinder moves in the axial direction, according to a movement of the first claw portion of the first device in the axial direction.

6. The adapter apparatus according to claim 1, wherein the second cylinder is rotatable around an axis of the first cylinder with respect to the first cylinder.

7. The adapter apparatus according to claim 6, further comprising:
   an operation member provided in the second cylinder,
   wherein, in a state where the second device is attached to the adapter apparatus, the operation member engages with the first cylinder and regulates rotation of the second cylinder with respect to the first cylinder.

8. The adapter apparatus according to claim 6, further comprising:
an outer cylinder engaging with the first cylinder,
wherein the outer cylinder has a contact surface, and is biased toward the first device so that the contact surface comes into contact with a contact surface of the first device.

9. The adapter apparatus according to claim 1, wherein the second cylinder includes:
a first movable part which is provided with the first claw portion, and of which rotation around an axis of the first cylinder is regulated with respect to the first cylinder; and
a second movable part which is provided with the second claw portion, is rotatable around the axis, and is screwed with the first movable part, and
wherein when the second movable part is rotated around the axis, the first movable part moves in the axial direction.

10. The adapter apparatus according to claim 9, further comprising:
a restricting member having a contact surface and a convex part,
wherein, the restricting member prevents the first device from coming into contact with the first surface, by the convex part protruding from the first movable part in the vicinity of the first claw portion when the contact surface is pressed in an optical axis direction by the second device.

11. The adapter apparatus according to claim 9, further comprising:
an operation member fixed to the second movable part; and
an operation auxiliary member held rotatably with respect to the operation member,
wherein the first cylinder has an operation groove part engaging with the operation auxiliary member, and
when the operation member is rotated in a state where the operation auxiliary member is rotated with respect to the operation member, the operation auxiliary member comes into contact with an end of the operation groove part to regulate the rotation the operation member.

12. The adapter apparatus according to claim 9, further comprising:
an electric contact member including a first electric contact electrically connected to an electric contact of the first device, a second electric contact electrically connected to an electric contact of the second device, and an electric wiring part electrically connecting the first electric contact and the second electric contact,
wherein the first electric contact is fixed to the first movable part.

13. The adapter apparatus according to claim 1, wherein the second cylinder includes:
a first movable part which is provided with the first claw portion, and of which rotation around an axis of the first cylinder is regulated with respect to the first cylinder; and
a second movable part which is provided with the second claw portion, and of which rotation around the axis of the first cylinder is regulated with respect to the first cylinder,
wherein the adapter apparatus further comprises an annular member which is screwed with the first movable part, engages with the second movable part, and is rotatable around the axis, and the first movable part and the second movable part move in the axial direction by rotating the annular member around the axis.

14. The adapter apparatus according to claim 1, wherein the second cylinder includes:
a first movable part which is provided with the first claw portion and is screwed with the first cylinder to be rotatably around an axis of the first cylinder; and
a second movable part which is provided with the second claw portion and is screwed with the first cylinder to be rotatably around the axis of the first cylinder, and
wherein the adapter apparatus further comprises a first operation member attached to the first movable part and a second operation member attached to the second movable part.

15. The adapter apparatus according to claim 1,
wherein the first device is an image pickup apparatus, to and from which the adapter apparatus is capable of being attached and detached,
the second device is an interchangeable lens which is capable of being attached to and detached from the adapter apparatus, and
the axial direction of the first cylinder is a direction parallel to an optical axis of an optical system provided in the second device, when the second device is attached to the adapter apparatus.

16. The adapter apparatus according to claim 1,
wherein the first claw portion is capable of engaging with the claw portion provided in the first device in the axial direction of the first cylinder, and
the second claw portion is capable of engaging with the claw portion provided in the second device in the axial direction of the first cylinder.

17. An image pickup apparatus in which an image pickup apparatus body and a lens barrel are coupled via an adapter apparatus,
wherein the adapter apparatus includes:
a fixed cylinder which has a first mount surface coming into contact with the image pickup apparatus body and a second mount surface coming into contact with the lens barrel; and
a movable cylinder which has a first mount claw portion and a second mount claw portion and is movable in an axial direction of the fixed cylinder,
the image pickup apparatus body includes:
a fixed mount member which has a body-side mount surface coming into contact with the first mount surface; and
a movable mount member which has a body-side mount claw portion engaging with the first mount claw portion and is screwed with the fixed mount member rotatably around an axis of the fixed cylinder,
the lens barrel includes:
a lens-side mount surface which comes into contact with the second mount surface; and
a lens-side mount claw portion which engages with the second mount claw portion, and
wherein when the movable mount member is rotated in a state where the lens-side mount claw portion and the second mount claw portion engage with each other, the movable cylinder moves in the axial direction so that the first mount claw portion and the body-side mount claw portion come into pressure contact engagement with each other, the second mount claw portion draws the lens-side mount claw portion toward the image pickup apparatus body, and the second mount claw portion and the lens-side mount claw portion come into pressure contact engagement with each other.

18. An image pickup apparatus in which an image pickup apparatus body and a lens barrel are coupled via an adapter apparatus,
wherein the adapter apparatus includes:
a fixed cylinder which has a first mount surface and a second mount surface;
a first movable cylinder which has a first mount claw portion and is movable in an axial direction of the fixed cylinder; and
a second movable cylinder which has a second mount claw portion, is screwed with the first movable cylinder, is rotatable around an axis of the fixed cylinder, and is movable in the axial direction,
the image pickup apparatus body includes:
a body-side mount surface which comes into contact with the first mount surface; and
a body-side mount claw portion which engages with the first mount claw portion,
the lens barrel includes:
a lens-side mount surface which comes into contact with the second mount surface; and
a lens-side mount claw portion which engages with the second mount claw portion, and
wherein when the second mount claw portion and the lens-side mount claw portion are brought into pressure contact engagement with each other by rotating the second movable cylinder to move the second movable cylinder in the axial direction in a state where the body-side mount claw portion and the first mount claw portion engage with each other, the first movable cylinder moves in the axial direction, the first mount claw portion draws the body-side mount claw portion toward the lens barrel, whereby the first mount claw portion and the body-side mount claw portion come into pressure contact engagement with each other.

19. An image pickup apparatus in which an image pickup apparatus body and a lens barrel are coupled via an adapter apparatus,
wherein the adapter apparatus includes:
a fixed cylinder which has a first mount surface and a second mount surface;
a first movable cylinder which has a first mount claw portion and is movable in an axial direction of the fixed cylinder, rotation of the first movable cylinder around an axis of the fixed cylinder being regulated;
a second movable cylinder which has a second mount claw portion and is movable in the axial direction, rotation of the second movable cylinder around the axis being regulated; and
an annular member which is screwed with the first movable cylinder, engages with the second movable cylinder, is movable in the axial direction, and is rotatable around the axis,
the image pickup apparatus body includes:
a body-side mount surface which comes into contact with the first mount surface; and
a body-side mount claw portion which engages with the first mount claw portion;
the lens barrel includes:
a lens-side mount surface which comes into contact with the second mount surface; and
a lens-side mount claw portion which engages with the second mount claw portion, and
wherein when the first movable cylinder and the second movable cylinder are moved in the axial direction by rotating the annular member to move the annular member in the axial direction in a state where the body-side mount claw portion and the first mount claw portion engage with each other and the second mount claw portion and the lens-side mount claw portion engage with each other, the first mount claw portion draws the body-side mount claw portion toward the lens barrel and whereby the first mount claw portion and the body-side mount claw portion come into pressure contact engagement with each other, and the second mount claw portion draws the lens-side mount claw portion toward the image pickup apparatus body and whereby the second mount claw portion and the lens-side mount claw portion come into pressure contact engagement with each other.

20. An image pickup apparatus in which an image pickup apparatus body and a lens barrel are coupled via an adapter apparatus,
wherein the adapter apparatus includes:
a fixed cylinder which has a first mount surface and a second mount surface;
a first movable cylinder which has a first mount claw portion, is movable in an axial direction of the fixed cylinder, and is rotatable around an axis of the fixed cylinder; and
a second movable cylinder which has a second mount claw portion, is movable in the axial direction, and is rotatable around the axis,
the image pickup apparatus body includes:
a body-side mount surface which comes into contact with the first mount surface; and
a body-side mount claw portion which engages with the first mount claw portion,
the lens barrel includes:
a lens-side mount surface which comes into contact with the second mount surface; and
a lens-side mount claw portion which engages with the second mount claw portion,
wherein when the first movable cylinder is moved in the axial direction by rotating the first movable cylinder in a state where the body-side mount claw portion and the first mount claw portion engage with each other, the first mount claw portion draws the body-side mount claw portion toward the lens barrel and whereby the first mount claw portion and the body-side mount claw portion come into pressure contact engagement with each other, and
when the second movable cylinder is moved in the axial direction by rotating the second movable cylinder in a state where the lens-side mount claw portion and the second mount claw portion engage with each other, the second mount claw portion draws the lens-side mount claw portion toward the image pickup apparatus body and whereby the second mount claw portion and the lens-side mount claw portion come into pressure contact engagement with each other.

21. An image pickup apparatus in which one coupling of coupling between a body-side mount claw portion of an image pickup apparatus body and a first mount claw portion of an adapter apparatus and coupling between a second mount claw portion of the adapter apparatus and a lens-side mount claw portion of a lens barrel is performed by a bayonet type mount and the other coupling is performed by a screw type mount,
wherein the adapter apparatus includes:
a fixed cylinder; and a movable cylinder which engages with the fixed cylinder movably in an axial direction, has one end in the axial direction provided with the first mount claw portion, and has the other end provided with the second mount claw portion, and wherein the movable cylinder moves in the axial direction so that a gap in the axial direction between the claw portions coupled by the bayonet type mount is eliminated when the coupling between claw portions by the screw type mount are performed.

22. An adapter apparatus, to and from which an image capturing apparatus and an interchangeable lens are capable of being attached and detached, comprising:

a fixed mount portion that includes a first surface which comes into contact with the image capturing apparatus and a second surface which comes into contact with the interchangeable lens; and a movable portion engaging with the fixed mount portion and movable in an axial direction of the fixed mount portion with respect to the fixed mount portion, wherein the movable portion includes a first claw portion which engages with a claw portion provided in the image capturing apparatus and a second claw portion which engages with a claw portion provided in the interchangeable lens.

* * * * *